United States Patent
Geivandov et al.

(10) Patent No.: US 8,895,118 B2
(45) Date of Patent: Nov. 25, 2014

(54) NEGATIVE DISPERSION RETARDATION PLATE AND ACHROMATIC CIRCULAR POLARIZER

(75) Inventors: Arthur Geivandov, Dolgoprudny (RU); Pavel Ivan Lazarev, Menlo Park, CA (US); Serguei Palto, Moscow Region (RU)

(73) Assignee: Crysoptix K.K., Tokyo (JP)

( * ) Notice: Subject to any disclaimer, the term of this patent is extended or adjusted under 35 U.S.C. 154(b) by 154 days.

(21) Appl. No.: 13/290,096

(22) Filed: Nov. 6, 2011

(65) Prior Publication Data

US 2012/0113380 A1      May 10, 2012

Related U.S. Application Data

(60) Provisional application No. 61/411,603, filed on Nov. 9, 2010.

(51) Int. Cl.
| | |
|---|---|
| *C09K 19/52* | (2006.01) |
| *C09K 19/54* | (2006.01) |
| *C09K 19/32* | (2006.01) |
| *C09K 19/34* | (2006.01) |
| *C09K 19/38* | (2006.01) |
| *G02B 5/30* | (2006.01) |
| *C09K 19/02* | (2006.01) |
| *C09K 19/04* | (2006.01) |

(52) U.S. Cl.
CPC ............... *C09K 19/02* (2013.01); *C09K 19/348* (2013.01); *C09K 19/3804* (2013.01); *C09K 19/54* (2013.01); *G02B 5/3016* (2013.01); *C09K 2019/0496* (2013.01)
USPC ..... 428/1.3; 428/1.1; 252/299.01; 252/299.5; 252/299.61; 252/299.62; 349/117; 349/118; 349/194; 359/352

(58) Field of Classification Search
USPC .................. 428/1.1, 1.3; 252/299.01, 299.61, 252/299.62, 299.5; 349/117, 118, 194; 359/352
See application file for complete search history.

(56) References Cited

U.S. PATENT DOCUMENTS

| | | | |
|---|---|---|---|
| 6,638,582 B1 | 10/2003 | Uchiyama et al. | |
| 8,142,863 B2 * | 3/2012 | Palto | ............... 428/1.1 |
| 2010/0072422 A1 | 3/2010 | Parri et al. | |
| 2010/0085521 A1 * | 4/2010 | Kasianova et al. | ............ 349/117 |
| 2010/0118241 A1 | 5/2010 | Palto | |

FOREIGN PATENT DOCUMENTS

| | | |
|---|---|---|
| WO | 2009/030332 A1 | 3/2009 |
| WO | 2009/030352 A1 | 3/2009 |
| WO | 2009/109782 A2 | 3/2009 |

(Continued)

OTHER PUBLICATIONS

Uchiyama et al., "Wide-Band Retardation Films with Reverse Wavelength Dispersion," IDW, FMC7-1, 2000, pp. 407-410.

(Continued)

*Primary Examiner* — Shean C Wu
(74) *Attorney, Agent, or Firm* — Adam K. Whiting; Whiting IP Law

(57) ABSTRACT

The present invention relates generally to the field of organic chemistry and particularly to the nematic lyotropic liquid crystal solution and negative dispersion retardation plate for application in 3D liquid crystal displays. The negative dispersion retardation plate comprises a substrate, and at least one optically anisotropic retardation layer comprising a multi-component guest-host composition coated onto the substrate.

78 Claims, 2 Drawing Sheets

(56) References Cited

FOREIGN PATENT DOCUMENTS

| WO | 2009/039937 A1 | 4/2009 |
|---|---|---|
| WO | 2010/020312 A1 | 2/2010 |
| WO | 2010/020928 A2 | 2/2010 |

OTHER PUBLICATIONS

Kasianova et al., "Lyotropic liquid crystal guest—host material and anisotropic thin films for optical applications," Liquid Crystals, vol. 37, No. 11, Nov. 2010, pp. 1439-1451.
Broer et al., "New Functional Polymers for Liquid Crystal Displays, Review of Some Recent Developments," Macromol. Symp., 2000, 154, 13 pages.
Bahadur, Handbook of Liquid Crystals, Applications and Uses, World Scientific, 1998, 3 pages.
Bobrov et al., "LCD Applications of Thin Crystal Film Polarizers"; J. SID 2004, 12/2, 25 pages.
Harding et al., "Improved Reactive Mesogen Materials for Incell Optical Films," Proceedings of IDW'06, Otsu, Japan, 2006, 4 pages.
Tilsch et al., "Production Scale deposition of multilayer film structures for birefringent optical components," Thin Solid Films 2007, 516, pp. 107-113.
Seiberle et al., "Photo-Aligned Anisotropic Optical Thin Films"; SID Symposium Digest 2003, 34, pp. 1162-1164.
Oikawa et al., "Novel WV film for wide-viewing-angle TN-mode LCDs," J. SID 2007, 15/2, pp. 133-.
Seiberle et al., "Volume Photo-Aligned Retarders," Proceedings of IDW'06, Otsu, Japan, 2006, pp. 303-306.
Hasebe et al., "High Quality Patterned Retarder for Transflective LCDs," SID Symposium Digest 2008, pp. 1904-1907.
PCT, INternational Search Report and Written Opinion in International Application No. PCT/US2011/059483, Feb. 10, 2012, 10 pages.

* cited by examiner

NEGATIVE DISPERSION RETARDATION PLATE AND ACHROMATIC CIRCULAR POLARIZER

FIELD OF THE INVENTION

The present invention relates generally to the field of organic chemistry and particularly to the nematic lyotropic liquid crystal solution and negative dispersion retardation plate for application in 3D liquid crystal displays.

BACKGROUND OF THE INVENTION

Optically anisotropic materials are of crucial significance in modern optical applications. The well-known achievements in information display technologies are based on development of anisotropic optical retardation layers made of materials such as liquid crystals (LC) and different types of functional polymers (Broer, D. J.; van Haaren, J. A. M. M.; van de Witte, P.; Bastiaansen, C. *Macromol. Symp.* 2000, 154, 1). The functional properties of these materials depend on their phase state. Symmetry of a particular bulk phase and its supramolecular structure define the macroscopic performance of a material—its optical, mechanical and other properties. One example is thermotropic liquid crystals. Depending on temperature, thermotropic liquid crystals can be in different thermodynamically stable phase states. However, it is only for the nematic phase that a set of bulk properties (allowed by symmetry) supports their ubiquitous application in optics and information displays. Thermotropic liquid crystal materials of a single type of molecule typically show a very narrow temperature range for the nematic phase (just a few ° C.). The problem was solved by developing liquid crystal mixtures, which in many instances can also be named as 'guest-host systems' (Bahadur, B. in *Handbook of Liquid Crystals*; Demus, D.; Goodby, J.; Gray, G. W.; Spiess, H.-W., Vill, V. Eds.; Vol. 2A; Wiley-VCH: Weinheim, 1998, 257). Due to the 'guest-host' approach, the thermotropic liquid crystal materials provide the nematic phase in a temperature range larger than 100.C. Guest-host systems are well-known in supramolecular chemistry (Anslyn, E. V.; Dougherty, D. A. *Modern Physical Organic Chemistry*; John Wiley New York, 2006) and biology (Lodish, H.; Berk, A.; Kaiser, C.; *Molecular Cell Biology,* 6th ed.; Freeman, 2008). They are composed of two or more molecules or ions held together in unique structural relationships by forces other than those of full covalent bonds (Lodish, H.; Berk, A.; Kaiser, C.; *Molecular Cell Biology,* 6th ed.; Freeman, 2008). In liquid crystals, the phenomenon of dissolving and aligning of any molecule or a group of molecules such as dyes, impurities or even mesogenic molecules by a liquid crystal can be called a guest-host phenomenon (Bahadur, B. in *Handbook of Liquid Crystals*; Demus, D.; Goodby, J.; Gray, G. W.; Spiess, H.-W., Vill, V. Eds.; Vol. 2A; Wiley-VCH: Weinheim, 1998, 257). The guest molecules couple to the anisotropic intermolecular interaction field of the liquid crystal, but can diffuse rather freely within the host. The essential feature is that a guest-host system is composed of a single material without phase separation. The ability of a material to form the nematic phase is very important for many reasons. For instance, the anisotropy of the viscous-elastic properties of the nematic phase allows fine alignment of the molecules on solid substrates by shear flow (Bobrov, Y.; Kuchenkova, O.; Kouznetsov, M.; Lazarev, P.; Manko, A.; Nazarov, V.; Ovchinnikova, N.; Paukshto, M.; Protsenko, P.; Remizov, S.; *J. SID* 2004, 12/2, 125). This way the optically anisotropic thin solid retardation layers can be deposited onto different substrates. Unfortunately, thermotropic liquid crystals demonstrate the nematic phase in a specific narrow temperature range. Thermotropic liquid crystals do not allow creating thin solid films with a controlled optical anisotropy.

In a typical LCD, the liquid crystal layer is placed between two polarizers. Off-axis contrast drop is one of the inherent drawbacks arising from the optical anisotropy of LC materials and a feature of the propagation of light through crossed polarizers. For instance, at oblique viewing directions, the light leakage can appear through the crossed polarizers, which increases with increasing off-axis angle. Thus the light leakage caused by both LC optical anisotropy and polarizers should be suppressed. This problem of cumulative off-axis contrast ratio decrease is solved using phase retardation plates comprising retardation layers which are produced from optically anisotropic materials. The appropriate retardation plates provide a small color shift and high off-axis contrast (contrast ratio at wide viewing angles) to the LCD. In the latter case coating is followed by solvent evaporation. Additional alignment procedures are involved such as application of an electric field or using alignment layers produced by rubbing or photo-alignment. This process can be used to manufacture uniaxial optical retardation layers with positive and negative optical anisotropy (Harding, R.; Parri, O.; Marden, S.; Skjonnemand, K.; Verrall, M.; Fiebranz, B. In Proceedings of IDW'06, Otsu, Japan, 2006; Society for Information Display: Q13 Campbell, Calif., 2006; p. 307), biaxial retarders for the successively coated layers (Tilsch, M. K.; Hendrix, K.; Tan, K.; Shemo, D.; Bradley, R.; Erz, R.; Buth, J. *Thin Solid Films* 2007, 516, 107, Seiberle, H.; Benecke, C.; Bachels, T. *SID Symposium Digest* 2003, 34, 1162), and optical retardation layers with complex space distribution of the local optical axes (tilted and splayed) for optical compensation of twisted nematic (TN) LCD mode (Oikawa, T.; Yasuda, S.; Takeuchi, K.; Sakai, E.; Mori H. *J. SID* 2007, 15/2, 133). Photo-aligning and a phase retardation function could be combined into a single material (Seiberle, H.; Bachels; T. Benecke, C.; Ibn-Elhaj, M. In Proceedings of IDW'06, Otsu, Japan, 2006; Society for Information Display: Campbell, Calif., 2006; p. 33). Ultraviolet (UV) curable materials can be used for high-resolution patterned retarders for transflective LCDs (Hasebe, H.; Kuwana, Y.; Nakata, H.; Yamazaki, O.; Takeuchi, K.; Tsai, J.-C. *SID Symposium Digest* 2008, 39, 1904).

Most of the phase retardation layers used in modern LCD technology is produced by means of mechanical stretching of the extruded or casted polymers. These materials possess the limited opportunity to control an optical anisotropy. Thus control of optical anisotropy is achieved by adjusting stretching parameters as well as by using special additives capable of increasing or suppressing the material anisotropy. A polymer phase retardation layer, for instance, can be attached to a PVA (polyvinyl alcohol) polarizer sandwiched between protective layers. On the other hand, retardation layers can combine both optical compensation and protective functions. For example, polycyclo-olefins are used for manufacturing of phase retardation layers for optical compensation of vertical alignment (VA) and in-plane switching (IPS) LCD modes, while at the same time supplying protective function. However, polycyclo-olefin based phase retardation layers as well as other hydrophobic polymeric materials have a problem of adhesion to the hydrophilic PVA layer. Besides, even in case of hydrophilic stretched phase retardation layers such as tri-acetylcellulose improving their performance is difficult due to limitations of the mechanical stretching process, especially for the manufacture of large screen displays.

Other drawback of the stretched retardation layers is their small optical anisotropy. Typically, the stretched retardation layers possess small optical anisotropy ($\Delta n=0.001-0.005$). The reason is that combined functions of retardation layer and PVA polarizer protection layer are usually reached if the plastic layer possesses mechanical strength achieved at certain thickness of about 50 µm. Such layer should also have high optical quality (e.g. low haze value) and be easily used in a technological process. An alternative to such 'thick' retardation layers is a thin coating realized on a plastic or glass substrate and embedded into a conventional polarizer or inside a LC cell, respectively. There is a large group of coatable retarders based on cross-linkable thermotropic liquid crystals. Production of such retardation layers comprises coating of a melt or solution onto a substrate. In the latter case, coating is followed by solvent evaporation. Additional alignment procedures are involved such as application of an electric field or using alignment layers produced by rubbing or photo-alignment. This process can be used to manufacture uniaxial optical layers with positive and negative optical anisotropy, biaxial retarders for the successively coated layers, and retardation layers with complex space distribution of the local optical axes (tilted and splayed) for optical compensation of twisted nematic (TN) LCD mode. Photo-aligning and phase retardation function could be combined into a single material. Ultraviolet (UV) curable materials can be used for high-resolution patterned retarders for transflective LCDs. An alternative, simple and cost-effective method of producing optical films is coating of LLC solutions, where small molecules are capable of self-assembling in columnar supramolecules. These compounds are also known as chromonics and consist of amphiphilic molecules with flat conjugated core and polar solubilising groups at the periphery. The self-assembly in aqueous solution is based on p-p interaction between aromatic cores and on the hydrophobic effect. The rod-like supramolecules in aqueous solution form the nematic type of liquid crystalline state, where the axes of the supramolecules within one domain are aligned along some preferable direction. In the course of deposition of a liquid crystalline solution onto a substrate (coating), an external shear force is applied and all supramolecules become aligned along the shear force direction. Such shear flow alignment is well known in thermotropic LCs and can be explained by anisotropy of the viscous-elastic properties of the nematic phase. Other approaches can be used in order to align LLC, for instance coating of lyotropic liquid crystalline solution onto the photo-aligned layer. Evaporation of solvent fixes the ordered structure, leading to formation of a solid birefringent film with macroscopic optical anisotropy. Molecules in these retardation layers are usually packed with their minimal polarizability axes along the coating direction corresponding to the minimal principal refractive index.

In order to solve the foregoing drawbacks, according to the present invention, there is provided lyotropic liquid crystal (LLC) guest-host systems which allow creating thin solid retardation layers with a controlled optical anisotropy. While thermotropic liquid crystals show the nematic phase in a certain temperature range, the nematic phase of the disclosed lyotropic liquid crystals exists in a certain range of concentrations of materials in solution.

SUMMARY OF THE INVENTION

The present invention provides a nematic lyotropic liquid crystal solution comprising a water or water-based solvent, and a multi-component guest-host composition comprising rigid rod-like polymer macromolecules having absorption in ultraviolet and/or near infra-red wavelength range, supramolecules of a first type having absorption in ultraviolet wavelength range and formed via π-π-interaction by partially conjugated substantially planar polycyclic organic molecules of the first type having absorption in ultraviolet wavelength range, supramolecules of a second type having absorption in near-infrared wavelength range and formed via π-π-interaction by partially conjugated substantially planar polycyclic organic molecules of the second type having absorption in near-infrared wavelength range and supramolecules of a third type having absorption in ultraviolet and near-infrared wavelength ranges and formed via π-π-interaction by mix of partially conjugated substantially planar polycyclic organic molecules of the first and second types.

In another aspect, the present invention provides a negative dispersion retardation plate comprising: a substrate and at least one optically anisotropic retardation layer. The layer comprises a multi-component guest-host composition and coated onto the substrate. The composition comprises rigid rod-like polymer macromolecules having absorption in ultraviolet and/or near infra-red wavelength range, supramolecules of a first type having absorption in ultraviolet wavelength range and formed via π-π-interaction by partially conjugated substantially planar polycyclic organic molecules of the first type having absorption in ultraviolet wavelength range, supramolecules of a second type having absorption in near-infrared wavelength range and formed via π-π-interaction by partially conjugated substantially planar polycyclic organic molecules of the second type having absorption in near-infrared wavelength range and supramolecules of a third type having absorption in ultraviolet and near-infrared wavelength ranges and formed via π-π-interaction by mix of partially conjugated substantially planar polycyclic organic molecules of the first and second types. Molar portions of the rigid rod-like polymer macromolecules, the supramolecules of a first type, the supramolecules of a second type and the supramolecules of a third type are $C_0$, $C_1$, $C_2$ and $C_3$. The negative dispersion retardation plate is substantially transparent for electromagnetic radiation in the visible spectral range and provides an essentially fixed optical phase delay in the range from 0 to $2\pi$ over the whole visible spectral range.

In further aspect, the present invention provides an achromatic circular polarizer comprising a linear polarizer and a negative dispersion retardation plate disclosed in present invention. Said retardation plate comprises a substrate and an optically anisotropic retardation layer coated onto the substrate comprising a multi-component guest-host composition. The composition comprises rigid rod-like polymer macromolecules serving as guest and having absorption in ultraviolet and/or near infra-red wavelength range, supramolecules of a first type having absorption in ultraviolet wavelength range and formed via π-π-interaction by partially conjugated substantially planar polycyclic organic molecules of the first type having absorption in ultraviolet wavelength range, supramolecules of a second type having absorption in near-infrared wavelength range and formed via π-π-interaction by partially conjugated substantially planar polycyclic organic molecules of the second type having absorption in near-infrared wavelength range and supramolecules of a third type having absorption in ultraviolet and near-infrared wavelength ranges and formed via π-π-interaction by mix of partially conjugated substantially planar polycyclic organic molecules of the first and second types. The longitudinal axes of the rigid rod-like polymer macromolecules coincide with longitudinal axes of said supramolecules. Molar portions of the rigid rod-like polymer macromolecules, the supramolecules of a first type, the supramolecules of a second type and the supramolecules of a third type are $C_0$, $C_1$, $C_2$ and $C_3$. The negative dispersion retardation plate is substantially transparent for electromagnetic radiation in the visible spectral range and provides an essentially fixed optical phase delay approximately equal to $\pi/2$ or $3\pi/2$ over the whole visible spectral range.

DETAILED DESCRIPTION OF THE INVENTION

Figure 1:
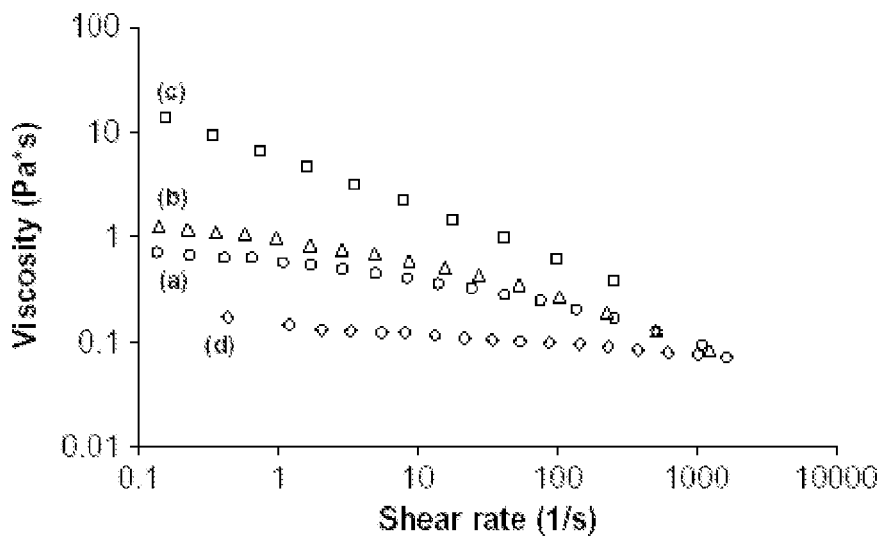
FIG. 1 shows dependence of viscosity of guest-host LLC vs. shear rate.

The general description of the present invention having been made, a further understanding can be obtained by reference to the specific preferred embodiments, which are given herein only for the purpose of illustration and are not intended to limit the scope of the appended claims.

Definitions of various terms used in the description and claims of the present invention are listed below.

The term "visible spectral range" refers to a spectral range having the lower boundary approximately equal to 400 nm, and upper boundary approximately equal to 700 nm.

The term "retardation layer" refers to an optically anisotropic layer which is characterized by three principal refractive indices ($n_x$, $n_y$ and $n_z$), wherein two principal directions for refractive indices $n_x$ and $n_y$ belong to xy-plane coinciding with a plane of the retardation layer and one principal direction for refractive index ($n_z$) coincides with a normal line to the retardation layer.

The term "optically anisotropic biaxial retardation layer" refers to an optical layer which refractive indices $n_x$, $n_y$, and $n_z$ obey the following condition in the visible spectral range: $n_x \neq n_z \neq n_y$.

The term "optically anisotropic retardation layer of $B_A$-type" refers to an optical layer which refractive indices $n_x$, $n_y$, and $n_z$ obey the following condition in the visible spectral range: $n_x < n_z < n_y$.

The term "optically anisotropic retardation layer of positive A-type" refers to an uniaxial optic layer which principal refractive indices $n_x$, $n_y$, and $n_z$ obey the following condition in the visible spectral range: $n_z = n_y < n_x$.

The term "optically anisotropic retardation layer of negative A-type" refers to an uniaxial optic layer which principal refractive indices $n_x$, $n_y$, and $n_z$ obey the following condition in the visible spectral range: $n_z = n_y > n_x$.

The term "NZ-factor" refers to the quantitative measure of degree of biaxiality which is calculated as follows:

$$NZ = \frac{\text{Max}(n_x, n_y) - n_z}{\text{Max}(n_x, n_y) - \text{Min}(n_x, n_y)}$$

The above mentioned definitions are invariant to rotation of system of coordinates (of the laboratory frame) around of the vertical z-axis for all types of anisotropic layers.

The present invention provides a nematic lyotropic liquid crystal solution as disclosed hereinabove.

In one embodiment of a solution, the rigid rod-like polymer macromolecule comprises at least two building blocks connected to each other according to formula:

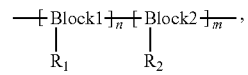

where Block1 and Block2 are selected independently from the following list:

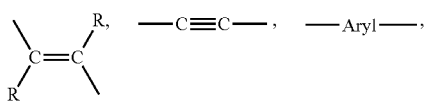

-Cyclohexyl-,

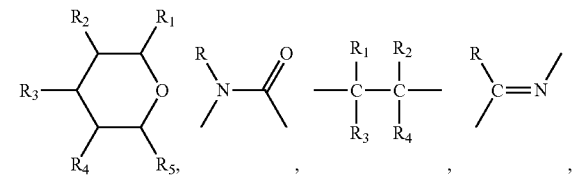

—CH2-O—, —N=N—;

n and m are integers from the range of 5 to 10000. Side-groups R, $R_1$, $R_2$, $R_3$, $R_4$, $R_5$ are selected independently from the list comprising H, Alkil, $SO_3H$, $(CH_2)_m SO_3H$, $PO_3H_2$, $(CH_2)_m Si(O\ \text{Alkyl})_3$, $CH_2\text{Phenyl}$, $(CH_2)_m OH$, $NH_2$, COOH, OH. Counterion M is selected from the list comprising $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$ and $NH_{4-k}Q_k^+$, where Q is selected from the list comprising linear and branched (C1-C20) alkyl, (C2-C20) alkenyl, (C2-C20) alkinyl, and (C6-C20)arylalkyl, and k is 0, 1, 2, 3 or 4. In another embodiment of a solution, the rigid rod-like polymer macromolecule has the general structural formula I or its salt

(I)

where Core is organic unit having absorption in ultraviolet and/or near infra-red wavelength range and comprising a set of ionogenic side-groups $G_{k1}$. Number n1 is of the organic units in the rigid rod-like polymer macromolecule which is equal to integers in the range from 10 to 10000, and k1 is equal to 0, 1, 2, 3, 4, 5, 6, 7, or 8. The ionogenic side-groups and the number k1 give rigidity to the rod-like macromolecule and the number n1 provides molecular anisotropy that promotes mesophases formation of macromolecules. In still another embodiment of a solution, the rigid rod-like polymer macromolecule is selected from structures 1 to 29 shown in Table 1.

TABLE 1

Examples of the structural formulas of the rigid rod-like polymer macromolecules according to the present invention

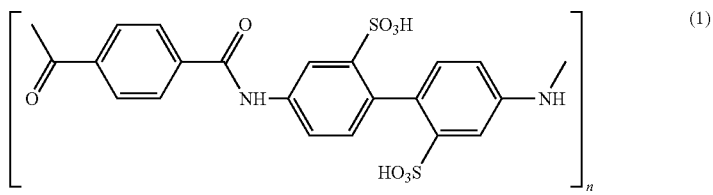

poly(2,2'-disulfo-4,4'-benzidine terephthalamide) (1)

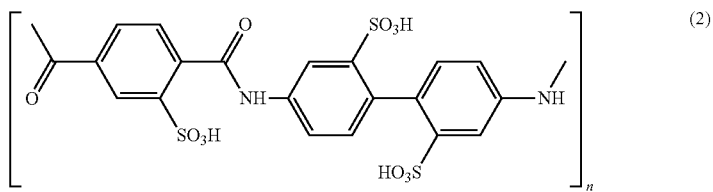

poly(2,2'-disulfo-4,4'-benzidine sulfoterephthalamide) (2)

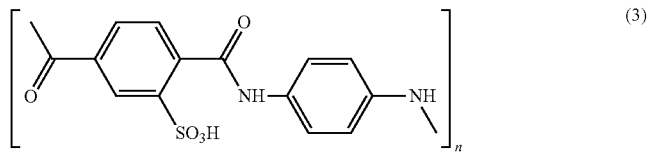

poly(para-phenylene sulfoterephthalamide) (3)

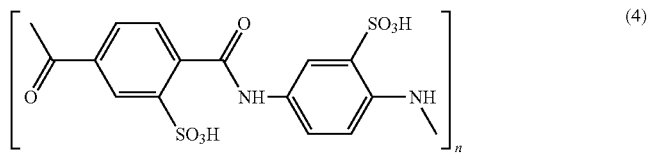

poly(2-sulfo-1,4-phenylene sulfoterephthalamide) (4)

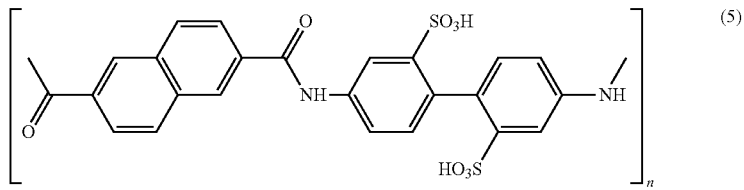

poly(2,2'-disulfo-4,4'-benzidine naphthalene-2,6-dicarboxamide) (5)

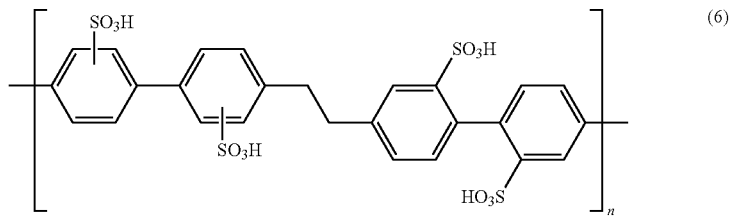

Poly(disulfobiphenylene-1,2-ethylene-2,2'-disulfobiphenylene) (6)

TABLE 1-continued

Examples of the structural formulas of the rigid rod-like polymer macromolecules according to the present invention

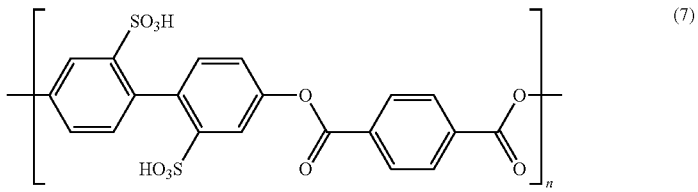

Poly(2,2'-disulfobiphenyl-dioxyterephthaloyl) (7)

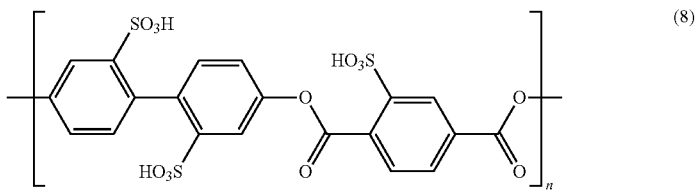

Poly(2,2'-disulfobiphenyl-2-sulfodioxyterephthaloyl) (8)

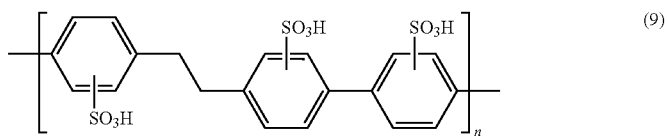

Poly(sulfophenylene-1,2-ethylene-2,2'-disulfobiphenylene) (9)

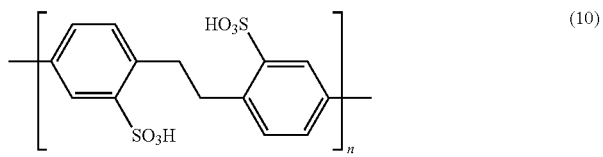

Poly(2-sulfophenylene-1,2-ethylene-2'-sulfophenylene) (10)

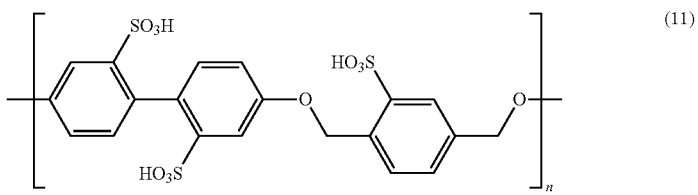

Poly(2,2'-disulfobiphenyl-2-sulfo-1,4-dioxymethylphenylene) (11)

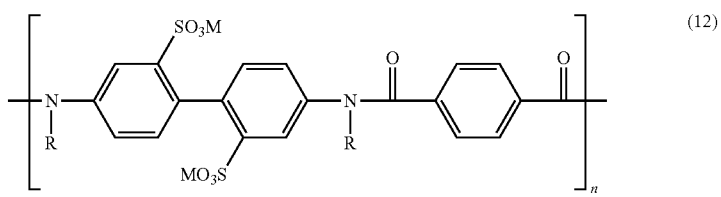

(12)

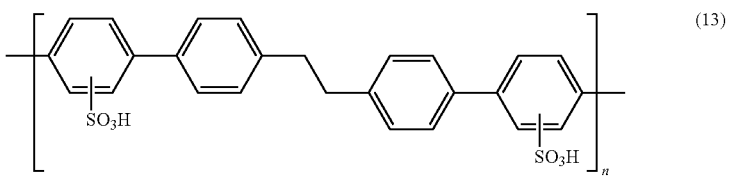

Poly(disulfo-quarterphenylethylen) (13)

TABLE 1-continued

Examples of the structural formulas of the rigid rod-like polymer macromolecules according to the present invention

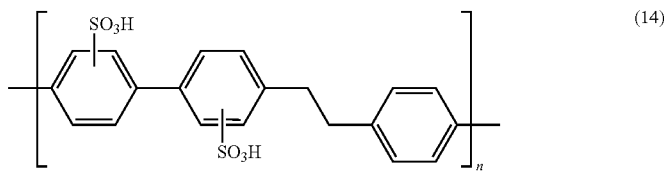

Poly(disulfo-terphenylethylen) (14)

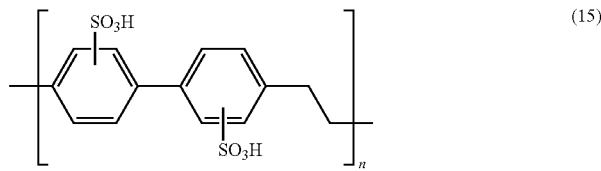

Poly(disulfo-biphenylethylen) (15)

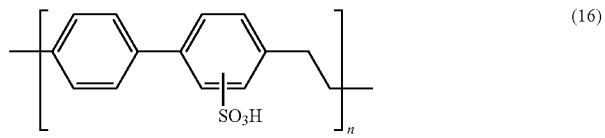

Poly(sulfo-biphenylethylen) (16)

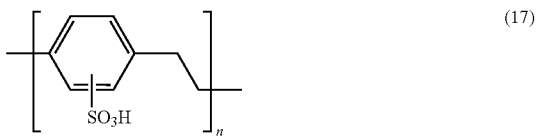

Poly(sulfo-phenylethylen) (17)

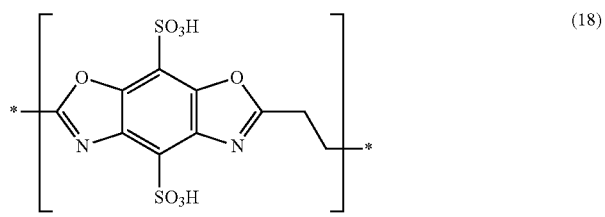

Poly(4,9-disulfobenzo[1,2-d;5,4-d′]bisoxazole-1,7-ethylene) (18)

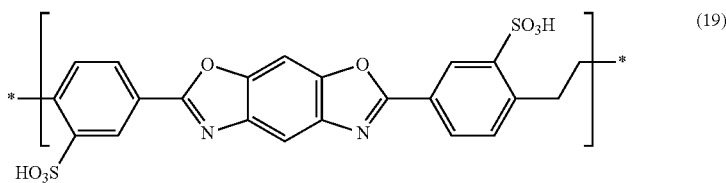

Poly(benzo[1,2-d;5,4-d′]bisoxazole-1,7-[1,1′-ethane-1,2-diyl-2,2′-disulfodibenzene]) (19)

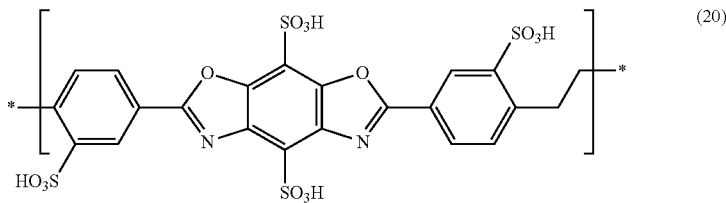

Poly(4,9-disulfobenzo[1,2-d;5,4-d′]bisoxazole-1,7-[1,1′-ethane-1,2-diyl-2,2′-disulfodibenzene]) (20)

TABLE 1-continued

Examples of the structural formulas of the rigid rod-like polymer macromolecules according to the present invention

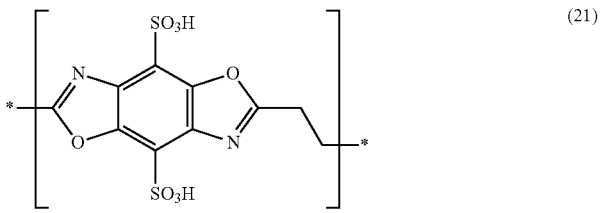

(21)

Poly(4,9-disulfobenzo[1,2-d;5,4-d']bisoxazole-1,7-ethylene)

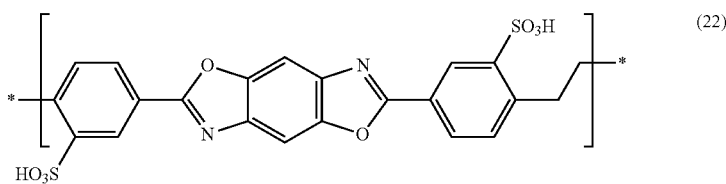

(22)

Poly(benzo[1,2-d;5,4-d']bisoxazole-1,7-[1,1'-ethane-1,2-diyl-2,2'-disulfodibenzene])

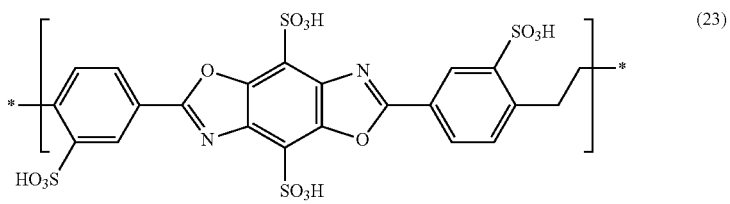

(23)

Poly(4,9-disulfobenzo[1,2-d;5,4-d']bisoxazole-1,7-[1,1'-ethane-1,2-diyl-2,2'-disulfodibenzene])

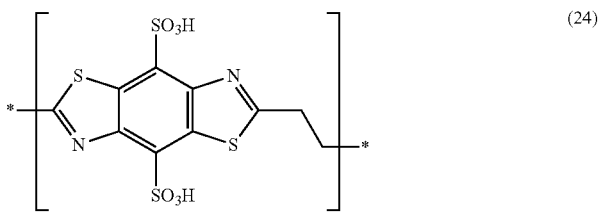

(24)

Poly(4,9-disulfobenzo[1,2-d;5,4-d']bisthiazole-1,7-ethylene)

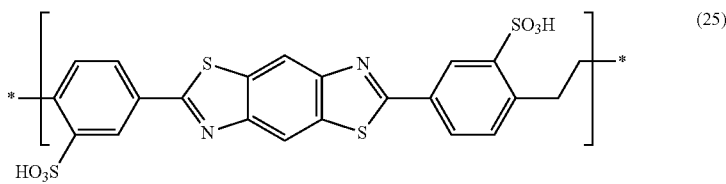

(25)

Poly(benzo[1,2-d;5,4-d']bisthiazole-1,7-[1,1'-ethane-1,2-diyl-2,2'-disulfodibenzene])

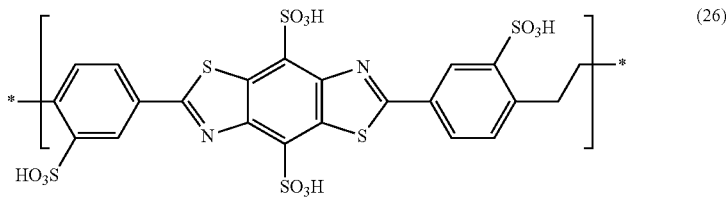

(26)

Poly(4,9-disulfobenzo[1,2-d;5,4-d']bisthiazole-1,7-[1,1'-ethane-1,2-diyl-2,2'-disulfodibenzene])

TABLE 1-continued

Examples of the structural formulas of the rigid rod-like polymer macromolecules according to the present invention

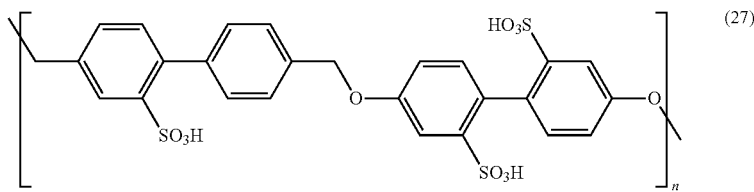

(27) Poly(4,4'-dimethylen-1-sulfobiphenyl)-(4,4'-dioxi-1,1'-disulfobiphenyl) ether)

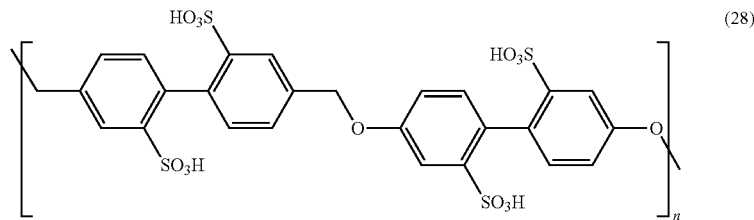

(28) Poly((4,4'-dimethylen-1,1'-disulfobiphenyl)-(4,4'-dioxi-1,1'-disulfobiphenyl) ether)

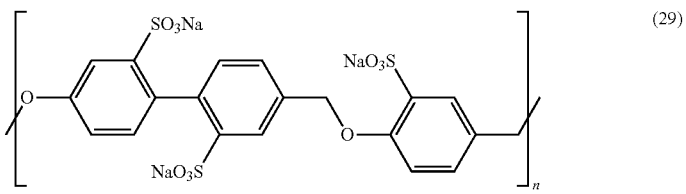

(29) Poly((1,4-dimethylen-2-sulfophenyl)-(4,4'-dioxi-1,1'-disulfobiphenyl) ether)

where R is a side-group selected from the list comprising Alkil, $(CH_2)_m SO_3H$, $(CH_2)_m Si(O\ Alkyl)_3$, $CH_2Phenyl$, $(CH_2)_m OH$ and M is counterion selected from the list comprising $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$ and $NH_{4-k}Q_k^+$, where Q is selected from the list comprising linear and branched (C1-C20) alkyl, (C2-C20) alkenyl, (C2-C20) alkinyl, and (C6-C20)arylalkyl, and k is 0, 1, 2, 3 or 4.

In yet another embodiment of a solution, the rigid rod-like polymer macromolecule of the general structural formula I further comprises additional side-groups independently selected from the list comprising linear and branched ($C_1$-$C_{20}$)alkyl, ($C_2$-$C_{20}$)alkenyl, and ($C_2$-$C_{20}$)alkinyl. In one embodiment of a solution, at least one of the additional side-groups is connected with the organic unit Core via a bridging group A selected from the list comprising —C(O)—, —C(O)O—, —C(O)—NH—, —(SO$_2$)NH—, —O—, —CH$_2$O—, —NH—, >N—, and any combination thereof. In another embodiment of a solution, the salt of the rigid rod-like polymer macromolecule of the general structural formula I is selected from the list comprising ammonium and alkali-metal salts. In still another embodiment of a solution, the rod-like macromolecule has a polymeric main rigid-chain, and wherein the conjugated organic units are the same. In yet another embodiment of a solution, the rigid rod-like macromolecule has a copolymeric main rigid-chain, and wherein at least one conjugated organic unit is different from the others. In one embodiment of a solution, the partially conjugated substantially planar polycyclic organic molecules of the first type have a general structural formula II

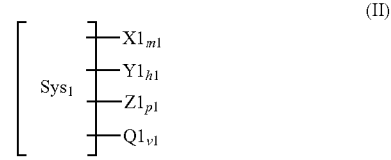

where $Sys_1$ is an at least partially conjugated substantially planar polycyclic molecular system having approximately (predominantly) board like form and having absorption in ultraviolet wavelength range, X1, Y1, Z1, and Q1 are substituents; substituent X1 is a carboxylic group —COOH, m1 is 0, 1, 2, 3 or 4; substituent Y1 is a sulfonic group —SO$_3$H, h1 is 0, 1, 2, 3 or 4; substituent Z1 is a carboxamide —CONH$_2$, p1 is 0, 1, 2, 3 or 4; substituent Q1 is a sulfonamide —SO$_2$NH$_2$, v1 is 0, 1, 2, 3 or 4. In another embodiment of a solution, at least partially conjugated substantially planar polycyclic molecular system Sys$_1$ is selected from the structures with general formula 30 to 44 shown in Table 2.

TABLE 2
Examples of the structural formulas of the polycyclic molecular systems $Sys_1$ according to the present invention
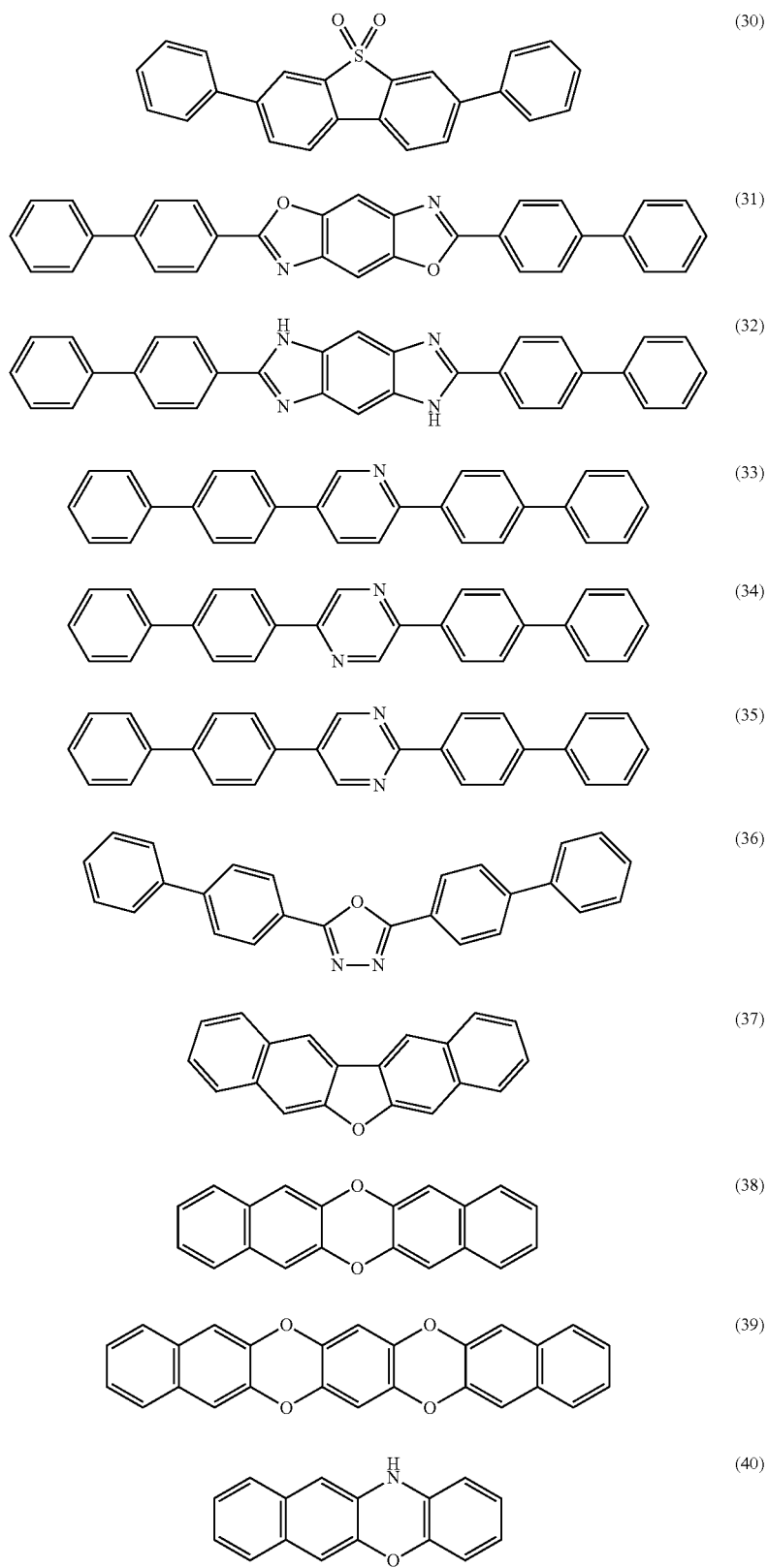

TABLE 2-continued

Examples of the structural formulas of the polycyclic molecular systems Sys₁ according to the present invention

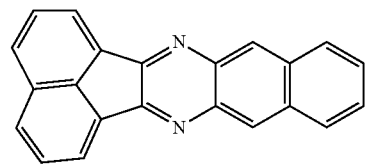 [SMILES: c1ccc2cc3nc4c(nc3cc2c1)-c1cccc2cccc-4c12]

(41)

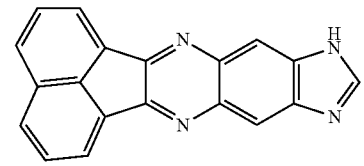 [SMILES: c1cc2c3c(cccc3c1)-c1nc3cc4[nH]cnc4cc3nc1-2]

(42)

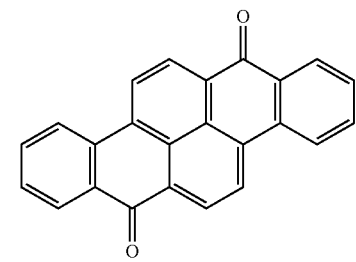 [SMILES: O=C1c2ccccc2-c2ccc3c4c(ccc1c24)-c1ccccc1C3=O]

(43)

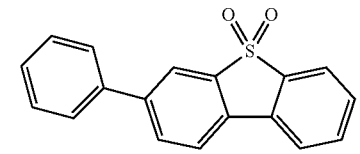 [SMILES: O=S1(=O)c2ccccc2-c2ccc(-c3ccccc3)cc21]

(44)

In another embodiment of a solution, the organic molecules having a general structural formula II is selected from structures 45 to 53 shown in Table 3, where the molecular system Sys₁ is selected from the structures 30 and 37 to 44, the substituent is a sulfonic group —SO₃H, and m1, p1, and v1, are equal to 0.

TABLE 3

Examples of the structural formulas of the organic molecules having a general structural formula II according to the present invention

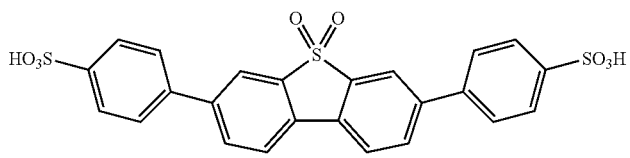

(45)

4,4'-(5,5-dioxidodibenzo[b,d]thiene-3,7-diyl)dibenzenesulfonic

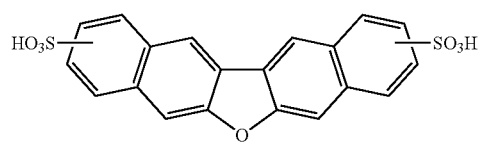

(46)

dinaphto[2,3-b;2',3'-d]furan disulfonic acid

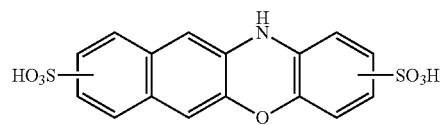

(47)

12H-benzo[b]phenoxazine disulfonic acid

TABLE 3-continued

Examples of the structural formulas of the organic molecules having a general structural formula II according to the present invention

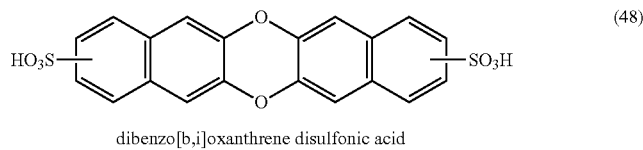

dibenzo[b,i]oxanthrene disulfonic acid (48)

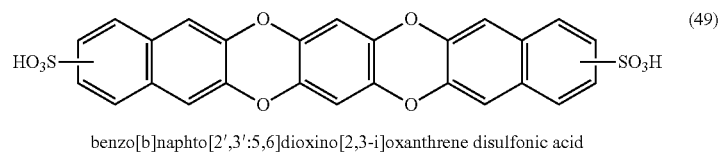

benzo[b]naphto[2′,3′:5,6]dioxino[2,3-i]oxanthrene disulfonic acid (49)

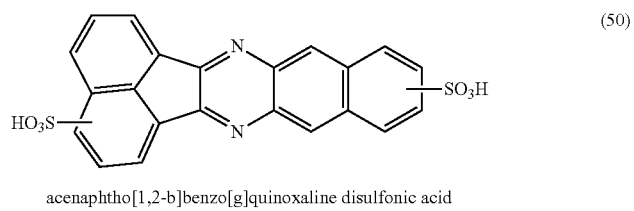

acenaphtho[1,2-b]benzo[g]quinoxaline disulfonic acid (50)

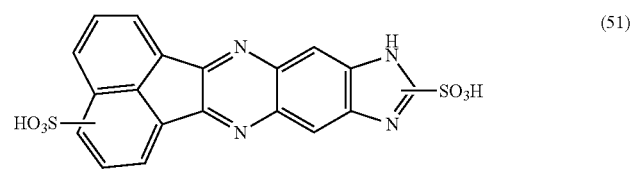

9H-acenaphtho[1,2-b]imidazo[4,5-g]quinoxaline disulfonic acid (51)

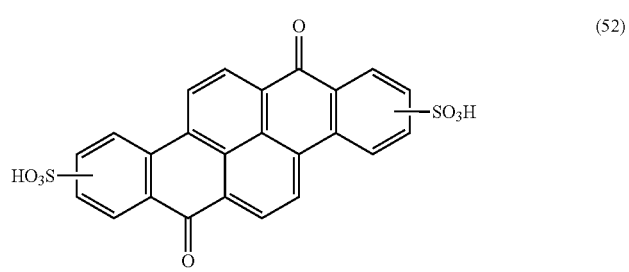

dibenzo[b,def]chrysene-7,14-dion disulfonic acid (52)

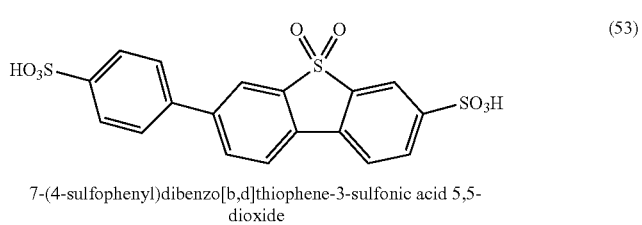

7-(4-sulfophenyl)dibenzo[b,d]thiophene-3-sulfonic acid 5,5-dioxide (53)

In still another embodiment of a solution, the organic molecules having a general structural formula II further comprises at least one substituent selected from the list comprising $CH_3$, $C_2H_5$, Cl, Br, $NO_2$, F, $CF_3$, CN, OH, $OCH_3$, $OC_2H_5$, $OCOCH_3$, OCN, SCN, and $NHCOCH_3$.

In yet another embodiment of a solution, the partially conjugated substantially planar polycyclic organic molecules of the second type have a general structural formula III $$\left[ Sys_2 \begin{array}{l} -X2_{m2} \\ -Y2_{h2} \\ -Z2_{p2} \\ -Q2_{v2} \end{array} \right]$$ (III)

where $Sys_2$ is an at least partially conjugated substantially planar polycyclic molecular system having approximately (predominantly) board like form and having absorption in near-infrared wavelength range, X2, Y2, Z2, and Q2 are substituents; substituent X2 is a carboxylic group —COOH, m2 is 0, 1, 2, 3 or 4; substituent Y2 is a sulfonic group —$SO_3H$, h2 is 0, 1, 2, 3 or 4; substituent Z2 is a carboxamide —$CONH_2$, p2 is 0, 1, 2, 3 or 4; substituent Q2 is a sulfonamide —$SO_2NH_2$, v2 is 0, 1, 2, 3 or 4. In one embodiment of a solution, the organic compound having a general structural formula III is selected from the structures with general formula 54 to 55 shown in Table 4.

TABLE 4

Examples of the structural formulas of the organic molecules having a general structural formula III according to the present invention

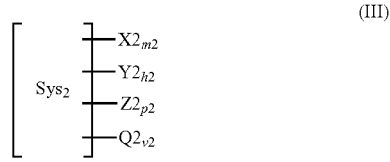
(54)

| M | X, Y | $R_1$, $R_2$ |
|---|---|---|
| Ni, Pd, Pt | O, S, NR | Alkyl-$SO_3H$, Aryl-$SO_3H$, NH—$SO_3H$, (O-alkyl)$_n$-$SO_3H$ (OCH$_2$CH$_2$)$_n$OH |

(55)

| M | $R_1$, $R_2$ |
|---|---|
| Ni, Pd, Pt | Alkyl-$SO_3H$, Aryl-$SO_3H$, NH—$SO_3H$, (O-alkyl)$_n$-$SO_3H$ (OCH$_2$CH$_2$)$_n$OH |

In another embodiment of a solution, the partially conjugated substantially planar polycyclic organic molecules of the first type have a general structural formula IV

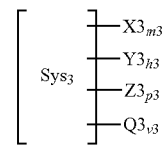
(IV)

where $Sys_3$ is an at least partially conjugated substantially planar polycyclic molecular system having approximately (predominantly) disk form and having absorption in ultraviolet wavelength range, X3, Y3, Z3, and Q3 are substituents; substituent X3 is a carboxylic group —COOH, m3 is 0, 1, 2, 3 or 4; substituent Y3 is a sulfonic group —$SO_3H$, h3 is 0, 1, 2, 3 or 4; substituent Z3 is a carboxamide —$CONH_2$, p3 is 0, 1, 2, 3 or 4; substituent Q3 is a sulfonamide —$SO_2NH_2$, v3 is 0, 1, 2, 3 or 4.17. In still another embodiment of a solution, the organic molecules having a general structural formula IV has at least partially conjugated substantially planar polycyclic molecular system $Sys_3$ selected from the structures with general formula 56 to 69 shown in Table 5.

TABLE 5

Examples of the structural formulas of the organic molecules having a general structural formula IV according to the present invention

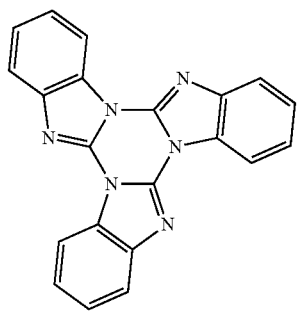 [SMILES: c1ccc2c(c1)nc1n2c2nc3ccccc3n2c2nc3ccccc3n12]
(56)

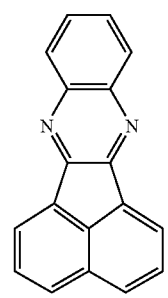 [SMILES: c1cc2c3c(cccc3c1)-c1nc3ccccc3nc1-2]
(57)

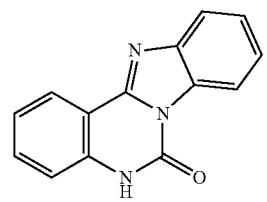 [SMILES: O=c1[nH]c2ccccc2c2nc3ccccc3n12]
(58)

TABLE 5-continued
Examples of the structural formulas of the organic molecules having a general structural formula IV according to the present invention
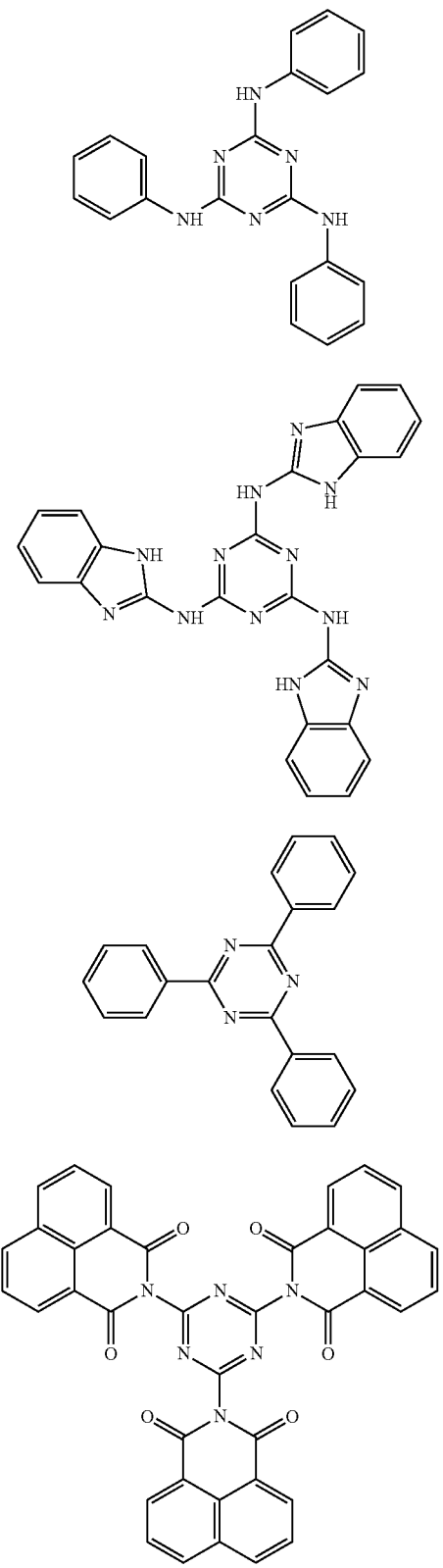
(59)
(60)
(61)
(62)
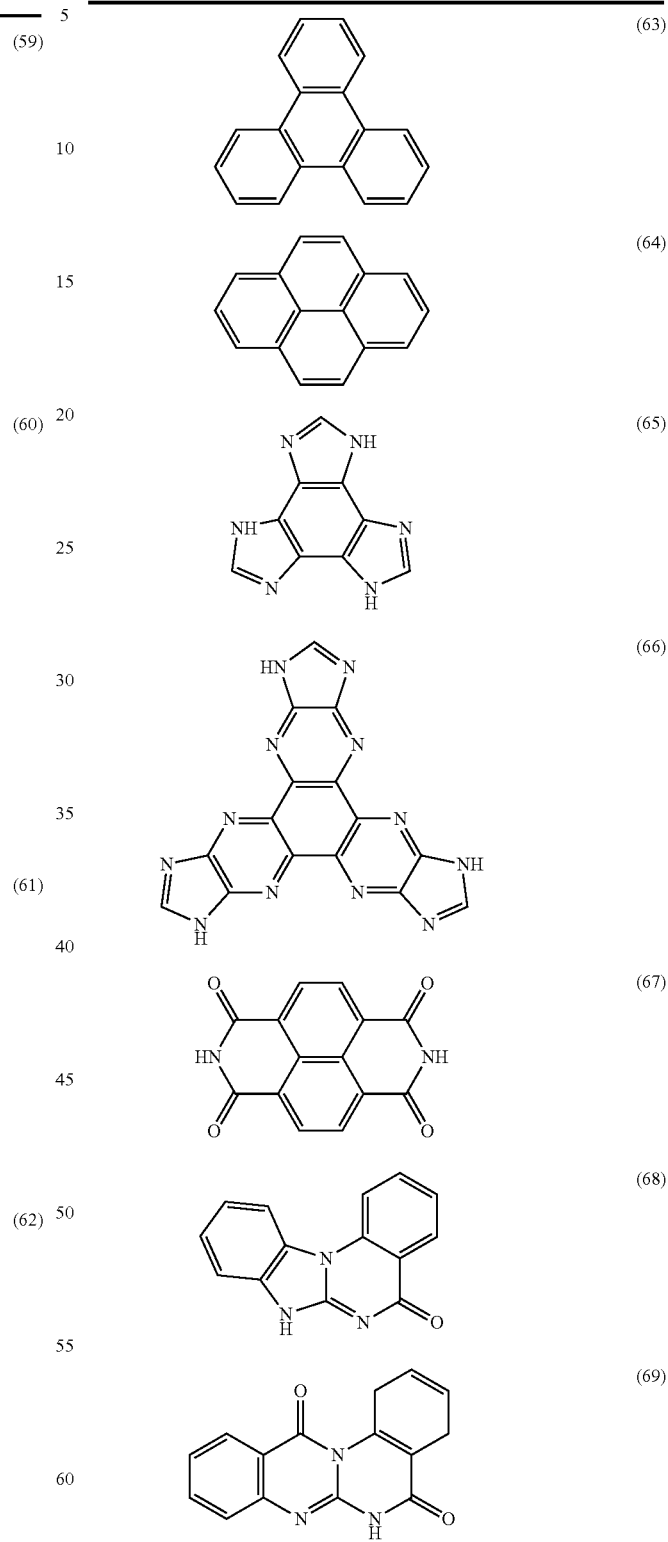
(63)
(64)
(65)
(66)
(67)
(68)
(69)
In yet another embodiment of a solution, the partially conjugated substantially planar polycyclic organic molecules of the second type have a general structural formula V

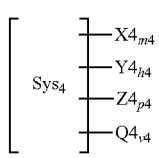
(V)

where Sys₄ is an at least partially conjugated substantially planar polycyclic molecular system having absorption in near-infrared wavelength range and having approximately (predominantly) disk form, X4, Y4, Z4, and Q4 are substituents; substituent X4 is a carboxylic group —COOH, m4 is 0, 1, 2, 3 or 4; substituent Y4 is a sulfonic group —SO₃H, h4 is 0, 1, 2, 3 or 4; substituent Z4 is a carboxamide —CONH₂, p4 is 0, 1, 2, 3 or 4; substituent Q4 is a sulfonamide —SO₂NH₂, v3 is 0, 1, 2, 3 or 4. In one embodiment of a solution, the organic compound having a general structural formula V is selected from the structures with general formula 70 to 76 shown in Table 6.

TABLE 6

Examples of the structural formulas of the organic molecules having a general structural formula V according to the present invention

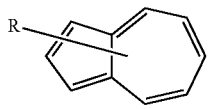 (70)

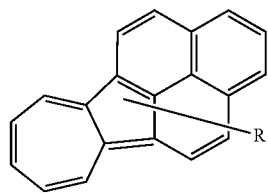 (71)

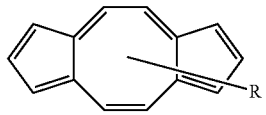 (72)

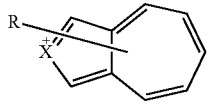 (73)

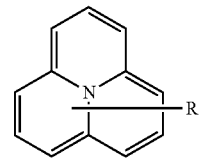 (74)

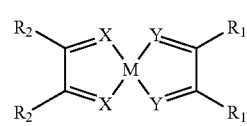 (75)

| M | X, Y | R₁, R₂ |
|---|---|---|
| Ni, Pd, Pt | O, S, NR | Alkyl-SO₃H, Aryl-SO₃H, NH—SO₃H, (O-alkyl)$_n$-SO₃H (OCH₂CH₂)$_n$OH |

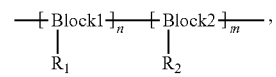 (76)

| M | X, Y | R₁, R₂ |
|---|---|---|
| Ni, Pd, Pt | O, S, NR | Alkyl-SO₃H, Aryl-SO₃H, NH—SO₃H, (O-alkyl)$_n$-SO₃H (OCH₂CH₂)$_n$OH |

In another embodiment of a solution, the solvent is selected from the list comprising water, alkalis and acids or any combination thereof The present invention also provides a negative dispersion retardation plate as disclosed hereinabove. In one embodiment of a negative dispersion retardation plate, the fixed optical phase delay is equal to $\pi/2$. In another embodiment of a negative dispersion retardation plate, the fixed optical phase delay is equal to $3\pi/2$. In one embodiment of a negative dispersion retardation plate, the rigid rod-like polymer macromolecule comprises at least two building blocks connected to each other according to formula:

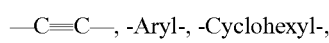

where Block1 and Block2 are selected independently from the following list:

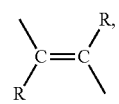

—C≡C—, -Aryl-, -Cyclohexyl-,

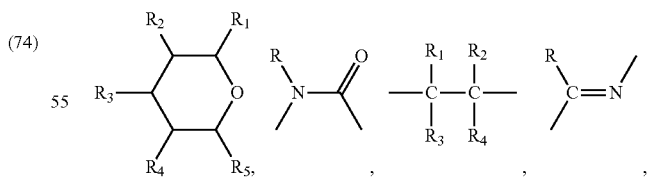

—CH2—O—, —N=N—;

n and m are integers from the range of 5 to 10000. Side-groups R, R₁, R₂, R₃, R₄, R₅ are selected independently from the list comprising H, Alkil, SO₃H, (CH₂)$_m$SO₃H, PO₃H₂, (CH₂)$_m$Si(O Alkyl)₃, CH₂Phenyl, (CH₂)$_m$OH, NH₂, COOH, OH. Counterion M is selected from the list comprising H⁺, Na⁺, K⁺, Li⁺, Cs⁺, Ba²⁺, Ca²⁺, Mg²⁺, Sr²⁺, Pb²⁺, Zn²⁺, La³⁺, Ce³⁺, Y³⁺, Yb³⁺, Gd³⁺, Zr⁴⁺ and NH$_{4-k}$Q$_k^+$, where Q is selected from the list comprising linear and branched (C1-C20) alkyl, (C2-C20) alkenyl, (C2-C20) alkinyl, and (C6-C20)arylalkyl, and k is 0, 1, 2, 3 or 4. In another embodiment of a negative dispersion retardation plate, the rigid rod-like polymer macromolecule has the general structural formula I or its salt

where Core is organic unit having absorption in ultraviolet and/or near infra-red wavelength range and comprising a set of ionogenic side-groups $G_{k1}$. Number n1 is of the organic units in the rigid rod-like polymer macromolecule which is equal to integers in the range from 10 to 10000, and k1 is equal to 0, 1, 2, 3, 4, 5, 6, 7, or 8. The ionogenic side-groups and the number k1 give rigidity to the rod-like macromolecule and the number n1 provides molecular anisotropy that promotes mesophases formation of macromolecules. In still another embodiment of a negative dispersion retardation plate, the rigid rod-like polymer macromolecule is selected from structures 1 to 29 shown in Table 1. In yet another embodiment of a negative dispersion retardation plate, the rigid rod-like polymer macromolecule of the general structural formula I further comprises additional side-groups independently selected from the list comprising linear and branched $(C_1-C_{20})$alkyl, $(C_2-C_{20})$alkenyl, and $(C_2-C_{20})$alkinyl. In one embodiment of a negative dispersion retardation plate, at least one of the additional side-groups is connected with the organic unit Core via a bridging group A selected from the list comprising —C(O)—, —C(O)O—, —C(O)—NH—, —(SO$_2$)NH—, —O—, —CH$_2$O—, —NH—, >N—, and any combination thereof. In another embodiment of a negative dispersion retardation plate, the salt of the rigid rod-like polymer macromolecule of the general structural formula I is selected from the list comprising ammonium and alkali-metal salts. In still another embodiment of a negative dispersion retardation plate, the rod-like macromolecule has a polymeric main rigid-chain, and wherein the conjugated organic units are the same. In yet another embodiment of a negative dispersion retardation plate, the rigid rod-like macromolecule has a copolymeric main rigid-chain, and wherein at least one conjugated organic unit is different from the others. In one embodiment of a negative dispersion retardation plate, the partially conjugated substantially planar polycyclic organic molecules of the first type have a general structural formula II

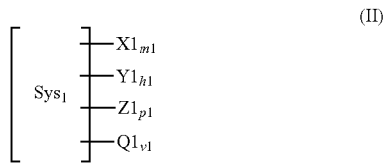

where $Sys_1$ is an at least partially conjugated substantially planar polycyclic molecular system having approximately (predominantly) board like form and having absorption in ultraviolet wavelength range, X1, Y1, Z1, and Q1 are substituents; substituent X1 is a carboxylic group —COOH, m1 is 0, 1, 2, 3 or 4; substituent Y1 is a sulfonic group —SO$_3$H, h1 is 0, 1, 2, 3 or 4; substituent Z1 is a carboxamide —CONH$_2$, p1 is 0, 1, 2, 3 or 4; substituent Q1 is a sulfonamide —SO$_2$NH$_2$, v1 is 0, 1, 2, 3 or 4. In another embodiment of a solution, at least partially conjugated substantially planar polycyclic molecular system $Sys_1$ is selected from the structures with general formula 30 to 44 shown in Table 2. In another embodiment of a solution, the organic molecules having a general structural formula II is selected from structures 45 to 53 shown in Table 3, where the molecular system $Sys_1$ is selected from the structures 30 and 37 to 44, the substituent is a sulfonic group —SO$_3$H, and m1, p1, and v1, are equal to 0. In still another embodiment of a negative dispersion retardation plate, the organic molecules having a general structural formula II further comprises at least one substituent selected from the list comprising CH$_3$, C$_2$H$_5$, Cl, Br, NO$_2$, F, CF$_3$, CN, OH, OCH$_3$, OC$_2$H$_5$, OCOCH$_3$, OCN, SCN, and NHCOCH$_3$. In yet another embodiment of a negative dispersion retardation plate, the partially conjugated substantially planar polycyclic organic molecules of the second type have a general structural formula III

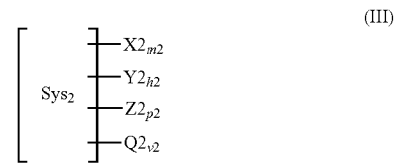

where $Sys_2$ is an at least partially conjugated substantially planar polycyclic molecular system having approximately (predominantly) board like form and having absorption in near-infrared wavelength range, X2, Y2, Z2, and Q2 are substituents; substituent X2 is a carboxylic group —COOH, m2 is 0, 1, 2, 3 or 4; substituent Y2 is a sulfonic group —SO$_3$H, h2 is 0, 1, 2, 3 or 4; substituent Z2 is a carboxamide —CONH$_2$, p2 is 0, 1, 2, 3 or 4; substituent Q2 is a sulfonamide —SO$_2$NH$_2$, v2 is 0, 1, 2, 3 or 4. In one embodiment of a solution, the organic molecules having a general structural formula III is selected from the structures with general formula 54 to 55 shown in Table 4. In another embodiment of a negative dispersion retardation plate, the partially conjugated substantially planar polycyclic organic molecules of the first type have a general structural formula IV

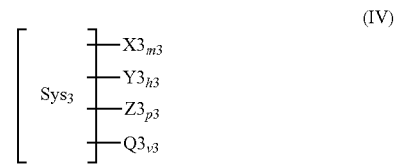

where $Sys_3$ is an at least partially conjugated substantially planar polycyclic molecular system having approximately (predominantly) disk form and having absorption in ultraviolet wavelength range, X3, Y3, Z3, and Q3 are substituents; substituent X3 is a carboxylic group —COOH, m3 is 0, 1, 2, 3 or 4; substituent Y3 is a sulfonic group —SO$_3$H, h3 is 0, 1, 2, 3 or 4; substituent Z3 is a carboxamide —CONH$_2$, p3 is 0, 1, 2, 3 or 4; substituent Q3 is a sulfonamide —SO$_2$NH$_2$, v3 is 0, 1, 2, 3 or 4.17. In still another embodiment of a negative dispersion retardation plate, the organic molecules having a general structural formula IV has at least partially conjugated substantially planar polycyclic molecular system $Sys_3$ selected from the structures with general formula 56 to 69 shown in Table 5. In yet another embodiment of a negative dispersion retardation plate, the partially conjugated substantially planar polycyclic organic molecules of the second type have a general structural formula V

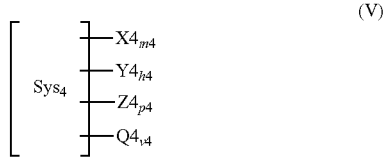

where $Sys_4$ is an at least partially conjugated substantially planar polycyclic molecular system having absorption in near-infrared wavelength range and having approximately (predominantly) disk form, X4, Y4, Z4, and Q4 are substituents; substituent X4 is a carboxylic group —COOH, m4 is 0, 1, 2, 3 or 4; substituent Y4 is a sulfonic group —$SO_3H$, h4 is 0, 1, 2, 3 or 4; substituent Z4 is a carboxamide —$CONH_2$, p4 is 0, 1, 2, 3 or 4; substituent Q4 is a sulfonamide —$SO_2NH_2$, v3 is 0, 1, 2, 3 or 4. In one embodiment of a negative dispersion retardation plate, the organic compound having a general structural formula V is selected from the structures with general formula 70 to 76 shown in Table 6.

In another embodiment of a negative dispersion retardation plate, longitudinal axes of the rigid rod-like polymer macromolecules coincide with longitudinal axes of said supramolecules. At least part of the supramolecules possesses anisotropic polarizability in a plane which is perpendicular to their longitudinal axis. The rigid rod-like polymer macromolecules and said supramolecules form a retardation layer of $B_A$-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy the following conditions: $n_x < n_z < n_y$ and $\partial \Delta n(\lambda)/\partial \lambda > 0$ over the whole visible spectral range, where $\Delta n = n_y - n_x$.

In one embodiment of a negative dispersion retardation plate, longitudinal axes of the rigid rod-like polymer macromolecules coincide with longitudinal axes of said supramolecules. The supramolecules possess isotropic polarizability in a plane which is perpendicular to their longitudinal axis. Said rigid rod-like polymer macromolecules and said supramolecules form a retardation layer of negative A-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy the following conditions: $n_x < n_y = n_z$ and $\partial \Delta n(\lambda)/\partial \lambda > 0$ over the whole visible spectral range, where $\Delta n = n_y - n_x$.

In another embodiment of the present invention, a negative dispersion retardation plate further comprises additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer. The optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer. The following conditions are satisfied: $|\partial \Delta n_{add}(\lambda)/\partial \lambda| < |\partial \Delta n(\lambda)/\partial \lambda|$, $\partial \Delta n(\lambda)/\partial \lambda < 0$ and $\partial R(\lambda)/\partial \lambda > 0$ over the whole visible spectral range, where $\Delta n_{add} = n_{x,add} - n_{y,add}$, $\Delta n = n_x - n_y$ and $R = (n_{x,add} - n_{y,add}) \cdot d_{add} + (n_x - n_y) \cdot d$.

In another embodiment of the present invention, a negative dispersion retardation plate further comprises additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer. The optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer. The following conditions are satisfied: $|\partial \Delta n(\lambda)/\partial \lambda| < |\partial \Delta n_{add}(\lambda)/\partial \lambda|$, $\Delta n_{add}(\lambda)/\partial \lambda < 0$ and $\partial R(\lambda)/\partial \lambda > 0$ over the whole visible spectral range, where $\Delta n_{add} = n_{x,add} - n_{y,add}$, $\Delta n = n_x - n_y$ and $R = (n_{x,add} - n_{y,add}) \cdot d_{add} + (n_x - n_y) \cdot d$.

In another embodiment of the present invention, the substrate is made of glass.

In one embodiment of a negative dispersion retardation plate, the molar portion $C_0$ equals to 0 and the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate. The supramolecules possess anisotropic polarizability in a plane which is perpendicular to their longitudinal axis and said supramolecules form a retardation layer of biaxial $B_A$-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy following conditions: $n_{x,sub} > n_{y,sub} = n_{z,sub}$, $n_x < n_z < n_y$ and $\partial R(\lambda)/\partial \lambda > 0$ over the whole visible spectral range, where $R = (n_{x,sub} - n_{y,sub}) \cdot d_{sub} + (n_x - n_y) \cdot d$.

In another embodiment of a negative dispersion retardation plate, the molar portion $C_0$ equals to 0 and the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate. The supramolecules possess isotropic polarizability in a plane which is perpendicular to their longitudinal axis and wherein said supramolecules form a retardation layer of negative A-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy following conditions: $n_{x,sub} > n_{y,sub} = n_{z,sub}$, $n_x < n_y = n_z$ and $\partial R(\lambda)/\partial \lambda > 0$ over the whole visible spectral range, where $R = (n_{x,sub} - n_{y,sub}) \cdot d_{sub} + (n_x - n_y) \cdot d$.

In still another embodiment of a negative dispersion retardation plate, the substrate material is selected from the list comprising poly ethylene terephtalate (PET), poly ethylene naphtalate (PEN), polyvinyl chloride (PVC), polycarbonate (PC), oriented poly propylene (OPP), poly ethylene (PE), polyimide (PI), and poly ester.

The present invention also provides an achromatic circular polarizer as disclosed hereinabove.

In one embodiment of an achromatic circular polarizer, the fixed optical phase delay is equal to π/2. In another embodiment, the fixed optical phase delay is equal to 3π/2. In one embodiment of an achromatic circular polarizer, the rigid rod-like polymer macromolecule comprises at least two building blocks connected to each other according to formula:

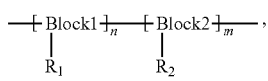

where Block1 and Block2 are selected independently from the following list:

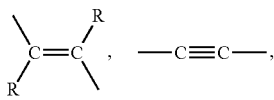

-Aryl-, -Cyclohexyl-

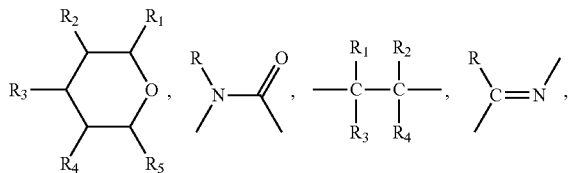

—CH2—O—, —N=N—;

n and m are integers from the range of 5 to 10000. Side-groups R, $R_1$, $R_2$, $R_3$, $R_4$, $R_5$ are selected independently from the list comprising H, Alkil, $SO_3H$, $(CH_2)_mSO_3H$, $PO_3H_2$, $(CH_2)_m$ Si(O Alkyl)$_3$, $CH_2$Phenyl, $(CH_2)_mOH$, $NH_2$, COOH, OH. Counterion M is selected from the list comprising $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$ and $NH_{4-k}Q_k^+$, where Q is selected from the list comprising linear and branched (C1-C20) alkyl, (C2-C20) alkenyl, (C2-C20) alkinyl, and (C6-C20)arylalkyl, and k is 0, 1, 2, 3 or 4. In another embodiment of an achromatic circular polarizer, the rigid rod-like polymer macromolecule has the general structural formula I or its salt

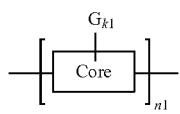

where Core is organic unit having absorption in ultraviolet and/or near infra-red wavelength range and comprising a set of ionogenic side-groups $G_{k1}$. Number n1 is of the organic units in the rigid rod-like polymer macromolecule which is equal to integers in the range from 10 to 10000, and k1 is equal to 0, 1, 2, 3, 4, 5, 6, 7, or 8. The ionogenic side-groups and the number k1 give rigidity to the rod-like macromolecule and the number n1 provides molecular anisotropy that promotes mesophases formation of macromolecules. In still another embodiment of an achromatic circular polarizer, the rigid rod-like polymer macromolecule is selected from structures 1 to 29 shown in Table 1. In yet another embodiment, the rigid rod-like polymer macromolecule of the general structural formula I further comprises additional side-groups independently selected from the list comprising linear and branched $(C_1-C_{20})$alkyl, $(C_2-C_{20})$alkenyl, and $(C_2-C_{20})$alkinyl In one embodiment of an achromatic circular polarizer, at least one of the additional side-groups is connected with the organic unit Core via a bridging group A selected from the list comprising —C(O)—, —C(O)O—, —C(O)—NH—, —(SO$_2$)NH—, —O—, —CH$_2$O—, —NH—, >N—, and any combination thereof. In another embodiment of an achromatic circular polarizer, the salt of the rigid rod-like polymer macromolecule of the general structural formula I is selected from the list comprising ammonium and alkali-metal salts. In still another embodiment, the rod-like macromolecule has a polymeric main rigid-chain, and wherein the conjugated organic units are the same. In yet another embodiment, the rigid rod-like macromolecule has a copolymeric main rigid-chain, and wherein at least one conjugated organic unit is different from the others. In one embodiment of an achromatic circular polarizer, the partially conjugated substantially planar polycyclic organic molecules of the first type have a general structural formula II

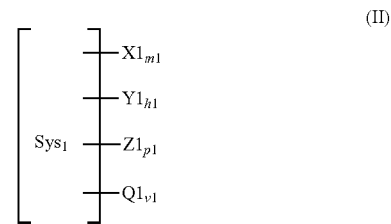

where $Sys_1$ is an at least partially conjugated substantially planar polycyclic molecular system having approximately (predominantly) board like form and having absorption in ultraviolet wavelength range, X1, Y1, Z1, and Q1 are substituents; substituent X1 is a carboxylic group —COOH, m1 is 0, 1, 2, 3 or 4; substituent Y1 is a sulfonic group —SO$_3$H, h1 is 0, 1, 2, 3 or 4; substituent Z1 is a carboxamide —CONH$_2$, p1 is 0, 1, 2, 3 or 4; substituent Q1 is a sulfonamide —SO$_2$NH$_2$, v1 is 0, 1, 2, 3 or 4. In another embodiment of a solution, at least partially conjugated substantially planar polycyclic molecular system $Sys_1$ is selected from the structures with general formula 30 to 44 shown in Table 2. In another embodiment, the organic molecules having a general structural formula II is selected from structures 45 to 53 shown in Table 3, where the molecular system $Sys_1$ is selected from the structures 30 and 37 to 44, the substituent is a sulfonic group —SO$_3$H, and m1, p1, and v1, are equal to 0. In still another embodiment of an achromatic circular polarizer, the organic molecules having a general structural formula II further comprises at least one substituent selected from the list comprising CH$_3$, C$_2$H$_5$, Cl, Br, NO$_2$, F, CF$_3$, CN, OH, OCH$_3$, OC$_2$H$_5$, OCOCH$_3$, OCN, SCN, and NHCOCH$_3$. In yet another embodiment, the partially conjugated substantially planar polycyclic organic molecules of the second type have a general structural formula III

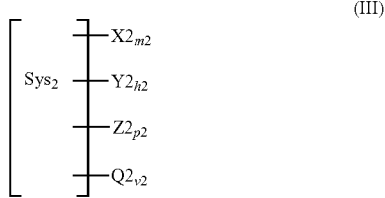

(III)

where $Sys_2$ is an at least partially conjugated substantially planar polycyclic molecular system having approximately (predominantly) board like form and having absorption in near-infrared wavelength range, X2, Y2, Z2, and Q2 are substituents; substituent X2 is a carboxylic group —COOH, m2 is 0, 1, 2, 3 or 4; substituent Y2 is a sulfonic group —SO$_3$H, h2 is 0, 1, 2, 3 or 4; substituent Z2 is a carboxamide —CONH$_2$, p2 is 0, 1, 2, 3 or 4; substituent Q2 is a sulfonamide —SO$_2$NH$_2$, v2 is 0, 1, 2, 3 or 4. In one embodiment, the organic molecules having a general structural formula III is selected from the structures with general formula 54 to 55 shown in Table 4. In another embodiment of an achromatic circular polarizer, the partially conjugated substantially planar polycyclic organic molecules of the first type have a general structural formula IV

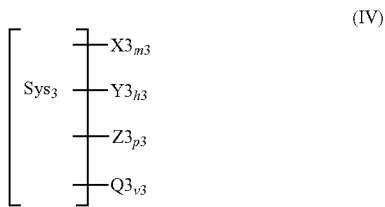

(IV)

where $Sys_3$ is an at least partially conjugated substantially planar polycyclic molecular system having approximately (predominantly) disk form and having absorption in ultraviolet wavelength range, X3, Y3, Z3, and Q3 are substituents; substituent X3 is a carboxylic group —COOH, m3 is 0, 1, 2, 3 or 4; substituent Y3 is a sulfonic group —SO$_3$H, h3 is 0, 1, 2, 3 or 4; substituent Z3 is a carboxamide —CONH$_2$, p3 is 0, 1, 2, 3 or 4; substituent Q3 is a sulfonamide —SO$_2$NH$_2$, v3 is 0, 1, 2, 3 or 4.17. In still another embodiment of an achromatic circular polarizer, the organic molecules having a general structural formula IV has at least partially conjugated substantially planar polycyclic molecular system $Sys_3$ selected from the structures with general formula 56 to 69 shown in Table 5. In yet another embodiment, the partially conjugated substantially planar polycyclic organic molecules of the second type have a general structural formula V

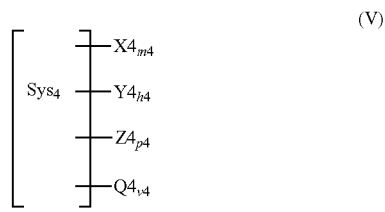

(V)

where $Sys_4$ is an at least partially conjugated substantially planar polycyclic molecular system having absorption in near-infrared wavelength range and having approximately (predominantly) disk form, X4, Y4, Z4, and Q4 are substituents; substituent X4 is a carboxylic group —COOH, m4 is 0, 1, 2, 3 or 4; substituent Y4 is a sulfonic group —SO$_3$H, h4 is 0, 1, 2, 3 or 4; substituent Z4 is a carboxamide —CONH$_2$, p4 is 0, 1, 2, 3 or 4; substituent Q4 is a sulfonamide —SO$_2$NH$_2$, v3 is 0, 1, 2, 3 or 4. In one embodiment of an achromatic circular polarizer, the organic compound having a general structural formula V is selected from the structures with general formula 70 to 76 shown in Table 6.

In another embodiment of an achromatic circular polarizer, longitudinal axes of the rigid rod-like polymer macromolecules coincide with longitudinal axes of said supramolecules. At least part of the supramolecules possesses anisotropic polarizability in a plane which is perpendicular to their longitudinal axis. The rigid rod-like polymer macromolecules and said supramolecules form a retardation layer of $B_A$-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy the following conditions: $n_x < n_z < n_y$ and $\partial \Delta n(\lambda)/\partial \lambda > 0$ over the whole visible spectral range, where $\Delta n = n_y - n_x$.

In one embodiment of an achromatic circular polarizer, longitudinal axes of the rigid rod-like polymer macromolecules coincide with longitudinal axes of said supramolecules. The supramolecules possess isotropic polarizability in a plane which is perpendicular to their longitudinal axis. Said rigid rod-like polymer macromolecules and said supramolecules form a retardation layer of negative A-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy the following conditions: $n_x < n_y = n_z$ and $\partial \Delta n(\lambda)/\partial \lambda > 0$ over the whole visible spectral range, where $\Delta n = n_y - n_x$.

In another embodiment of the present invention, an achromatic circular polarizer further comprises additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer. The optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer. The following conditions are satisfied: $|\partial \Delta n_{add}(\lambda)/\partial \lambda| < |\partial \Delta n(\lambda)/\partial \lambda|$, $\partial \Delta n(\lambda)/\partial \lambda < 0$ and $\partial R(\lambda)/\partial \lambda > 0$ over the whole visible spectral range, where $\Delta n_{add} = n_{x,add} - n_{y,add}$, $\Delta n = n_x - n_y$, and $R = (n_{x,add} - n_{y,add}) \cdot d_{add} + (n_x - n_y) \cdot d$.

In another embodiment of the present invention, a an achromatic circular polarizer further comprises additional layer based on lyotropic liquid crystal and characterized by thickness $d_{ada}$ and two principal refractive indices ($n_{x,addb}$ and $n_{y,add}$) corresponding to two mutually perpendicular directions in the plane of said layer and one principal refractive index ($n_{z,add}$) in the normal direction to said layer. The optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer. The following conditions are satisfied: $|\partial\Delta n (\lambda)/\partial\lambda|<|\partial\Delta n_{add}(\lambda)/\partial\lambda|$, $\Delta n_{add}(\lambda)/\partial\lambda<0$ and $\partial R(\lambda)/\partial\lambda>0$ over the whole visible spectral range, where $\Delta n_{add}=n_{x,add}-n_{y,add}$, $\Delta n=n_x-n_y$ and $R=(n_{x,add}-n_{y,add})\cdot d_{add}+(n_x-n_y)\cdot d$.

In another embodiment of the present invention, the substrate is made of glass.

In one embodiment of an achromatic circular polarizer, the molar portion $C_0$ equals to 0 and the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate. The supramolecules possess anisotropic polarizability in a plane which is perpendicular to their longitudinal axis and said supramolecules form a retardation layer of biaxial $B_A$-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy following conditions: $n_{x,sub}>n_{y,sub}=n_{z,sub}$, $n_x<n_z<n_y$ and $\partial R(\lambda)/\partial\lambda>0$ over the whole visible spectral range, where $R=(n_{x,sub}-n_{y,sub})\cdot d_{sub}+(n_x-n_y)\cdot d$.

In another embodiment of an achromatic circular polarizer, the molar portion $C_0$ equals to 0 and the substrate is a plate of positive A-type characterized by thickness $d_{rub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate. The supramolecules possess isotropic polarizability in a plane which is perpendicular to their longitudinal axis and wherein said supramolecules form a retardation layer of negative A-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer. These principal refractive indices satisfy following conditions: $n_{x,sub}>n_{y,sub}=n_{z,sub}$, $n_x<n_y=n_z$ and $\partial R(\lambda)/\partial\lambda>0$ over the whole visible spectral range, where $R=(n_{x,sub}-n_{y,sub})\cdot d_{sub}+(n_x-n_y)\cdot d$.

In still another embodiment of a negative dispersion retardation plate, the substrate material is selected from the list comprising poly ethylene terephtalate (PET), poly ethylene naphtalate (PEN), polyvinyl chloride (PVC), polycarbonate (PC), oriented poly propylene (OPP), poly ethylene (PE), polyimide (PI), and poly ester.

In order that the invention may be more readily understood, reference is made to the following examples, which are intended to be illustrative of the invention, but are not intended to be limiting the scope.

EXAMPLES

Example 1

This Example describes synthesis of poly(2,2'-disulfo-4,4'-benzidine terephtalamide) cesium salt (structure 1 in Table 1).

1.377 g (0.004 mol) of 4,4'-diaminobiphenyl-2,2'-disulfonic acid was mixed with 1.2 g (0.008 mol) of Cesium hydroxide and 40 ml of water, and stirred with dispersing stirrer till dissolution. 0.672 g (0.008 mol) of sodium bicarbonate was added to the solution and stirred. While stirring the obtained solution at high speed (2500 rpm) the solution of 0.812 g (0.004 mol) of terephthaloyl dichloride in dried toluene (15 mL) was gradually added within 5 minutes. The stirring was continued for 5 more minutes, and viscous white emulsion was formed. Then the emulsion was diluted with 40 ml of water, and the stirring speed was reduced to 100 rpm. After the reaction mass has been homogenized the polymer was precipitated via adding 250 ml of acetone. Fibrous sediment was filtered and dried.

Gel permeation chromatography (GPC) analysis of the sample was performed with Hewlett Packard 1050 chromatograph with diode array detector ($\lambda=230$ nm), using Varian GPC software Cirrus 3.2 and TOSOH Bioscience TSKgel G5000 $PW_{XL}$ column and 0.2 M phosphate buffer (pH=7) as the mobile phase. Poly(para-styrenesulfonic acid) sodium salt was used as GPC standard. The number average molecular weight Mn, weight average molecular weight Mw, and polydispersity P were found as $3.9\times10^5$, $1.7\times10^6$, and 4.4 respectively.

Example 2

This Example describes synthesis of poly(2,2'-disulfo-4,4'-benzidine sulfoterephthalamide) (structure 2 in Table 1).

10 g (40 mmol) of 2-sulfoterephtalic acid, 27.5 g (88.7 mmol) of triphenylphosphine, 20 g of Lithium chloride and 50 ml of pyridine were dissolved in 200 ml of N-methylpyrrolidone in a 500 ml three-necked flask. The mixture was stirred at 40° C. for 15 min and then 13.77 g (40 mmol) of 4,4'-diaminobiphenyl-2,2'-disulfonic acid were added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 3

This Example describes synthesis of poly(para-phenylene sulfoterephthalamide) (structure 3 in Table 1).

10 g (40 mmol) of 2-sulfoterephtalic acid, 27.5 g (88.7 mmol) of triphenylphosphine, 20 g of Lithium chloride and 50 ml of pyridine were dissolved in 200 ml of N-methylpyrrolidone in a 500 ml three-necked flask. The mixture was stirred at 40° C. for 15 min and then 4.35 g (40 mmol) of 1,4-phenylenediamine were added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 4

This Example describes synthesis of poly(2-sulfo-1,4-phenylene sulfoterephthalamide) (structure 4 in Table 1).

10 g (40 mmol) of 2-sulfoterephtalic acid, 27.5 g (88.7 mmol) of triphenylphosphine, 20 g of Lithium chloride and 50 ml of pyridine were dissolved in 200 ml of N-methylpyrrolidone in a 500 ml three-necked flask. The mixture was stirred at 40° C. for 15 min and then 7.52 g (40 mmol) of 2-sulfo-1,4-phenylenediamine were added. The reaction mixture was stirred at 115° C. for 3 hours. 1 L of methanol was added to the viscous solution, formed yellow precipitate was filtrated and washed sequentially with methanol (500 ml)

and diethyl ether (500 ml). Yellowish solid was dried in vacuo at 80° C. overnight. Molecular weight analysis of the sample via GPC was performed as described in Example 1.

Example 5

This Example describes synthesis of poly(2,2'-disulfo-4, 4'-benzidine naphthalene-2,6-dicarboxamide) cesium salt (structure 5 in Table 1).

0.344 g (0.001 mol) of 4,4'-diaminobiphenyl-2,2'-disulfonic acid was mixed with 0.3 g (0.002 mol) of Cesium hydroxide and 10 ml of water and stirred with dispersing stirrer till dissolution. 0.168 g (0.002 mol) of sodium bicarbonate was added to the solution and stirred. While stirring the obtained solution at high speed (2500 rpm) the solution of 0.203 g (0.001 mol) of terephthaloyl dichloride in dried toluene (4 mL) was gradually added within 5 minutes. The stirring was continued for 5 more minutes, and viscous white emulsion was formed. Then the emulsion was diluted with 10 ml of water, and the stirring speed was reduced to 100 rpm. After the reaction mass has been homogenized the polymer was precipitated via adding 60 ml of acetone. The fibrous sediment was filtered and dried. Molecular weight analysis of the sample via GPC was performed as described in Example 1.

Example 6

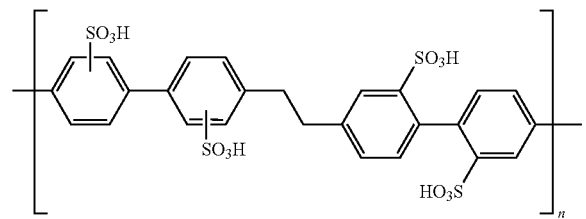

This example describes synthesis of Poly(disulfobiphenylene-1,2-ethylene-2,2'-disulfobiphenylene) (structure 6 in Table 1).

36 g of finely ground Bibenzyl in a Petri dish is set on a porcelain rack in a desiccator with an evaporating dish under the rack containing 80 g of bromine. The desiccator is closed but a very small opening is provided for the escape of hydrogen bromide. Bibenzyl is left in contact with the bromine vapors for overnight. Then a dish with bromine is removed from the desiccator and an excess of bromine vapors is evacuated by water pump. An orange solid substance is then recrystallized from 450 ml of isopropyl alcohol. The yield of 4,4'-dibromobibenzyl is 20 g.

To a stirred solution of 3 g of 4,4'-dibromobibenzyl in 100 ml of dry tetrahydrofuran under argon, a 5.4 ml of 2.5 M solution of butyllithium in hexane is added dropwise at −78° C. Mixture is stirred at this temperature for 6 hrs and a white suspension is produced. 6 ml of triisopropylborate is added, and a mixture is stirred overnight allowing temperature to rise to room temperature. 30 ml of water is added, and a mixture is stirred at room temperature for 4 hrs. Organic solvents are removed on a rotavapor (35° C., 40 mbar), then 110 ml of water is added, and a mixture is acidified with concentrated HCl. The product is extracted into diethyl ether (7×30 ml), the organic layer dried over magnesium sulfate, and the solvent is removed on a rotavapor. The residue is dissolved in 11 ml of acetone and reprecipitated into a mixture of 13 ml of water and 7 ml of concentrated hydrochloric acid. Yield of dipropyleneglycol ester of bibenzyl 4,4'-diboronic acid is 2.4 g.

100 g of 4,4'-diamino-2,2'-biphenyldisulfonic acid, 23.2 g of sodium hydroxide and 3500 ml of water are mixed and cooled to 0-5° C. A solution of 41 g of sodium nitrite in 300 ml of water is added, stirred for 5 min, and then 100 ml of 6M hydrochloric acid is added to the solution. A pre-cooled solution of 71.4 g of potassium bromide in 300 ml of water is added to the resulting dark yellow solution in 2 ml portions. After the potassium bromide has been added the solution is left to warm up to room temperate. Then the reaction mixture is heated and held at 90° C. for 16 hours. A solution of 70 g of sodium hydroxide in 300 ml of water is added, the solution is evaporated to a total volume of 400 ml, diluted with 2500 ml of methanol to precipitate the inorganic salts and filtered. Methanol is evaporated to 20-30 ml and 3000 ml of isopropanol is added. The precipitate is washed with methanol on the filter and recrystallized from methanol. Yield of 4,4'-Dibromo-2,2'-biphenyldisulfonic acid is 10.7 g.

Polymerization is carried out under nitrogen. 2.7 g of 4,4'-dihydroxy-2,2'-biphenyldisulfonic acid and 2.0 g of dipropyleneglycol ester of bibenzyl 4,4'-diboronic acid are dissolved in a mixture of 2.8 g of sodium hydrocarbonate, 28.5 ml of tetrahydrofuran and 17 ml of water. Tetrakis(triphenylphosphine)palladium(0) is added ($5\times10^{-3}$ molar equivalent compared to dipropyleneglycol ester of bibenzyl 4,4'-diboronic acid). The resulting suspension is stirred for 20 hrs. 0.04 g of bromobenzene is then added. After two more hours the polymer is precipitated by pouring it into 150 ml of ethanol. The product is washed with water, dried, and dissolved in toluene. The filtered solution is concentrated, and the polymer is precipitated in a 5-fold excess of ethanol and dried. Yield of polymer is 2.7 g.

8.8 g of 95% sulfuric acid is heated to 110° C. and 2.7 g of polymer is added. Temperature is raised to 140° C. and held for 4 hours. After cooling down to 100° C. 8 ml of water is added dropwise and mixture is left to cool down. The resulting suspension is filtered, washed with conc. hydrochloric acid and dried. Yield of the sulfonated polymer is ~2 g.

Example 7

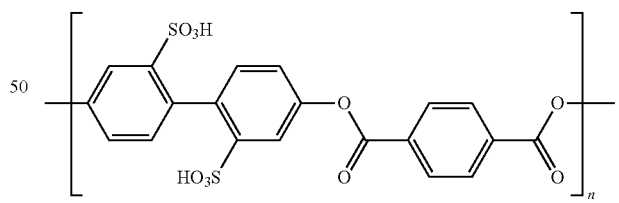

This Example describes synthesis of Poly(2,2'-disulfobiphenyl-dioxyterephthaloyl) (structure 7 in Table 1).

1.384 g (0.004 mol) of 4,4'-dihydroxybiphenyl-2,2'-disulfonic acid was mixed with 2.61 g (0.008 mol) of sodium carbonate and 40 ml of water in 500 ml beaker and stirred with dispersing stirrer until the solid completely dissolved. Dichloromethane (50 ml) was added to the solution. Upon stirring at high speed (7000 rpm) a solution of 0.812 g (0.004 mol) of terephthaloyl chloride in anhydrous dichloromethane (15 ml) was added. Stirring was continued for 30 minutes and 400 ml of acetone was added to the thickened reaction mass.

Solid polymer was crushed with a stirrer and separated by filtration. The product was washed three times with 80% ethanol and dried at 50° C.

Example 8

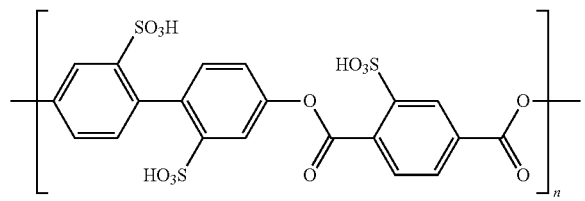

This Example describes synthesis of Poly(2,2'-disulfobiphenyl-2-sulfodioxyterephthaloyl) (structure 8 in Table 1).

1.384 g (0.004 mol) of 4,4'-dihydroxybiphenyl-2,2'-disulfonic acid was mixed with 3.26 g (0.010 mol) of sodium carbonate and 40 ml of water in 500 ml beaker, and stirred with a dispersing stirrer until the solid is completely dissolved. Dichloromethane (60 ml) was added to the solution. Upon stirring at high speed (7000 rpm) 1.132 g (0.004 mol) of 2-sulfoterephthaloyl chloride was added within 15 minutes. Stirring was continued for 3 hours, and 400 ml of acetone was added to the thickened reaction mass. Precipitated polymer was separated by filtration and dried at 50° C.

Example 9

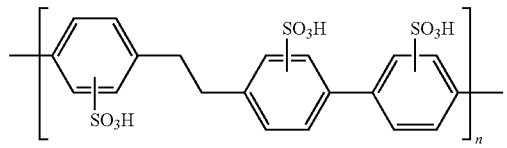

This Example describes synthesis of Poly(sulfophenylene-1,2-ethylene-2,2'-disulfobiphenylene) (structure 9 in Table 1).

36 g of finely ground bibenzyl in a Petri dish is set on a porcelain rack in a desiccatordesiccator with an evaporating dish under the rack containing 80 g of Bromine. The desiccator is closed with a very small opening for the escape of hydrogen bromide. Bibenzyl is left in contact with bromine vapors for overnight. Then a dish with bromine is removed from the desiccator, and an excess of bromine vapors was evacuated with a water pump. The orange solid substance is then recrystallized from 450 ml of isopropyl alcohol. Yield of 4,4'-dibromobibenzyl is 20 g.

A solution of 23.6 g of 1,4-dibromobenzene in 90 ml of dry tetrahydrofuran is prepared. 10 ml of the solution is added with stirring to 5.0 g of magnesium chips and few crystals of iodine in 60 ml of dry tetrahydrofuran, and a mixture was heated until reaction starts. Boiling conditions are maintained by the gradual addition of the rest of dibromobenzene solution. Then the reaction mixture is boiled for 8 hours and left overnight under argon at room temperature. The mixture is transferred through a hose to a dropping funnel by means of argon pressure and added to a solution of 24 ml of trimethylborate in 40 ml of dry tetrahydrofuran for 3 h at −78-70° C. (solid Carbon dioxide/acetone bath) and with vigorous stirring. The mixture is stirred for 2 hrs, then allowed to heat to room temperature with stirring overnight under argon. The mixture is diluted with 20 ml of ether and poured to a stirred mixture of crushed ice (200 g) and conc. $H_2SO_4$ (6 ml). In order to facilitate separation of the organic and aqueous layers 20 ml of ether and 125 ml of water are added, and the mixture is filtered. The aqueous layer is extracted with ether (4×40 ml), the combined organic extracts are washed with 50 ml of water, dried over Sodium sulfate and evaporated to dryness. The light brown solid is dissolved in 800 ml of chloroform and clarified.

The chloroform solution is evaporated almost to dryness, and the residual solid is recrystallized from benzene. A slightly yellowish precipitate is filtered off and dried. Yield of dipropyleneglycol ester of benzyne 1,4-diboronic acid is 0.74 g.

Polymerization is carried out under nitrogen. 2.7 g of 4,4'-dibromo-2,2'-bibenzyl and 1.9 g of dipropyleneglycol ester of benzyne 1,4-diboronic acid are added to a mixture of 2.8 g of sodium hydrocarbonate, 28.5 ml of tetrahydrofuran and 17 ml of water. Tetrakis(triphenylphosphine)palladium(0) is added ($5 \times 10^{-3}$ molar equivalent compared to dipropyleneglycol ester of benzyne 1,4-diboronic acid). The resulting suspension is stirred for 20 hrs. 0.04 g of bromobenzene is then added. After 2 more hours the polymer is precipitated by pouring it into 150 ml of ethanol. The product is washed with water, dried, and dissolved in toluene. The filtered solution is concentrated, and the polymer is precipitated in a 5-fold excess of ethanol and dried. Yield of polymer is 2.5 g.

8.8 g of 95% sulfuric acid is heated to 110° C. and 2.7 g of the polymer is added. Temperature is raised to 140° C. and held for 4 hours. After cooling down to room temperature 8 ml of water is added dropwise, and the mixture is left to cool down. The resulting suspension is filtered, washed with conc. hydrochloric acid and dried. Yield of the sulfonated polymer is 1.5 g.

Example 10

This Example describes synthesis of Poly(2-sulfophenylene-1,2-ethylene-2'-sulfophenylene) (structure 10 in Table 1).

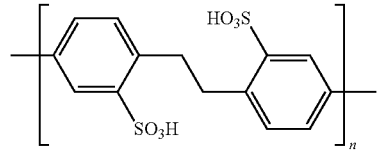

Polymerization is carried out under nitrogen. 10.2 g of 2,2'-[ethane-1,2-diylbis(4,1-phenylene)]bis-1,3,2-dioxaborinane, 10.5 g of 1,1'-ethane-1,2-diylbis(4-bromobenzene) and 1 g of tetrakis(triphenylphosphine)palladium(0) are mixed under nitrogen. Mixture of 50 ml of 2.4 M solution of potassium carbonate and 300 ml of tetrahydrofuran is degassed by nitrogen bubbling. Obtained solution is added to the first mixture. After that a reaction mixture is agitated at ~40° C. for 72 hours. The polymer is precipitated by pouring it into 150 ml of ethanol. The product is washed with water and dried. Yield of polymer is 8.7 g.

8.5 g of polymer is charged into 45 ml of 95% sulfuric acid. Reaction mass is agitated at ~140° C. for 4 hours. After cooling down to room temperature 74 ml of water is added dropwise, and the mixture is allowed to cool down. The resulting suspension is filtered, washed with conc. hydrochloric acid and dried. Yield of the sulfonated polymer is 8 g.

Example 11

This example describes synthesis of Poly(2,2'-disulfobiphenyl-2-sulfo-1,4-dioxymethylphenylene) (structure 11 in Table 1).

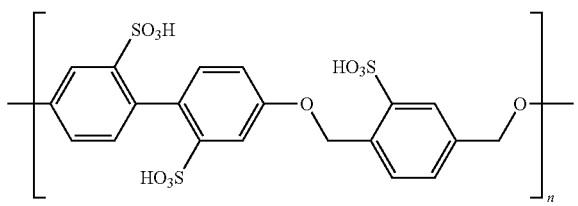

190 g of 4,4'-diaminobiphenyl-2,2'-disulfonic acid and 41.5 g of sodium hydroxide are dissolved in 1300 ml of water. 1180 g of ice is charged to this solution with stirring. Then 70.3 g of sodium nitrite, 230.0 ml of sulfuric acid and 1180 ml of water are added to the reaction mass which is then stirred for 1 hr at –2-0° C. Then it is filtered and washed with 2400 ml of icy water. A filter cake is suspended in 800 ml of water and heated to 100° C. Then water is distilled out until about ~600 ml of solution remained. 166 g of cesium hydroxide hydrate in 110 ml of water is added to the solution. Then it is added to 6000 ml of ethanol, the resulting suspension is stirred at room temperature, filtered and a filter cake is washed with 600 ml of ethanol and dried in vacuum oven at 45° C. Yield of 4,4'-dihydroxybiphenyl-2,2'-disulfonic acid is 230 g.

30 ml of 96% sulfuric acid and 21 g of p-xylene are mixed, heated to 100° C. and kept at this temperature for 15 min. A reaction mass is cooled to room temperature, quenched with 50 g water and ice. The resulting suspension is cooled to –10° C., filtered and an obtained filter cake was washed with cold hydrochloric acid (15 ml of conc. acid and 10 ml of water). The precipitate is squeezed and recrystallized from hydrochloric acid solution (40 ml of conc. acid and 25 ml of water). The white substance is dried under vacuum at 90° C. Yield of p-xylene sulfonic acid is 34 g.

A mixture of 35 ml of carbon tetrachloride, 2.5 g of p-xylene sulfonic acid, 4.8 g of N-bromosuccinimide and 0.16 g of benzoyl peroxide is heated with agitation to boiling and held at temperature 60 min. Then additional 0.16 g of benzoyl peroxide is added, and a mixture is kept boiling for additional 60 min. After cooling the product is extracted with 45 ml of water and recrystallized form 20% hydrochloric acid. Yield of 2,5-bis(bromomethyl)benzene sulfonic acid is approximately 1 g.

To a 25-ml flask equipped with a condenser and nitrogen inlet-outlet 0.23 g of 4,4'-dihydroxybiphenyl-2,2'-disulfonic acid, 1.2 ml of o-dichlorobenzene, 0.22 g of 2,5-bis(bromomethyl)benzene sulfonic acid, 1.2 ml of 10N sodium hydroxide, and 0.081 g of tetrabutylammonium hydrogen sulfate are successively added. A reaction mixture is stirred at 80° C. under nitrogen. After 6 hrs of reaction an organic layer is isolated and washed with water, followed by a diluted dydrochloric acid, and then with water once again. Then the solution is added to methanol to precipitate a white polymer. The polymer is then reprecipitated from acetone and methanol.

Example 12

This Example describes synthesis of a rigid rod-like macromolecule of the general structural formula 12 in Table 1, wherein $R_1$ is $CH_3$ and M is Cs.

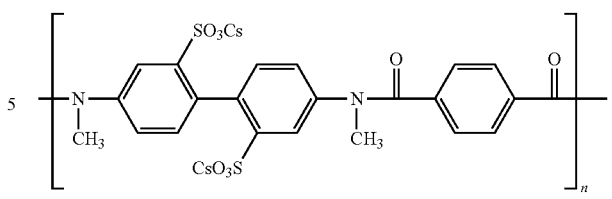

30 g 4,4'-Diaminobiphenyl-2,2'-disulfonic acid is mixed with 300 ml pyridine. 60 ml of acetyl chloride is added to a mixture with stirring, and the resulting reaction mass is agitated for 2 hrs at 35-45° C. Then it is filtered, the filter cake is rinsed with 50 ml of pyridine and then washed with 1200 ml of ethanol. The obtained alcohol wet solid substance is dried at 60° C. Yield of 4,4'-bis(acetylamino)biphenyl-2,2'-disulfonic acid pyridinium salt is 95%.

12.6 g 4,4'-bis(acetylamino)biphenyl-2,2'-disulfonic acid pyridinium salt is mixed with 200 ml DMF. 3.4 g sodium hydride (60% dispersion in oil) is added. The reaction mass is agitated 16 hrs at room temperature. 7.6 ml methyl iodide is added and the reaction mass is stirred 16 hrs at room temperature. Then the volatile components of the reaction mixture are distilled off and the residue washed with 800 ml of acetone and dried. The obtained 4,4'-bis[acetyl(methyl)amino]biphenyl-2,2'-disulfonic acid is dissolved in 36 ml of 4M sodium hydroxide. 2 g activated charcoal is added to the solution and stirred at 80° C. for 2 hrs. The liquid is clarified by filtration, neutralized with 35% HCl to pH~1 and reduced by evaporation to ~30% by volume. Then it is refrigerated (5° C.) overnight and precipitated material isolated and dried. Yield of 4,4'-bis[methylamino]biphenyl-2,2'-disulfonic acid is 80%.

2.0 g 4,4'-bis[methylamino]biphenyl-2,2'-disulfonic acid and 4.2 g cesium hydrocarbonate are mixed with 6 ml water. This solution is stirred with IKA UltraTurrax T25 at 5000 rpm for 1 min. 2 ml triethylene glycol dimethyl ether is added, followed by 4.0 ml of toluene with stirring at 20000 rpm for 1 min. Then solution of 1.2 g terephtaloyl chloride in 2.0 ml of toluene is added to the mixture at 20000 rpm. The emulsion of polymer is stirred for 60 min and then poured into 150 ml of ethanol at 20000 rpm. After 20 min of agitation the suspension of polymer is filtered on a Buchner funnel with a fiber filter, the resulting polymer dissolved in 8 ml of water, precipitated by pouring into of 50 ml of ethanol and dried 12 hrs at 70° C. Yield is 2.3 g.

Analytical control of synthesis and purity of final product (4,4'-bis[methylamino]biphenyl-2,2'-disulfonic acid) was carried out by ion-pair HPLC. HPLC analysis of the intermediate products and final product was performed with Hewlett Packard 1050 (Agilent, USA) system comprising automated sample injector, quatpump, thermostatted column compartment, diode array detector and ChemStation B10.03 software. Compounds were separated on a 15 cm×4.6 mm i.d., 5-μm particale, Dr. Maisch GmbH ReproSil-Pur Basic C18 column by use of a linear gradient prepared from acetonitrile (component A), water-solution of tetra-n-butylammonium bromide 0.01M (component B), and phosphate buffer 0.005M with pH=6.9-7.0 (component C). The gradient was: A-B-C 20:75:5 (v/v) to A-B-C 35:60:5 (v/v) in 20 min. The flow rate was 1.5 mL min$^{-1}$, the column temperature 30° C., and effluent was monitored by diode array detector at 230 and 300 nm.

Example 13

This Example describes synthesis of natrium salt of the polymer shown by structure 17 in Table 1.

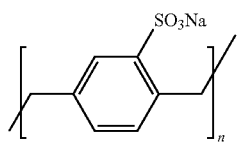

0.654 g of Copper (II) chloride (4.82 mmol, 0.07 eq) was dissolved into 410.0 ml (was degassed by evacuation and filled with argon, and then purged with argon) of water with stirring at ambient condition in 2500-ml beaker. 26.0 g of 2,5-bis-(bromomethyl)-benzenesulfonic acid (66.02 mmol) was added to the obtained solution and then 25.82 g of sodium bromide (250.88 mmol, 3.8 eq) was added into a whitish suspension. 115.5 ml of n-amyl alcohol was added to a reaction mixture with a simultaneous vigorous stirring. 10.03 g of sodium borohydride (264.08 mmol, 4.0 eq) in 52.0 ml of water was added in one portion to a reaction mixture with a simultaneous vigorous stirring. The resulting mixture was stirred for 10 min. A bottom water layer was isolated and this dark foggy solution was filtered through a double layer glass filter paper (D=185 mm). The resulting solution was filtered through a filter-membrane (Millipore, PHWP29325, mixed cellulose ester, 0.3 m) used Stirred Ultrafiltration Cell. Water was evaporated and 24.1 g of dry polymer was obtained. (Mn=20536, Mw=130480, Pd=6.3).

Example 14

This Example describes synthesis of natrium salt of the polymer shown by structure 20 in Table 1.

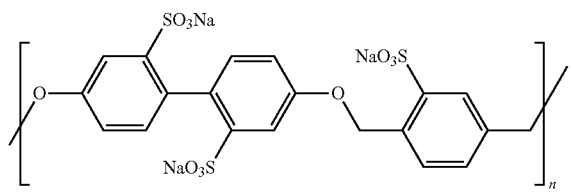

556 mg of 2,5-bis(bromomethyl)benzenesulfonic acid, 557 mg of 4,4'-dihydroxybiphenyl-2,2'-disulfonic acid and 500 mg of tetra-n-butylammonium bromide were dissolved in 10 ml of abs. n-methylpyrrolidone. 332 mg of 60% sodium hydride (5.1 eq.) was added by small portions to the solution, and mixture was stirred for 4 days at 50° C. After that, the mixture was poured into 100 ml of ethanol and filtered off. The precipitate was dissolved in water (~5 ml) and precipitated into 100 ml of ethanol and filtered off again.

340 mg of polymer was obtained with Mn=9K, Mw=15K.

Example 15

This Example describes synthesis of natrium salt of the polymer shown by structure 18 in Table 1.

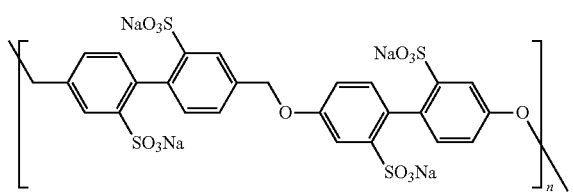

400 mg of 4,4'-bis(chloromethyl)biphenyl-2,2'-disulfonic acid, 337 mg of 4,4'-dihydroxybiphenyl-2,2'-disulfonic acid and 400 mg of tetra-n-butylammonium bromide were dissolved in 10 ml of abs. n-methylpyrrolidone. 238 mg of 60% sodium hydride (6.1 eq.) was added by small portions to this solution, and a mixture was stirred for 4 days at 50° C. After that, the mixture was poured into 100 ml of ethanol and filtered off. The precipitate was dissolved in water (~5 ml) and precipitated into 100 ml of ethanol and filtered off again.

330 mg of polymer was obtained with Mn=3K, Mw=5K.

Synthesis of Monomer for this Polymer was Done as Follows:

Intermediate 1

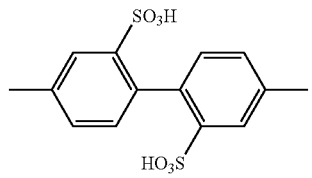

2-iodo-5-methylbenzenesulfonic acid (46 g, 137 mmol) was placed into a two-neck flask (volume 500 mL) and water (200 mL) was added. Blue copperas copper sulfate (0.25 g, 1 mmol) in water (40 mL) was added to resultant solution, and the obtained mixture was heated to 85° C. for 15 min. Copper powder was added (14. g, 227 mmol) to a dark solution. Temperature rose to 90° C., then reaction mixture was stirred for 3 h at 80-85°.

Reaction mixture was filtered twice, solution was concentrated to 75 mL on a rotary evaporator, cooled to 0° C., and ethanol was added dropwise (25 mL). The formed precipitate was filtered off and washed with ethanol and dried at 50° C. Yield was 28 g.

Intermediate 2

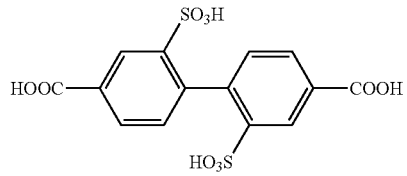 [SMILES: O=C(O)c1ccc(-c2ccc(C(=O)O)cc2S(=O)(=O)O)c(S(=O)(=O)O)c1]

4,4'-dimethylbiphenyl-2,2'-disulfonic acid (30.0 g, 71.7 mmol) was dissolved in water (600 mL), and sodium hydroxide was added (12 g, 300 mmol). A resultant solution was heated to 45-50° C., and potassium permanganate was added (72 g, 45 mmol) in portions for 1 h 30 min. A resultant mixture was stirred for 16 h at 50-54° C. then cooled to 40° C., methanol was added (5 mL) and temperature raised to 70° C. Mixture was cooled to 40° C., filtered from manganese oxide, clear colorless solution was concentrated to 100 mL acidified with hydrochloric acid (50 mL). A resultant mixture was left overnight, cooled to 0° C. and filtered off, washed with acetonitrile (100 mL, re-suspension) and diethylether, dried, and 13.5 g of fibrous white solid was formed.

Intermediate 3

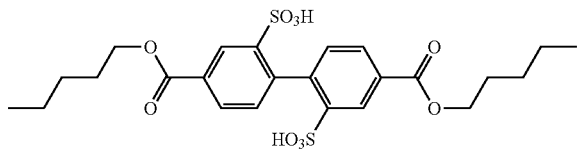 [SMILES: CCCCCOC(=O)c1ccc(-c2ccc(C(=O)OCCCCC)cc2S(=O)(=O)O)c(S(=O)(=O)O)c1]

2,2'-disulfobiphenyl-4,4'-dicarboxylic acid (7.5 g, 18.6 mmol) was mixed with n-pentanol (85 mL, 68 g, 772 mmol) and sulfuric acid (0.5 mL) and heated under reflux with a Dean-Stark trap for 3 more hours. A reaction mixture was cooled down to 50° C., diluted with hexane (150 mL), stirred at the same temperature for 10 min, then a precipitate was filtered off and washed with hexane (3×50 mL), then dried at 50° C. for 4 h. Weight was 8.56 g (84%) of a white solid substance.

Intermediate 4

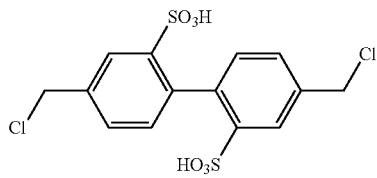

Anhydrous tetrahydrofuran (400 mL) was placed into a flask supplied with a condenser, magnetic stirrer, thermometer and argon T-tube. Lithium alumohydride (3.5 g, 92 mmol) was added to tetrahydrofuran, resultant suspension was heated to 50° C., and 4,4'-bis[(pentyloxy)carbonyl]biphenyl-2,2'-disulfonic acid was added in portions for 10 min with an efficient stirring (20.0 g, 37 mmol). A resultant suspension was mildly boiled under reflux (63-64° C.) for 1.5 h.

Reaction mixture was cooled down to 10°, and water was added with stirring until hydrogen evolution ceased (5-5.2 mL). Then mixture was diluted with anhydrous tetrahydrofuran (100 mL) to make stirring efficient. A resultant white suspension was transferred to a flask of 1 L volume, acidified with hydrochloric acid 36% (24 g). A sticky precipitate formed. It was well-stirred with a glass rod, and then a mixture was dried on a rotary evaporator, a residue was mixed with anhydrous tetrahydrofuran (100 mL), a solvent was removed on a rotary evaporator, a white solid residue was dried in a drying pistol at 67° C./10 mm Hg (boiling methanol) for 2 h. White pieces were powdered and dried for 1 more hour. A resultant weight was 30 g of a white powder substance. Calculated product content was approximately 1.25 mmol/g (50%) of diol in a mixture of inorganic salts (AlCl$_3$, LiCl) and solvating water.

Crude 4,4'-bis(hydroxymethyl)biphenyl-2,2'-disulfonic acid (3.0 g, 3 mmol) was mixed with hydrochloric acid 36% (10 mL) and stirred at 85° C. for 1.5 h. Gas hydrogen chloride was passed though a reaction mixture twice for 10 minutes after 15 minutes and after 1 h 20 minutes of heating. A clear solution was not formed but an almost clear suspension was observed. A reaction mixture was cooled to 0° with an ice-water bath, stirred under a flow of hydrochloric acid at the same temperature and a white precipitate was filtered off and dried over potassium hydroxide overnight in vacuo. Yield was 2.6 g.

Example 16

This Example describes synthesis of natrium salt of the polymer shown by structure 19 in Table 1.

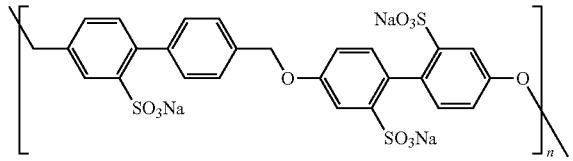

100 mg of 4,4'-bis(bromomethyl)biphenyl-2-sulfonic acid, 83 mg of 4,4'-dihydroxybiphenyl-2,2'-disulfonic acid and 80 mg of tetra-n-butylammonium bromide were dissolved in 2 ml of abs. n-methylpyrrolidone. 50 mg of 60% sodium hydride (5.1 eq.) was added by small portions to the solution, and a mixture was stirred for 4 days at 50° C. After that, a mixture was poured into 20 ml of ethanol and filtered off. The precipitate was dissolved in water (~2-3 ml), precipitated into 50 ml of ethanol and filtered off again.

100 mg of polymer was obtained with Mn=10K, Mw=23K.

Synthesis of Monomer for this Polymer was Done as Follows:

Intermediate 5

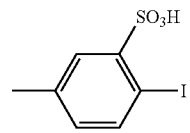

2-Sulfo-p-toluidine (50 g, 267 mmol) was mixed with water (100 mL) and hydrochloric acid 36% (100 mL). A mixture was stirred and cooled to 0° C. A solution of sodium nitrite (20 g, 289 mmol) in water (50 mL) was added slowly (dropping funnel, 1.25 h) while keeping temperature at 3-5° C. Then a resultant suspension was stirred for 1 h 45 min at 0-3° C., filtration produced a dark mass which was added wet in portions into a tall beaker supplied with a magnetic stirrer and thermometer and containing potassium iodide (66.5 g, 400 mmol) dissolved in 25% sulfuric acid (212 mL); temperature was kept around 10° C. during the adding step. Lots of nitrogen evolved, foaming, and a big magnetic bar was required. Then a reaction mixture was warmed to room temperature and 25% solution of sulfuric acid (200 mL) was added. Heating was continued with keeping temperature at 70° C. for 30 min, and 25% solution of sulfuric acid (150 mL) was added and stirred for some time. A mixture was hot filtered from black insoluble solids, and cooled to room temperature with stirring. Precipitate was formed, solution was dark. A precipitate was filtered on a Pall glass sheet, washed with ethanol-water 1:1 (100 mL), re-suspended (ethanol 100 mL) and filtered once again, washed on a filter with ethanol (50 mL) and dried in a stove at 50° C., a resultant compound is pale-brown. Yield was 46 g (57%).

Intermediate 6

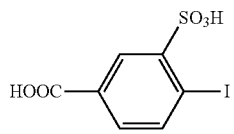

Water (500 mL) was poured into a one-neck flask (volume 1 L), followed by sodium hydroxide (6.5 g, 160 mmol) and 3-sulfo-4-iodotoluene (20.0 g, 67.1 mmol). A resultant solution was warmed up to 40° C. and a fine powder of potassium permanganate (31.8 g, 201 mmol) was introduced in small portions at intervals of 10 min into a well stirred liquid. Adding was carried out for 1 h 30 min. Temperature was kept at 40-45° C. (with bath) during adding. Then a reaction mixture was heated up to 75-80° C. (with bath) and left for 16 h at this temperature. A mixture of methanol-water 1:1 (5.5 mL) was added at 60° C., a dark suspension was cooled to 35-40° C. and filtered off. Clear transparent solution was acidified with hydrochloric acid 36% (130 mL) and concentrated on a rotary evaporator distilling approx. ⅓ of the solvent. A white precipitate was formed. Suspension was cooled on ice, filtered off, washed with acetonitrile (50 mL) and diethylether (50 mL). A white solid substance was dried in a stove at 50° C. until smell of hydrochloric acid disappeared (4 h). Yield was 22 g.

Intermediate 7

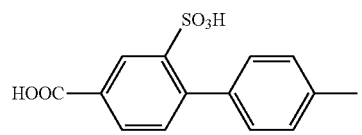 [SMILES: Cc1ccc(-c2ccc(C(=O)O)cc2S(=O)(=O)O)cc1]

Water (550 mL) was placed into a flask equipped with a thermometer, magnetic stirrer, argon inlet tube and bubble counter, heated to 40° C., and then potassium carbonate was added (40.2 g, 291 mmol), followed by 4-iodo-3-sulfobenzoic acid (19.1 g, 58.3 mmol) and 4-methylphenylboronic acid (8.33 g, 61.2 mmol). Apparatus was evacuated and filled with argon 4 times with stirring. Pd/C 10% (Aldrich, 1.54 mg, 1.46 mmol) was added and apparatus was flashed with argon 3 times more. Temperature of solution raised to 75-80° and a resultant mixture was stirred for 16 h under argon. The reaction mixture was cooled to 40° C., filtered twice and 36% hydrochloric acid was added dropwise (ice bath) until CO2 ceased to evolve (~55 g). A resultant suspension was cooled on ice, filtered off, washed in a beaker with acetonitrile (50 ml), filtered and washed with diethylether (50 mL) on the filter, then dried in a stove for 3 h at 45° C. Yield was 10.0 g (58%).

Intermediate 8

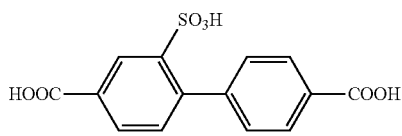

Water was placed (500 mL) into a two-neck flask (volume 0.5 L), followed by sodium hydroxide (4.4 g, 109 mmol) and 4'-methyl-2-sulfobiphenyl-4-carboxylic acid (10.0 g, 34.2 mmol). A resultant solution was warmed up to 40° C. (oil bath, inner temperature) and a finely powdered potassium permanganate (16.2 g, 102.6 mmol) was introduced in small portions at intervals of 10 min into a well stirred liquid. An adding was carried out for 45 min. Temperature was kept at 40-45° C. (bath) during this step. Then a reaction mixture was heated up to 50° C. (inner) and left for 18 h at this temperature with stirring. A mixture of methanol-water 1:1 (2 mL) was added at 45° C., a dark suspension was cooled to room temperature and filtered off. A clear transparent solution was acidified with hydrochloric acid 36% (13 g). A white precipitate was formed. Suspension was cooled on ice, filtered off, washed with acetonitrile (50 mL) in a beaker, filtered and washed with diethylether (50 mL) on a filter. White solid was dried in a stove at 50° C. until smell of hydrochloric acid disappeared (4 h). Yield was 7.5 g (68%)

Intermediate 9

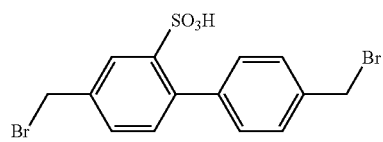 [SMILES: O=S(=O)(O)c1cc(CBr)ccc1-c1ccc(CBr)cc1]

Powdered 2-sulfobiphenyl-4,4'-dicarboxylic acid (7.5 g, 23.3 mmol) was mixed with anhydrous (dist. over magnesium) methanol (100 mL) and sulfuric acid (d 1.84, 2.22 mL, 4.0 g, 42.6 mmol). A resultant suspension was left with stirring and mild boiling for 2 days. Sodium carbonate (5.01 g, 47.7 mmol) was added to a methanol solution and stirred for 45 min, then evaporated on a rotary evaporator. Residue (white powder) was mixed with tetrahydrofuran to remove any large particles (100 mL), and a resultant suspension was dried on a rotary evaporator, then in a desiccator over phosphorus oxide under reduced pressure overnight. A resultant residue was used in a further transformation as it is.

A one-neck flask (volume 250 mL) containing dried crude 4,4'-bis(methoxycarbonyl)biphenyl-2-sulfonic acid and a magnetic stirrer and closed with a stopper was filled with tetrahydrofuran (anhydrous over sodium, 150 mL). White suspension was stirred for 20 min ar room temperature to insure its smoothness, then lithium alumohydride was added in portions (0.2-0.3 g) for 40 min. Exothermic effect was observed. Temperature raised to 45-50° C. Then joints were cleaned with soft tissue, and a flask was equipped with a condenser and argon bubble T-counter. A resultant suspension was heated with stirring (bath 74° C.) for 3 h.

Reaction mixture was cooled to 10° C. on ice, and water was added drop wise until hydrogen evolution (caution should be used here!) seized (4 mL). Hydrobromic acid (48%) was added in small portions until suspension became milky (43 g, acid reaction of indicator paper). The suspension was transferred to a flask of 0.5 L volume, and it was dried on a rotary evaporator. A 48-% hydrobromic acid was added to the flask (160 mL), a resultant muddy solution was filtered (PALL), and the flask was equipped with an h-tube with a thermometer and argon inlet tube. Apparatus was flashed with argon and placed on an oil bath. Stirring was carried out while temperature (inner) was raised to 75° C. for 15 min. After 7 minutes at this temperature formation of white precipitate was observed. Stirring was carried out for 1.5 h at 70-75° C., then suspension was cooled to 30° C., filtered off, a precipitate was washed with cold hydrobromic acid 48% (30 mL) on a filter, and lightly pressed. Filter cake was dried over sodium hydroxide in a desiccator under reduced pressure and periodically filling it with argon. Yield was 7.0 g (72% on diacid).

Example 17

This Example describes synthesis of 7-(4-sulfophenyl) dibenzo[b,d]thiophene-3-sulfonic acid 5,5-dioxide (structure 53 in Table 3).

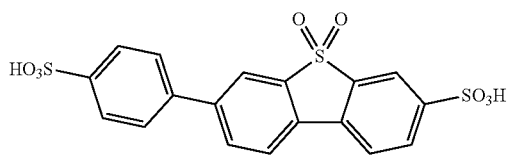 [SMILES: O=S(=O)(O)c1ccc(-c2ccc3c(c2)S(=O)(=O)c2cc(S(=O)(=O)O)ccc2-3)cc1]

7.83 g of p-Terphenyl was dissolved in 55 ml of 10% oleum at 10-20° C., and a mixture was stirred for 20 hrs at an ambient temperature. 20 g of ice was added to the formed suspension, and a mixture was cooled to 0° C. The solid was filtered and washed with 36% hydrochloric acid, dissolved in min amount of water (the solution was filtered from impurities) and precipitated with 36% hydrochloric acid. The product was filtered, washed with 36% hydrochloric acid and dried. Yield was 9.23 g.

Example 18

This Example describes preparation of polycyclic organic compound of structure 45 from Table 3

(II)

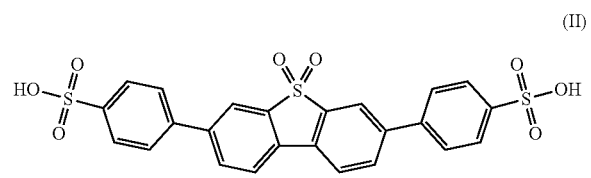 [SMILES: O=S(=O)(O)c1ccc(-c2ccc3c(c2)S(=O)(=O)c2cc(-c4ccc(S(=O)(=O)O)cc4)ccc2-3)cc1]

4,4'-(5,5-Dioxidodibenzo[b,d]thiene-3,7-diyl)dibenzenesulfonic acid was prepared by sulfonation of 1,1':4',1":4",1'''-quaterphenyl. 1,1':4',1":4",1'''-Quaterphenyl (10 g) was charged into 20% oleum (100 ml). A reaction mass was agitated for 5 hours at ambient conditions. After that the reaction mixture was diluted with water (170 ml). The final sulfuric acid concentration became ~55%. The precipitate was filtered and rinsed with glacial acetic acid (~200 ml). Filter cake was dried in oven at ~110° C. The process yielded 8 g of 4,4'-(5,5-dioxidodibenzo[b,d]thiene-3,7-diyl)dibenzenesulfonic acid.

The product was analyzed with $^1$H NMR (Brucker Avance-600, DMSO-$d_6$, δ, ppm) and showed the following results: 7.735 (d, 4H, 4CH$^{Ar}$(3,3',5,5')); 7.845 (d, 4H, 4CH$^{Ar}$(2,2',6, 6')); 8.165 (dd, 2H, 2CH$^{Ar}$(2,8)); 8.34 (m, 4H, 4CH$^{Ar}$(1,9,4, 6)). The electronic absorption spectrum of the product measured in an aqueous solution with Spectrometer UV/VIS Varian Cary 500 Scan showed the absorption maxima at $\lambda_{max1}$=218 nm (ε=3.42*10$^4$), $\lambda_{max2}$=259 nm (ε=3.89*10$^4$), and $\lambda_{max3}$=314 nm (ε=4.20*10$^4$). The mass spectrum of the product recorded using a Brucker Daltonics Ultraflex TOF/TOF is as follows: molecular ion (M$^-$=529), FW=528.57.

Example 19

The Example describes synthesis of a mixture of 9-carboxy-acenaphthoquinoxaline-2-sulfonamide and 9-carboxy-acenaphthoquinoxaline-5-sulfonamide (carboxy-derivative of the organic compound 57 of Table 5)

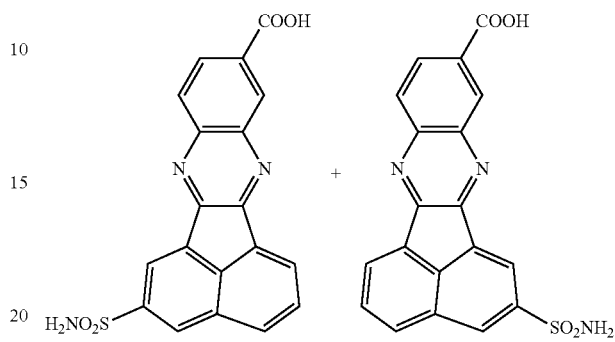

A. Synthesis of 9-carboxy-acenaphthoquinoxaline

A solution of 3.4-diaminobenzoic acid hydrochloride (1.88 g, 0.01 mol) in 75 ml of water was added to the suspension of acenaphthoquinone (1.82 g, 0.01 mol) in 80 ml of acetic acid. The reaction mixture was heated to 95-100° C., treated at this temperature for 15 min with stirring, and cooled. The precipitate was separated by filtration and washed with acetic acid. The final product yield was 2.6 g (87%). Mass spectrum (VISION 2000 spectrometer, negative ion reflection mode): m/z, 298.5; mol. wt., 298.29; electronic absorption spectrum (Ocean PC 2000 spectrometer, aqueous solution of ammonium salt): $\lambda_{max1}$=235 nm, and $\lambda_{max2}$=320 nm.

B. Synthesis of a mixture of 9-carboxy-acenaphthoquinoxaline-2-sulfonic acid and 9-carboxy-acenaphthoquinoxaline-5-sulfonic acid 9-Carboxy-acenaphthoquinoxaline (2.0 g, 0.0067 mol) was added to 20 ml of 30% oleum and kept with stirring for 3.5 h at 80-90° C. Then the reaction mixture was diluted with 36 ml of water, and the precipitate was separated by filtration, reprecipitated from acetic acid (100 ml), filtered, and washed with acetone. The final product yield was 1.92 g (76%). Mass spectrum (VISION 2000 spectrometer, negative ion reflection mode): m/z, 377.1; mol. wt., 378.36; electronic absorption spectrum (Ocean PC 2000 spectrometer, aqueous solution of ammonium salt): $\lambda_{max1}$=235 nm, and $\lambda_{max2}$=320 nm.

C. Synthesis of a mixture of chlorides of 9-carboxy-acenaphthoquinoxaline-2-sulfonic acid and 9-carboxy-acenaphthoquinoxaline-5-sulfonic acid A mixture of 9-carboxy-acenaphthoquinoxaline-2-sulfonic acid and 9-carboxy-acenaphthoquinoxaline-5-sulfonic acid (1.8 g, 0.0047 mol) was added to chlorosulfonic acid (18 ml). Then 0.3 g of NaCl was added, and the reaction mixture was kept with stirring for 3 hours at 80-85 oC, cooled, and poured into 350 g of ice. The precipitate was separated by filtration and washed until neutral pH with ice-cold water. The final product yield was 8-9 g of a filter-cake.

53

D. Synthesis of a mixture of
9-carboxy-acenaphthoquinoxaline-2-sulfonamide
and
9-carboxy-acenaphthoquinoxaline-5-sulfonamide The filter-cake of the mixture of chlorides of 9-carboxy-acenaphthoquinoxaline-2-sulfonic acid and 9-carboxy-acenaphthoquinoxaline-5-sulfonic acid (8-10 g) was added to 20 ml of ammonia, and the mixture was kept at 3-5° C. for 0.5 hour and then stirred under ambient conditions for 0.5 hour. The obtained ammonia solution was filtered and diluted with isopropanol (~30 ml). The precipitate was separated by filtration and washed on the filter with isopropanol. The final product yield was 1.2 g (67%). Mass spectrum (VISION 2000 spectrometer): m/z, 377.2; mol. wt., 377.37; electron absorption spectrum (Ocean PC 2000 spectrometer, aqueous solution of ammonium salt): $\lambda_{max1}$=235 nm, and $\lambda_{max2}$=320 nm. Elemental analysis: C, 60.22; H, 2.91; N, 11.11; anal calcd. for $C_{18}H_{10}N_2O_3S$: C, 60.47; H, 2.94; N, 11.13; O, 16.96; S, 8.50.

Example 20

The Example describes synthesis of a mixture of tricarboxy-5,11,17-trimethylbis[3,1]benzimidazo[1',2':3,4;1'',2'':5,6][1,3,5]triazino[1,2-a][3,1]benzimidazole-5,11,17-triium bromides (carboxy-derivative of the organic compound 56 of Table 5):

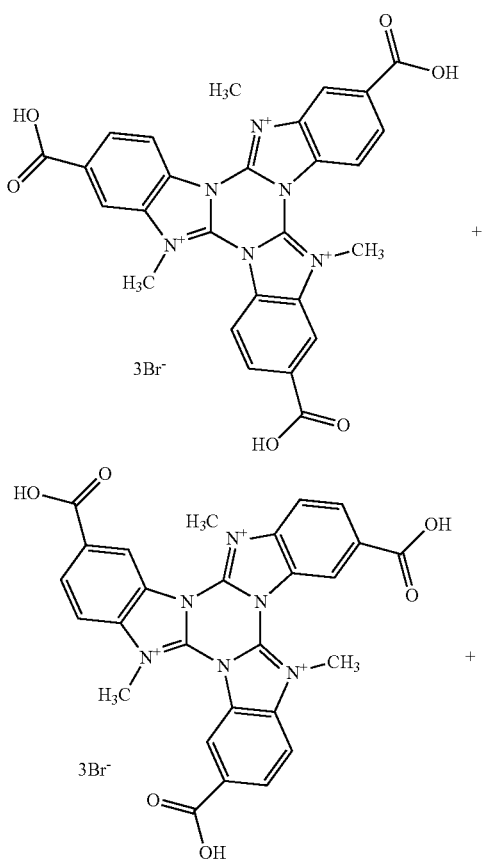

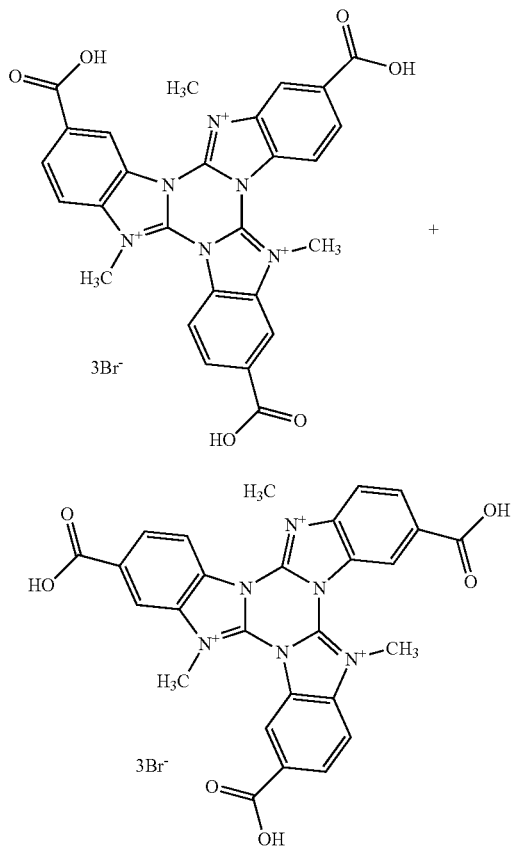

A. Synthesis of 1H-benzimidazole-6-carboxylic acid 3,4-Diaminobenzoic acid (20 g, 0.13 mol) was suspended in formic acid (120 ml) while cooling. After that hydrochloric acid (12 ml) was added. An obtained reaction mass was agitated for 24 hours at a room temperature. Reaction mixture was filtered through fiber glass filter. Then filter cake was dissolved in water (400 ml), pH was adjusted to 2.0 with ammonia solution and reaction mass was agitated overnight. Resulting suspension was filtered, pH of filtrate was adjusted to 3.0 with ammonia solution and reaction mass was agitated for two hours. Precipitate was filtered and dried at ~100° C. $H^1$NMR (Brucker Avance-300, DMSO-$d_6$, δ, ppm): 7.695 (d, H, $CH^{Ar}(7)$); 7.877 (dd, H, $CH^{Ar}(6)$); 8.25 (d, H, $CH^{Ar}(4)$); 8.44 (s, H, (s, H, $CH^{Ar}(2)$)); 12.82 (s, 2H, NH, COOH). Yield was 11.3 g (54%).

B. Synthesis of
2-bromo-1-methyl-1H-benzimidazole-5(6)-carboxylic acids

Solution of bromine (64 ml, 1.25 mol) in methanol (200 ml) was charged into suspension of 1H-benzimidazole-6-carboxylic acid (20 g, 0.12 mol) in methanol (270 ml) with cooling. Reaction mass was agitated for three days at a room temperature. After that solution volume was reduced down to 120 ml on a rotary evaporator. Obtained concentrate was added to acetone (1.7 l) and agitated overnight. Precipitate was filtered, rinsed with acetone and dried. $H^1$NMR (Brucker Avance-300, DMSO-$d_6$, δ, ppm): 3.94 (s, 3H, $CH_3$); 7.995 (d, H, $CH^{Ar}(7)$); 8.14 (dd, H, $CH^{Ar}(6)$); 8.39 (d, H, $CH^{Ar}(4)$); 9.79 (s, H, COOH). Yield was 20.5 g (65%).

C. Synthesis of tricarboxy-5,11,17-trimethylbis[3,1]benzimidazo[1',2':3,4;1'',2'':5,6][1,3,5]-triazino[1,2-a][3,1]benzimidazole-5,11,17-triium bromides 2-Bromo-1-methyl-1H-benzimidazole-5(6)-carboxylic acids (20 g, 0.08 mol) was charged into N-methylpyrrolidone (100 ml). Reaction mass was agitated for 6 hours at 150-155° C. After self cooling it was added to chloroform (2 l) and agitated for two hours. Precipitate was filtered. Filter cake was suspended in chloroform (700 ml), filtered and rinsed with chloroform. The product was dried at ~90° C. $H^1$NMR (Brucker Avance-300, DMSO-$d_6$, δ, ppm): 4.12 (s, 3H, $CH_3$); 4.14 (s, 3H, $CH_3$); 4.16 (s, 3H, $CH_3$); 4.18 (s, 3H, $CH_3$); 8.105 (m, 6H, 3*$CH^{Ar}CH^{Ar}$); 8.485 (m, 3H, 3*$CH^{Ar}$); 9.90 (s, H, $COOH^{Ar}$); 9.705 (m, 3H, COOH). The product was dried at ~90° C. Yield was 18.8 g (90%).

Example 21

The Example describes synthesis of a mixture of bisbenzimidazo[1',2':3,4;1'',2'':5,6][1,3,5]triazino[1,2-a]benzimidazole-trisulfonic acids (sulfo-derivative of the organic compound 56 of Table 5):

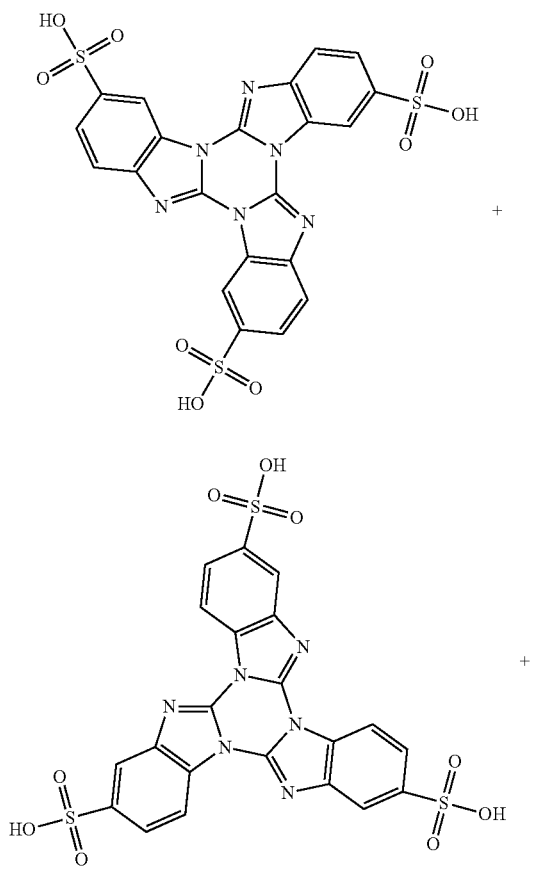

A. Synthesis of bisbenzimidazo[1',2':3,4;1'',2'':5,6][1,3,5]triazino[1,2-a]benzimidazole 2-Chloro-1H-Benzimidazole (4 g, 0.026 mol) was heated up to 200-220° C. and agitated for 30 minutes (until hydrogen chloride stopped to evolve). Nitrobenzene was added into a reaction mass and boiled for 25 minutes with agitation. After self cooling down to ~80° C. it was filtered and rinsed with acetone. Filter cake was dried at ~100° C. Yield was 2.1 g (70%).

B. Synthesis of a mixture of bisbenzimidazo[1',2':3,4;1'',2'':5,6][1,3,5]-triazino[1,2-a]benzimidazole-trisulfonic acids Bisbenzimidazo[1',2':3,4;1'',2'':5,6][1,3,5]triazino[1,2-a]benzimidazole (2.0 g, 0.006 mol) was charged into 20% oleum (20 ml) and agitated overnight. After that a reaction mass was diluted with water (28.2 ml). Precipitate was filtered and rinsed with concentrated hydrochloric acid, 1,4-dioxane and acetone. The product was dried in desiccator. Yield was 1.32 g (40%).

Example 22

The Example describes synthesis of a mixture of bisbenzimidazo[1',2':3,4;1'',2'':5,6][1,3,5]triazino[1,2-a]benzimidazole-tricarboxylic acids (carboxy-derivative of the organic compound 56 of Table 5):

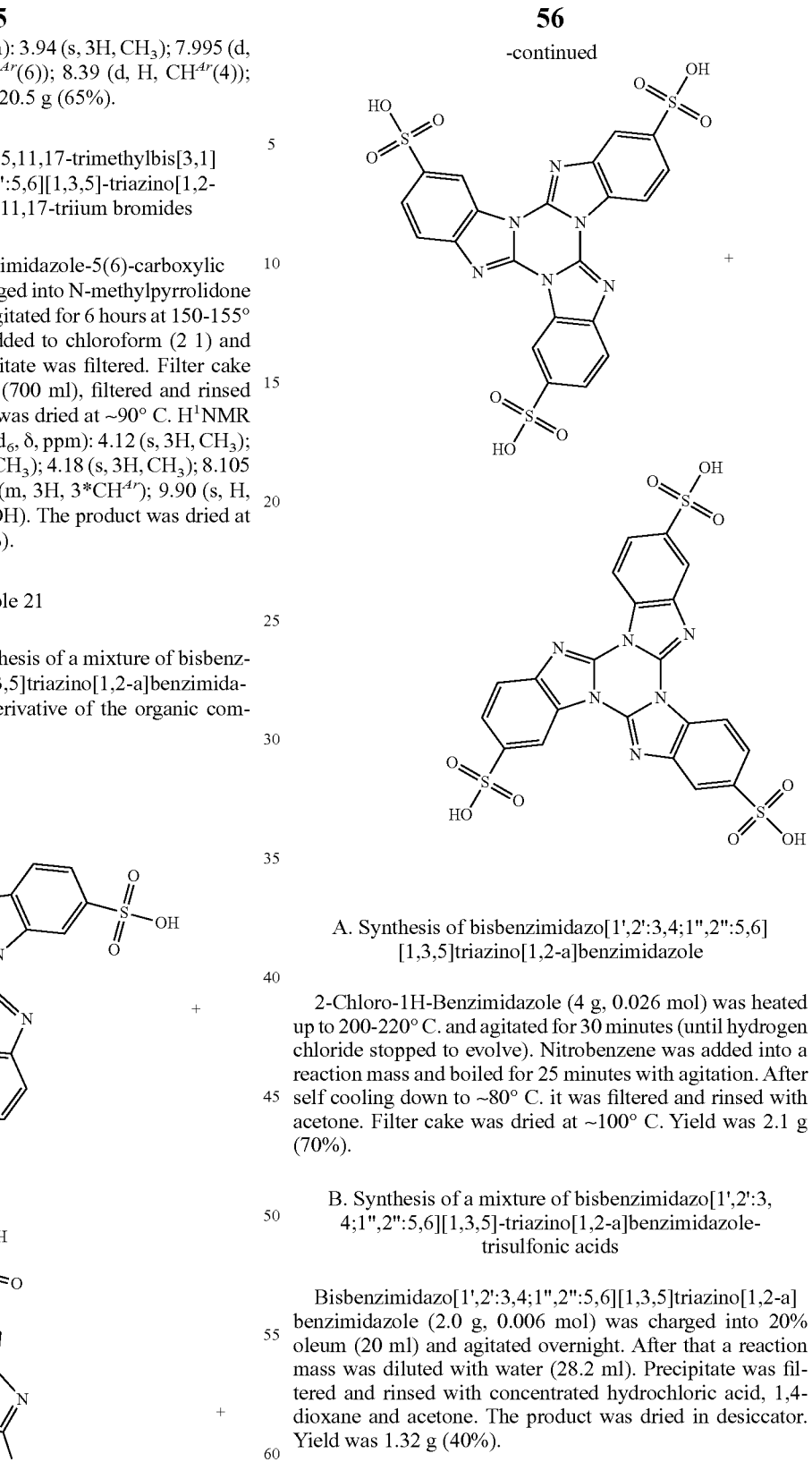

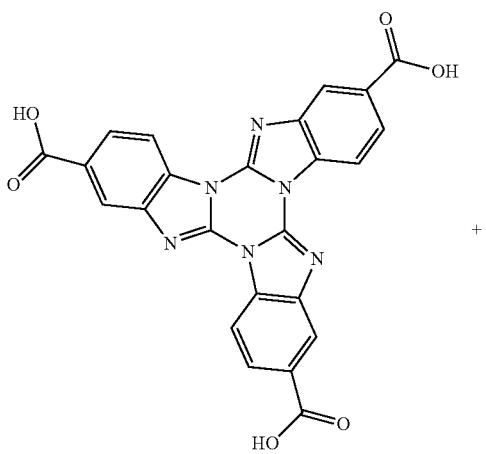

+

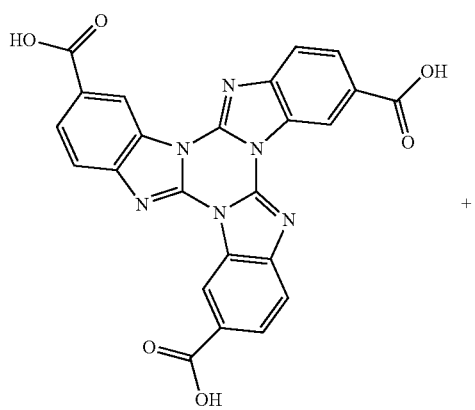

+

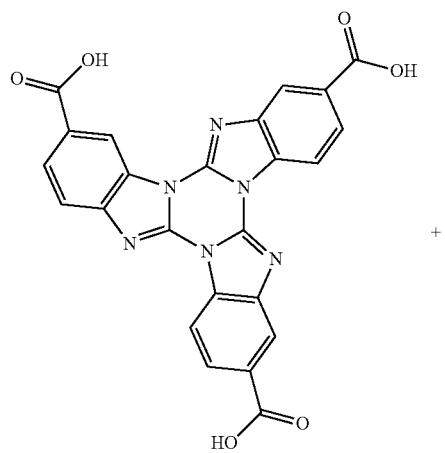

+

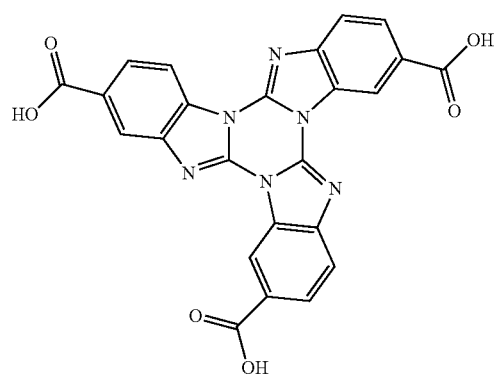

A. Synthesis of methyl 2-oxo-2,3-dihydro-1H-benzimidazole-6-carboxylate

Methyl 3,4-diaminobenzoate dihydrochloride (20 g, 0.08 mol) was mixed with urea (6.54 g, 0.11 mol). Reaction mixture was heated at ~150° C. for 7 hours. After cooling powder was suspended in water (400 ml) and pH of the last one was adjusted to 0.45 with hydrochloric acid. Precipitate was filtered and rinsed with water and hydrochloric acid (pH=1.5). Obtained filter cake was dried at ~100° C. Yield 15.7 g (97%).

B. Synthesis of methyl 2-chloro-1H-benzimidazole-6-carboxylate

Methyl 2-oxo-2,3-dihydro-1H-benzimidazole-6-carboxylate (43 g, 0.22 mol) was charged into phosphorus oxychloride (286 ml). Dry hydrogen chloride was bubbled through the boiling reaction mass for 12 hours. After cooling a reaction mass was poured into a mixture of ice and water (2 kg). Precipitate was filtered out. Filtrate was diluted with water (1.25 l) and ammonia solution (~800 ml), after that pH was adjusted to 5.6 with ammonia solution. Precipitate was filtered and rinsed with water. Yield was 39.5 g (84%).

C. Synthesis of trimethyl bisbenzimidazo[1',2':3,4;1'',2'':5,6][1,3,5]triazino[1,2-a]benzimidazole-tricarboxylates Methyl 2-chloro-1H-benzimidazole-6-carboxylate (38 g, 0.18 mol) was heated at 185-190° C. for 10 hours. Yield was 30.3 g (96%).

D. Synthesis of bisbenzimidazo[1',2':3,4;1'',2'':5,6][1,3,5]triazino[1,2-a]benzimidazoletricarboxylic acids Trimethyl bisbenzimidazo[1',2':3,4;1'',2'':5,6][1,3,5]triazino[1,2-a]benzimidazole-tricarboxylates (30 g, 0.06 mol) was charged into 5% solution of potassium hydroxide (250 ml) and boiled for 1.5 hour. After cooling an obtained solution was filtered and neutralized with hydrogen chloride solution, and pH of solution was adjusted to 1.25 with hydrochloric acid. Precipitate was filtered, rinsed with water and dried at ~100° C. Mass spectrum (Ultraflex TOF/TOF (Bruker Daltonics, Bremen, Germany)): M/Z=480 (FW=480.39). Yield was 26.3 g (95%).

Example 23

This Example describes synthesis of a mixture of sulfonamide-carboxylic acids of 6,7-dihydrobenzimidazo[1,2-c]quinazoline-6-one, which is performed according to the following scheme (carboxy-derivative of the organic compound 58 of Table 5):

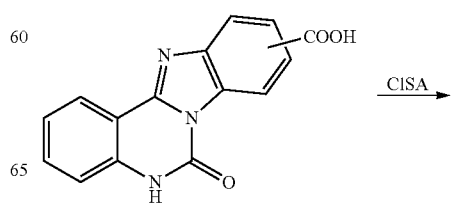

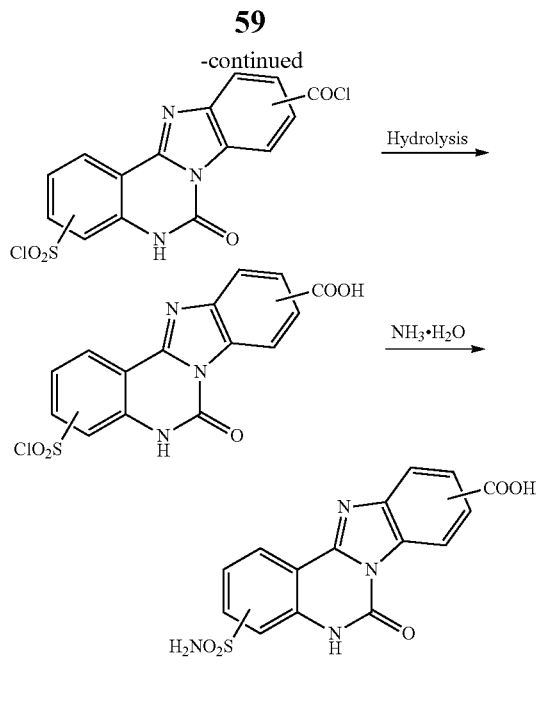

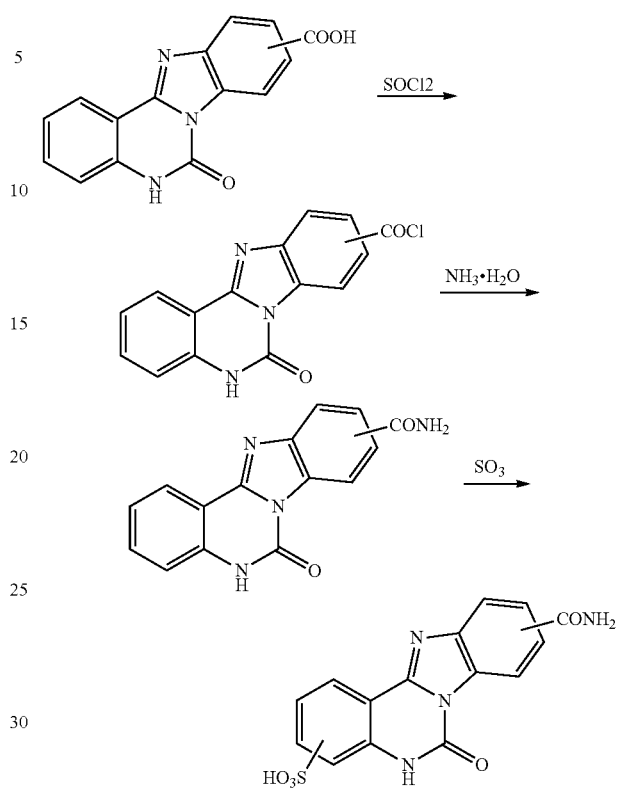

A mixture of 6,7-dihydrobenzimidazo[1,2-c]quinazoline-6-one-9-carboxylic acid and 6,7-dihydrobenzimidazo[1,2-c]quinazoline-6-one-10-carboxylic acid (5.0 g) is stirred with chlorosulfonic acid (50 ml) at 95° C. for 4 hour. Then the reaction mass is poured into ice (150 g). The precipitate is separated by filtration and washed with ice-cold water (100 ml) until neutral reaction of the washed water. According to HPLC data, the residue on the filter contained 91.5% of the target product and 5% of a carboxysulfonic acid derivative.

This residue is introduced by small portions into an aqueous ammonia solution (50 ml), and the mixture is stirred for about one hour at room temperature, and then the ammonia solution is acidified to pH 2.5 by adding sulfuric acid. The precipitate is filtered, suspended in 3% hydrochloric acid (100 ml), and filtered again. The residue is washed with water (60 ml). This procedure yielded 3.9 g of 2(3)-sulfonamide-6,7-dihydrobenzimidazo[1,2-c]quinazoline-6-one-9-carboxylic acid and 2(3)-sulfonamide-6,7-dihydrobenzimidazo[1,2-c]quinazoline-6-one-10-carboxylic acid mixture (the product comprises 87% of the target compound and 5% of a carboxysulfonic acid derivative). The precipitate is air dried at 105° C.

Mass spectrum of the product recorded using a Vision 2000 spectrometer is as follows: m/z, 358.6; mol. wt., 358.04. Electronic absorption spectrum of an aqueous solution of the product measured using an Ocean PC 2000 UV/VIS spectrophotometer showed the absorption maxima at $\lambda_{max1}$=325 nm and $\lambda_{max2}$=335-340 nm. Elemental analyses gave the following results (%): C, 50.28; H, 2.81; N, 15.64; S, 8.95 (anal. calcd. for $C_{15}H_{10}N_4O_5S$); C, 50.63; H, 2.88; N, 16.01 (found).

Example 24

This Example describes synthesis of a mixture of 2(3)-sulfo-6,7-dihydrobenzimidazo[1,2-c]quinazoline-6-one-9-carboxylic acid amide and 2(3)-sulfo-6,7-dihydrobenzimidazo[1,2-c]quinazoline-6-one-10-carboxylic acid amide.

At first, this example describes synthesis of a mixture of 6,7-dihydrobenzimidazo[1,2-c]quinazoline-6-one-9-carboxylic acid amide and 6,7-dihydrobenzimidazo[1,2-c]quinazoline-6-one-10-carboxylic acid amide, which is performed according to the following scheme (derivative of the organic compound 58 of Table 5):

Mixture of 9-carboxy-6,7-dihydrobenzimidazo[1,2-c]quinazolin-6-one (6 g) with thionyl chloride (60 ml) is boiled for 2.5 hours. A final reaction mixture is filtered, and a residue is washed with carbon tetrachloride (50 ml). After vacuum drying, the precipitate is gradually introduced into an aqueous ammonia solution (90 ml) with cooling on ice-cold water bath, so that temperature of the reaction mixture is kept around 5° C. The obtained suspension is stirred for 30 min at the indicated temperature and then heated to 45° C. and stirred at this temperature for 30 min. The precipitate is filtered hot and washed with water (130 ml). The precipitate is air dried at 105° C. This procedure yielded 4.3 g of mixture of 6,7-dihydrobenzimidazo[1,2-c]quinazoline-6-one-9-carboxylic acid amide and 6,7-dihydrobenzimidazo[1,2-c]quinazoline-6-one-10-carboxylic acid amide (the target compound content according to HPLC is 96.0%).

Mass spectrum of the product recorded using a Vision 2000 spectrometer is as follows: m/z, 278.2; mol. wt., 278.08. Electronic absorption spectrum of an aqueous solution of the product measured using an Ocean PC 2000 UV/VIS spectrophotometer showed the absorption maxima at $\lambda_{max1}$=245-250 nm and $\lambda_{max2}$=335-340 nm. Elemental analyses gave the following results (%): C, 64.74; H, 3.62; N, 20.13; (anal. calcd. for $C_{15}H_{10}N_4O_2$); C, 64.53; H, 3.86; N, 20.01 (found).

Finally, this Example describes synthesis of a mixture of 2(3)-sulfo-6,7-dihydrobenzimidazo[1,2-c]quinazoline-6-one-9-carboxylic acid amide and 2(3)-sulfo-6,7-dihydrobenzimidazo[1,2-c]quinazoline-6-one-10-carboxylic acid amide.

Mixture of 6,7-dihydrobenzimidazo[1,2-c]quinazoline-6-one-9-carboxylic acid amide and 6,7-dihydrobenzimidazo[1,2-c]quinazoline-6-one-10-carboxylic acid amide (4.0 g) is stirred with 20% oleum (40 ml) for 1 hour at room temperature. The reaction mass is diluted with water (68 ml) and the precipitate is separated by filtration and washed twice at slurrying with 3% hydrochloric acid (150 ml×2). The precipitate is air dried at 100° C. The procedure yielded 4.2 g of mixture of 2(3)-sulfo-6,7-dihydrobenzimidazo[1,2-c]quinazoline-6-one-9-carboxylic acid amide and 2(3)-sulfo-6,7-dihydrobenzimidazo[1,2-c]quinazoline-6-one-10-carboxylic acid amide.

Mass spectrum of the product recorded using a Vision 2000 UV/VIS spectrometer (negative ion reflection mode) is as follows: m/z, 358.6; mol. wt., 358.04. Electronic absorption spectrum of an aqueous solution of the product measured using an Ocean PC 2000 UV/VIS spectrophotometer showed the absorption maxima at $\lambda_{max1}$=325 nm and $\lambda_{max2}$=335-340 nm. Elemental analyses gave the following results (%): C, 50.28; H, 2.81; N, 15.64; (anal. calcd. for $C_{15}H_{10}N_4O_5S$); C, 49.94; H, 2.93; N, 16.00 (found).

Example 25

Figure 2:
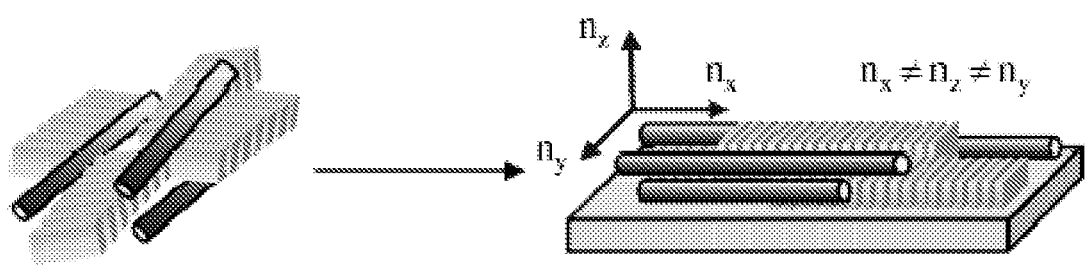
FIG. 2 schematically shows a mutual position of kinetic units of PBDT and organic compound 45 in bulk LLC solution and after deposition onto a substrate.

This Example describes preparation of a retarder according to the present invention. The guest-host system based on 4,4'-(5,5-dioxidodibenzo[b,d]thiene-3,7-diyl)dibenzenesulfonic acid (structural formula 45) and poly(2,2'-disulfo-4,4'-benzidine terephthalamide) also known as PBDT in literature is used (structural formula 1). Separately these components are capable of forming lyotropic nematic phase at proper concentrations and can be used to prepare the retardation films with fixed optical anisotropy. In case of organic compound 45, the nematic LLC phase is based on biaxial supramolecules of a first type, whereas the nematic phase of organic compound I is formed by rigid rod-like polymer macromolecules. The ratio of the two compounds varies over a wide range, and consequently the terminology distinguishing the guest and host type molecules is quite conditional. In this Example the organic compound 45 is considered as the host molecules, independent of the concentration. When both water solutions are mixed, the guest-host nematic LLC was got with the axes of PBDT macromolecules being preferably parallel to the axes of molecular stacks of organic compound 45. Guest-host LLCs show shear-thinning behavior typical of nematic liquid crystals. FIG. 1 shows dependence of viscosity of guest-host LLC vs. shear rate, wherein (a) pure organic compound 45, 10.7 wt %; (b) guest-host system having weight ratio PBDT: (organic compound 45)=17:83, 16.2 solid wt %, PBDT Mn=25,000; (c) guest-host system having weight ratio PBDT: (organic compound 45)=64:36, 7.3 solid wt %, PBDT Mn=145,000; (d) pure PBDT, 20 wt %, Mn=25,000. The process of deposition of the guest-host LLC onto a substrate was resulted in formation of the guest-host solid anisotropic layer with one of the principal axes along the coating direction. FIG. 2 schematically shows a mutual position of kinetic units of PBDT and organic compound 45 in a bulk LLC solution and after deposition onto a substrate. The control of principal refractive indices of the guest-host system is based on a superposition of guest and host macroscopic polarizability tensors characterized by coinciding principal axes but different Eigen (principal) values.

Figure 3:
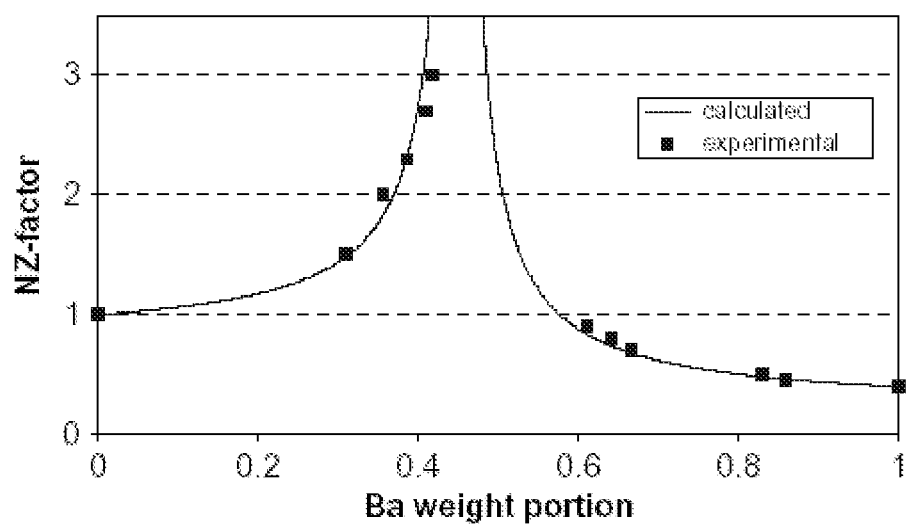
FIG. 3 shows NZ-factor of the solid retardation film vs. weight portion of biaxial BA-plate component (organic compound 45) in the liquid crystalline solution.

Mixtures with several different ratios of organic compound 45 to PBDT were investigated. The experimental dependence of the NZ-factor of composite films on the weight portion of organic compound 45 in the liquid crystalline solution is presented in FIG. 3. One can see that the NZ-factor can be tuned in a wide range.

The spectral dispersion of the birefringence of the retardation layer can also be controlled efficiently. This is an important feature for applications. Indeed, despite the individual guest- and host-materials showing strong spectral dispersion of the principal refractive indices, the resultant spectral dependence of the retardation provided by the composite layer can be negligible or even inversed (anomalous dispersion). This is because in the mixture the system of rigid rod-like polymer macromolecules performs as a positive A-type material, while the columnar supramolecules perform as a negative material. Thus, the effect of compensation by the spectral dispersion for the birefringence is observed. The principal axis of highest refraction index and highest dispersion of the polymer material coincides with the axis of the lowest refractive index and lowest dispersion of the supramolecules, and vice versa meaning the axes of highest refractive indices with strong dispersion of the supramolecules correspond to the lowest dispersion of the polymer. Thus in A-composite material the spectral dispersion for the two principal refractive indices was equalized, and as a result dispersion of birefringence is reduced. By controlling difference between spectral dependencies of the principal refractive indices with strong dispersion for the individual guest- and host-materials, one can efficiently control the resultant dispersion of birefringence.

What is claimed is:

1. A nematic lyotropic liquid crystal solution comprising a water or water-based solvent, and
a multi-component composition comprising
a rigid rod-like polymer macromolecule having absorption in ultraviolet and/or near infra-red wavelength range,
a supramolecule of a first type having absorption in ultraviolet wavelength range andformed via π-π-interaction by partially conjugated substantially planar polycyclicorganic molecules of a first type having absorption in ultraviolet wavelength range,
a supramolecule of a second type having absorption in near-infrared wavelength range and formed via π-π-interaction by partially conjugated substantially planar polycyclicorganic molecules of a second type having absorption in near-infrared wavelength range and
a supramolecule of a third type having absorption in ultraviolet and near-infrared wavelength ranges and formed via π-π-interaction by mix of partially conjugated substantially planar polycyclic organic molecules of the first and second types.

2. A solution according to claim 1, wherein the rigid rod-like polymer macromolecule comprises at least two building blocks connected to each other according to formula:

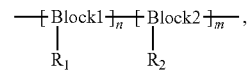

where Block1 and Block2 are selected independently from the group consisting of:

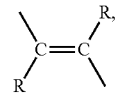

—C≡C—, -Aryl-, -Cyclohexyl-,

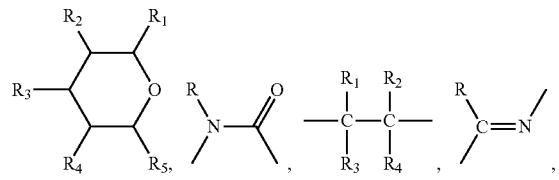

—CH2-O—, —N═N—;

n and m are integers from the range of 5 to 10000;
side-groups R, $R_1$, $R_2$, $R_3$, $R_4$, $R_5$ are selected independently from the group consisting of —H, linear or branched ($C_1$-$C_{20}$) alkyl, —$SO_3M$, —$(CH_2)_m SO_3M$, —PO$_3$M$_2$, —(CH$_2$)$_m$Si(O Alkyl)$_3$, —CH$_2$Phenyl, —(CH$_2$)$_m$OH, —NH$_2$, —COOM, —OH, and M is a counterion selected from the group consisting of H$^+$, Na$^+$, K$^+$, Li$^+$, Cs$^+$, Ba$^{2+}$, Ca$^{2+}$, Mg$^{2+}$, Sr$^{2+}$, Pb$^{2+}$, Zn$^{2+}$, La$^{3+}$, Ce$^{3+}$, Y$^{3+}$, Yb$^{3+}$, Gd$^{3+}$, Zr$^{4+}$ and NH$_{4-k}$Q$_k^+$, where Q is selected from the group consisting of linear and branched (C$_1$-C$_{20}$) alkyl, (C$_2$-C$_{20}$) alkenyl, (C$_2$-C$_{20}$) alkynyl, and (C$_6$-C$_{20}$) arylalkyl, and k is 0, 1, 2, 3 or 4.

3. A solution according to claim 1, wherein the rigid rod-like polymer macromolecule has the general structural formula I or its salt

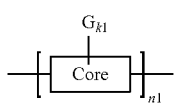
(I)

where Core is organic unit having absorption in ultraviolet and/or near infra-red wavelength range and comprising a set of ionogenic side-groups G$_{k1}$, wherein n1 is number of the organic units in the rigid rod-like polymer macromolecule which is equal to integers in the range from 10 to 10000, and k1 is equal to 0, 1, 2, 3, 4, 5, 6, 7, or 8.

4. A solution according to claim 1, wherein the rigid rod-like polymer macromolecule is selected from structures 1 to 29:

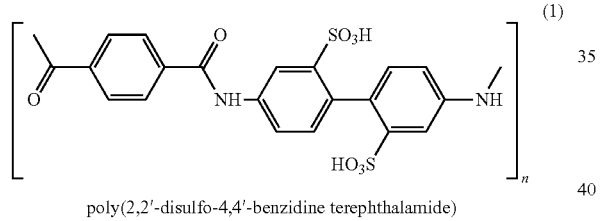
(1)
poly(2,2'-disulfo-4,4'-benzidine terephthalamide)

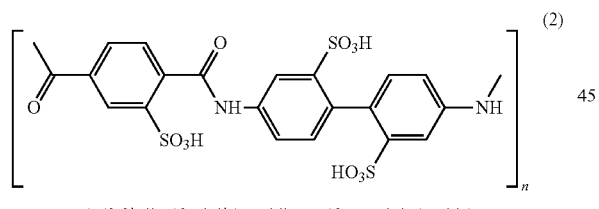
(2)
poly(2,2'-disulfo-4,4'-benzidine sulfoterephthalamide)

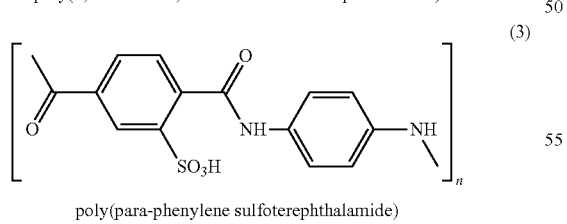
(3)
poly(para-phenylene sulfoterephthalamide)

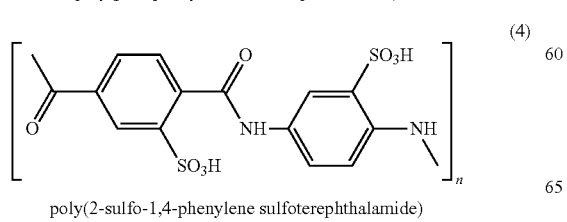
(4)
poly(2-sulfo-1,4-phenylene sulfoterephthalamide)

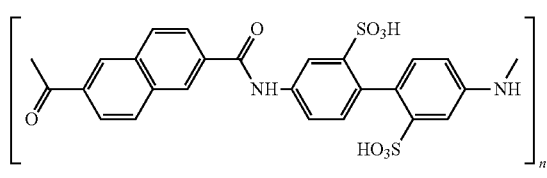
(5)
poly(2,2'-disulfo-4,4'-benzidine naphthalene-2,6-dicarboxamide)

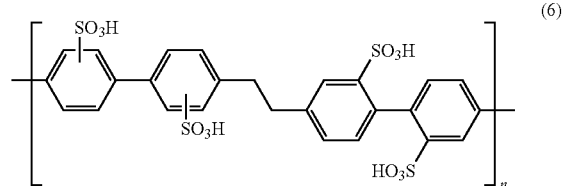
(6)
Poly(disulfobiphenylene-1,2-ethylene-2,2'-disulfobiphenylene)

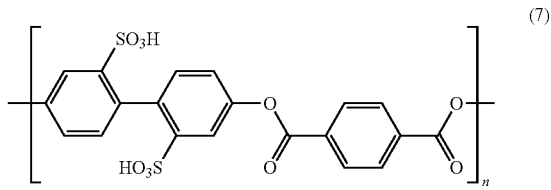
(7)
Poly(2,2'-disulfobiphenyl-dioxyterephthaloyl)

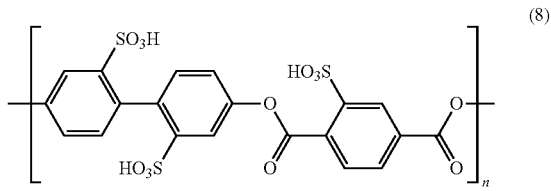
(8)
Poly(2,2'-disulfobiphenyl-2-sulfodioxyterephthaloyl)

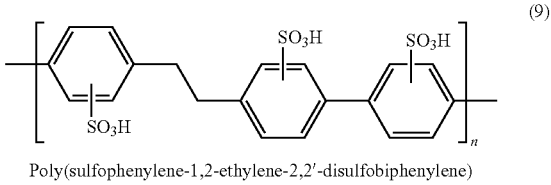
(9)
Poly(sulfophenylene-1,2-ethylene-2,2'-disulfobiphenylene)

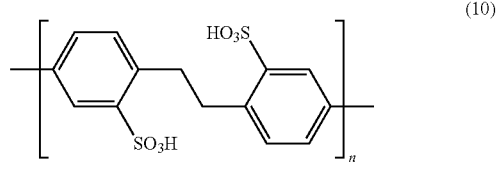
(10)
Poly(2-sulfophenylene-1,2-ethylene-2'-sulfophenylene)

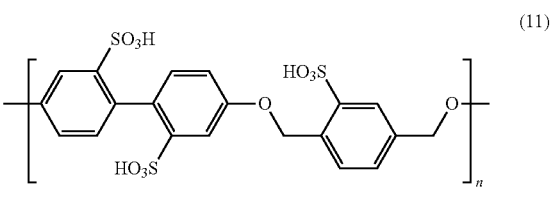
(11)
Poly(2,2'-disulfobiphenyl-2-sulfo-1,4-dioxymethylphenlene)

-continued (12)

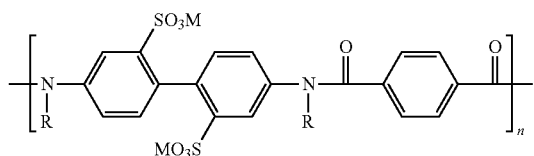

where R is a side-group selected from the group consisting of linear or branched —(C$_1$-C$_{20}$)-alkyl, —(CH$_2$)$_m$SO$_3$M, —(CH$_2$)$_m$Si(O-alkyl)$_3$, —CH$_2$-phenyl, —(CH$_2$)$_m$OH and M is a counterion selected from group consisting of H$^+$, Na$^+$, K$^+$, Li$^+$, Cs$^+$, Ba$^{2+}$, Ca$^{2+}$, Mg$^{2+}$, Sr$^{2+}$, Pb$^{2+}$, Zn$^{2+}$, La$^{3+}$, Ce$^{3+}$, Y$^{3+}$, Yb$^{3+}$, Gd$^{3+}$, Zr$^{4+}$, and NH$_{4-k}$Q$_k^+$, where Q is selected from the group consisting of linear and branched (C$_1$-C$_{20}$) alkyl, (C$_2$-C$_{20}$) alkenyl, (C$_2$-C$_{20}$) alkynyl, and (C$_6$-C$_{20}$) arylalkyl, and $k$ is 0, 1, 2, 3 or 4;

(13)

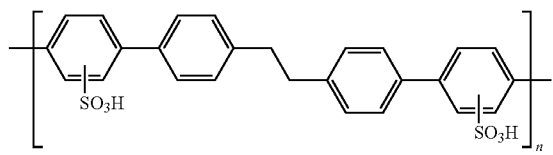

Poly(disulfo-quaterphenylethylene)

(14)

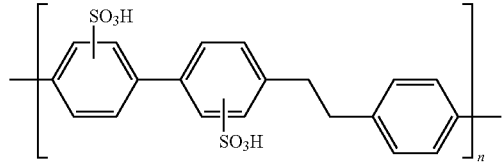

Poly(disulfo-terphenylethylene)

(15)

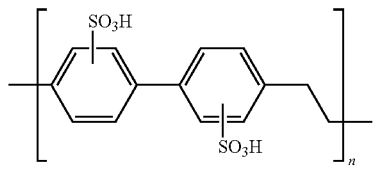

Poly(disulfo-biphenylethylene)

(16)

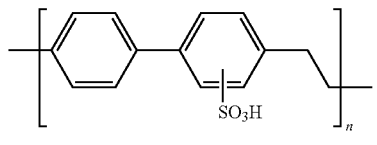

Poly(sulfo-biphenylethylene)

(17)

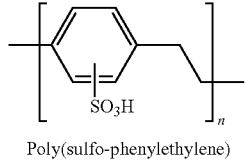

Poly(sulfo-phenylethylene)

(18)

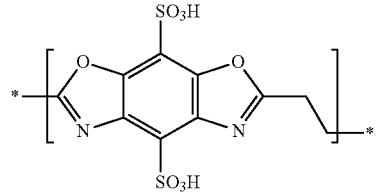

Poly(4,9-disulfobenzo[1,2-d;5,4-d']bisoxazole-1,7-ethylene)

(19)

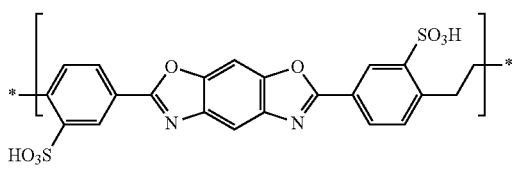

Poly(benzo[1,2-d;5,4-d']bisoxazole-1,7-[1,1'-ethane-1,2-diyl-2-2'-disulfodibenzene])

(20)

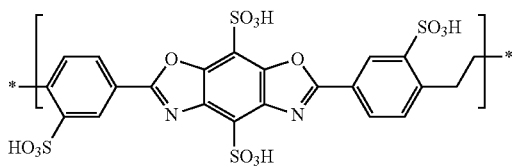

Poly(4,9-disulfobenzo[1,2-d;5,4-d']bisoxazole-1,7-[1,1'-ethane-1,2-diyl-2,2'-disulfodibenzene])

(21)

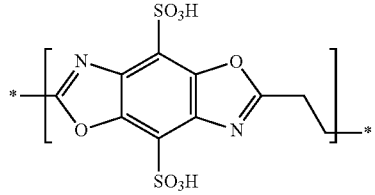

Poly(4,9-disulfobenzo[1,2-d;4,5-d']bisoxazole-1,7-ethylene)

(22)

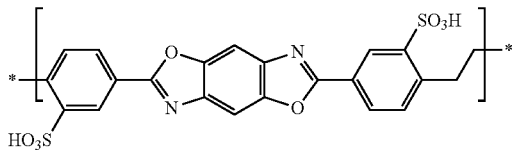

Poly(benzo[1,2-d;4,5-d']bisoxazole-1,7-[1,1'-ethane-1,2-diyl-2,2'-disulfodibenzene])

(23)

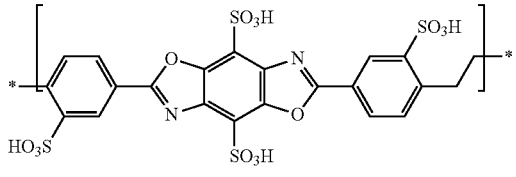

Poly(4,9-disulfobenzo[1,2-d;4,5-d']bisoxazole-1,7-[1,1'-ethane-1,2-diyl-2,2'-disulfodibenzene])

(24)

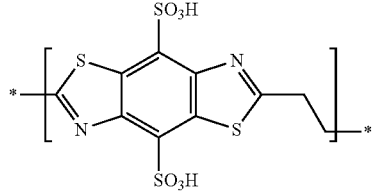

Poly(4,9-disulfobenzo[1,2-d;4,5-d']bisthiazole-1,7-ethylene)

-continued (25)

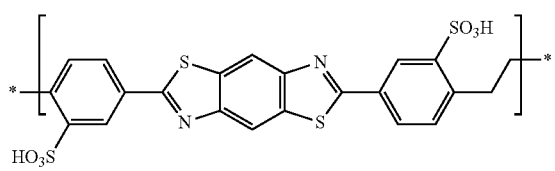

Poly(benzo[1,2-d;4,5-d']bisthiazole-1,7-[1,1'-ethane-1,2-diyl-2,2'-disulfodibenzene])

(26)

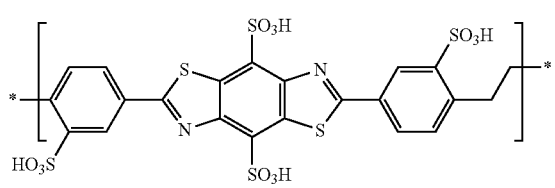

Poly(4,9-disulfobenzo[1,2-d;4,5-d;]bisthiazole-1,7-[1,1'-ethane-1,2-diyl-2,2'-disulfodibenzene])

(27)

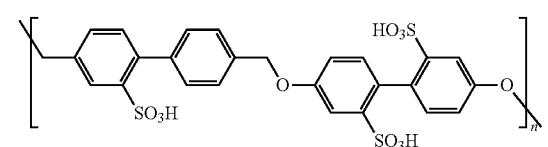

Poly((4,4'-dimethylen-1-sulfobiphenyl)-(4,4'-dioxi-1,1'-disulfobiphenyl) ether)

(28)

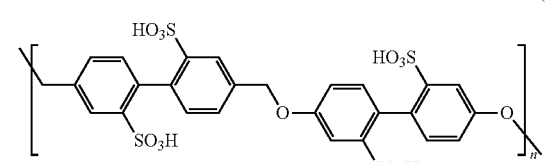

Poly((4,4'-dimethylen-1,1'-disulfobiphenyl)-(4,4'-dixoxi-1,1'-disulfobiphenyl) ether)

(29)

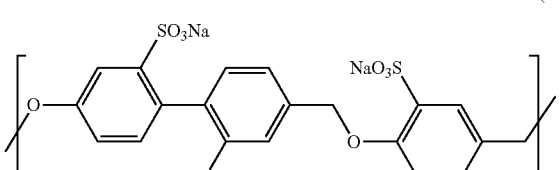

Poly((1,4-dimethylen-2-sulfophenyl)-(4,4'-dioxi-1,1'-disulfobiphenyl) ether)

where n=5-10000.

5. A solution according to claim 3, wherein the rigid rod-like polymer macromolecule of the general structural formula I further comprises additional side-groups connected with the organic unit Core of structural formula I independently selected from the group consisting of linear and branched $(C_1\text{-}C_{20})$ alkyl, $(C_2\text{-}C_{20})$ alkenyl, and $(C_2\text{-}C_{20})$ alkynyl.

6. A solution according to claim 5, wherein at least one of the additional side-groups is connected with the organic unit Core of structural formula I via a bridging group A selected from the group consisting of —C(O)—, —C(O)O—, —C(O)—NH—, —(SO$_2$)NH—, —O—, —CH$_2$O—, —NH—, >N—, and any combination thereof.

7. A solution according to claim 3, wherein the salt of the rigid rod-like polymer macromolecule of the general structural formula I is selected from the group consisting of ammonium and alkali-metal salts.

8. A solution according to claim 3, wherein the rigid rod-like macromolecule has a polymeric main rigid-chain, and wherein the conjugated organic units are the same.

9. A solution according to claim 3, wherein the rigid rod-like macromolecule has a copolymeric main rigid-chain, and wherein at least one conjugated organic unit is different from the others.

10. A solution according to claim 1, wherein the partially conjugated substantially planar polycyclic organic molecules of the first type have a general structural formula II

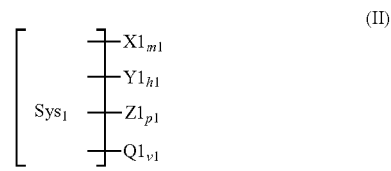

(II)

where Sys$_1$ is an at least partially conjugated substantially planar polycyclic molecular system having elongated form and having absorption in ultraviolet wavelength range, X1, Y1, Z1, and Q1 are substituents; substituent X1 is a carboxylic group —COOH, m1 is 0, 1, 2, 3 or 4; substituent Y1 is a sulfonic group —SO$_3$H, h1 is 0, 1, 2, 3 or 4; substituent Z1 is a carboxamide —CONH$_2$, p1 is 0, 1, 2, 3 or 4; substituent Q1 is a sulfonamide —SO$_2$NH$_2$, v1 is 0, 1, 2, 3 or 4.

11. A solution according to claim 10, wherein the at least partially conjugated substantially planar polycyclic molecular system Sys$_1$ is selected from the structures of general formulas 30 to 44:

(30)

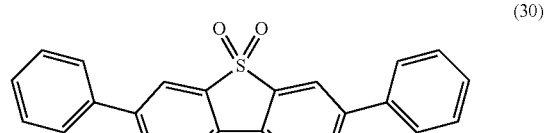

(31)

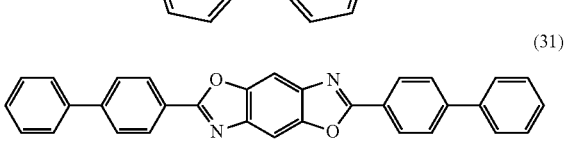

(32)

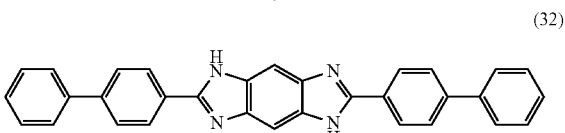

(33)

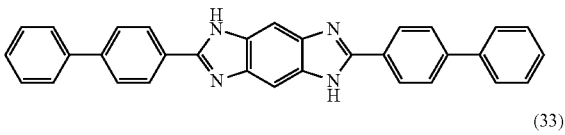

(34)

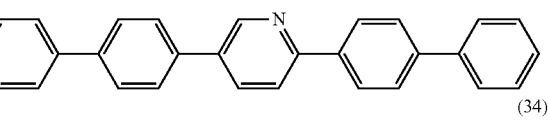

-continued

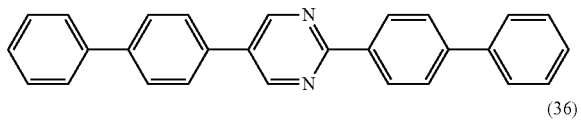
(35)

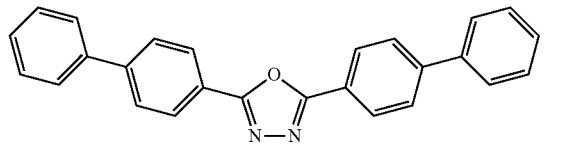
(36)

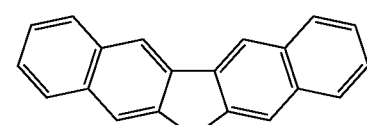
(37)

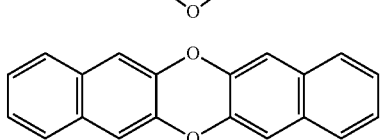
(38)

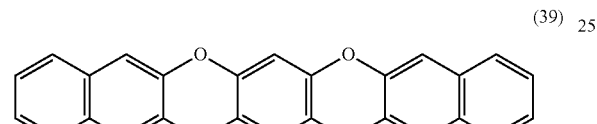
(39)

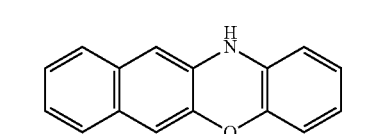
(40)

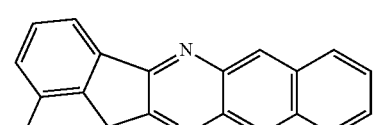
(41)

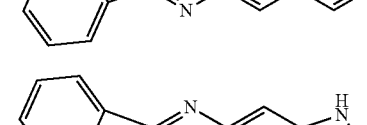
(42)

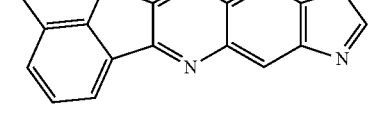
(43)

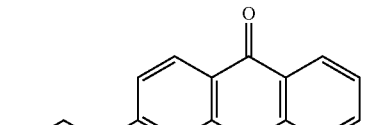
(44)

12. A solution according to claim 10, wherein the organic molecules having a general structural formula II is selected from structures 45 to 53:

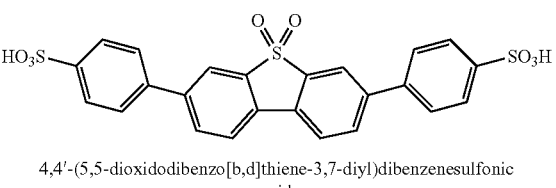
(45)

4,4'-(5,5-dioxidodibenzo[b,d]thiene-3,7-diyl)dibenzenesulfonic acid

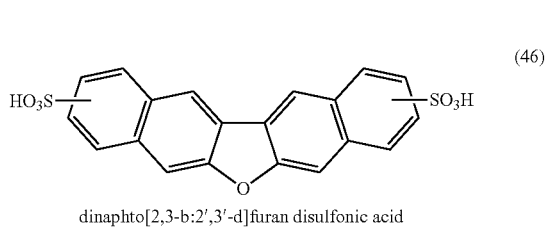
(46)

dinaphto[2,3-b:2',3'-d]furan disulfonic acid

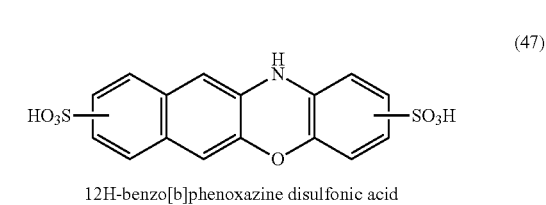
(47)

12H-benzo[b]phenoxazine disulfonic acid

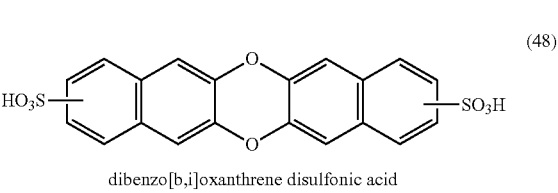
(48)

dibenzo[b,i]oxanthrene disulfonic acid

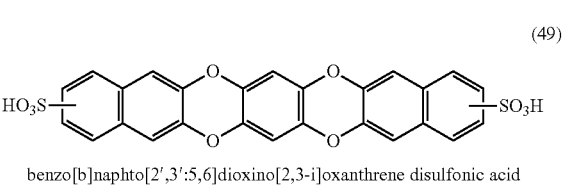
(49)

benzo[b]naphto[2',3':5,6]dioxino[2,3-i]oxanthrene disulfonic acid

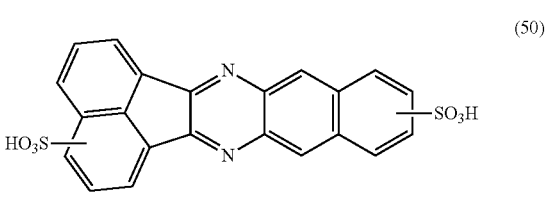
(50)

acenaphtho[1,2-b]benzo[g]quinoxaline disulfonic acid

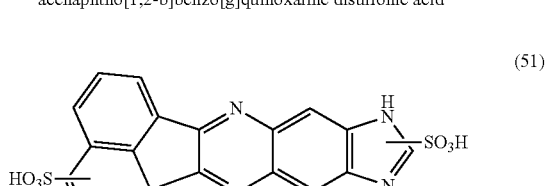
(51)

9H-acenaphtho[1,2-b]imidazo[4,5-g]quinoxaline disulfonic acid

-continued

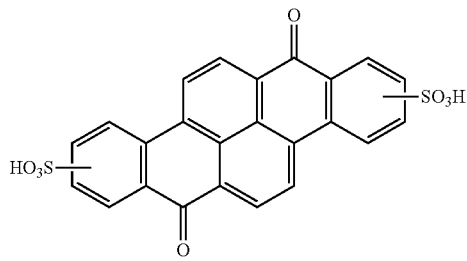

dibenzo[b,def]chrysene-7,14-dion disulfonic acid (52)

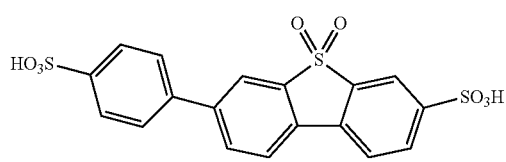

7-(4-sulfophenyl)dibenzo[b,d]thiophene-3-sulfonic acid 5,5-dioxide. (53)

13. A solution according to claim 10, wherein the organic molecules having a general structural formula II further comprises at least one substituent selected from the group consisting of —$CH_3$, —$C_2H_5$, —Cl, —Br, —$NO_2$, —F, —$CF_3$, —CN, —OH, —$OCH_3$, —$OC_2H_5$, —$OCOCH_3$, —OCN, —SCN, and —$NHCOCH_3$.

14. A solution according to claim 1, wherein the partially conjugated substantially planar polycyclic organic molecules of the second type have a general structural formula III

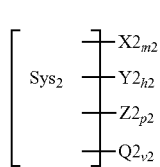 (III)

where $Sys_2$ is an at least partially conjugated substantially planar polycyclic molecular system having elongated form and having absorption in near-infrared wavelength range, X2, Y2, Z2, and Q2 are substituents; substituent X2 is a carboxylic group —COOH, m2 is 0, 1, 2, 3 or 4; substituent Y2 is a sulfonic group —$SO_3H$, h2 is 0, 1, 2, 3 or 4;substituent Z2 is a carboxamide —$CONH_2$, p2 is 0, 1, 2, 3 or 4; substituent Q2 is a sulfonamide —$SO_2NH_2$, v2 is 0, 1, 2, 3 or 4.

15. A solution according to claim 14, wherein the organic molecules having a general structural formula III is selected from the structures of general formulas 54 to 55:

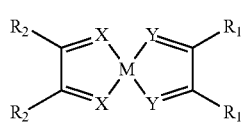 (54)

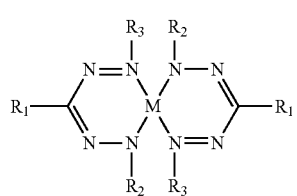 (55)

where M is Ni, Pd or Pt, X and Y are independently selected from O, S, and NR, and R, $R_1$ and $R_2$ are independently selected from -Alkyl-$SO_3H$, -Aryl-$SO_3H$, —NH—$SO_3H$, —(O-alkyl)"-$SO_3H$, and —$(OCH_2CH_2)_n OH$.

16. A solution according to claim 1, wherein the partially conjugated substantially planar polycyclic organic molecules of the first type have a general structural formula IV

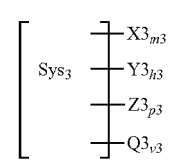 (IV)

where $Sys_3$ is an at least partially conjugated substantially planar polycyclic molecular system having approximately a disk form and having absorption in ultraviolet wavelength range, X3, Y3, Z3, and Q3 are substituents; substituent X3 is a carboxylic group —COOH, m3 is 0, 1, 2, 3 or 4; substituent Y3 is a sulfonic group —$SO_3H$, h3 is 0, 1, 2, 3 or 4; substituent Z3 is a carboxamide —$CONH_2$, p3 is 0, 1, 2, 3 or 4; substituent Q3 is a sulfonamide —$SO_2NH_2$, v3 is 0, 1, 2, 3 or 4.

17. A solution according to claim 16, wherein the organic molecules having a general structural formula IV has at least partially conjugated substantially planar polycyclic molecular system $Sys_3$ selected from the structures of general formulas 56 to 69:

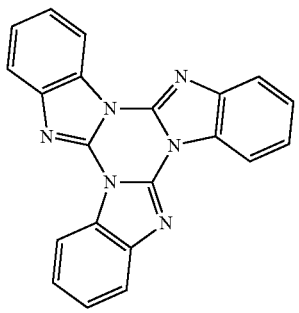 (56)

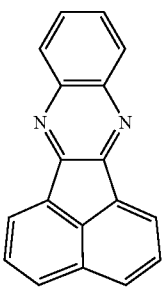 (57)

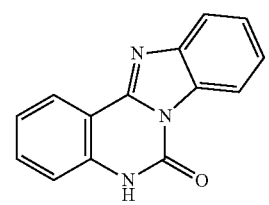 (58)

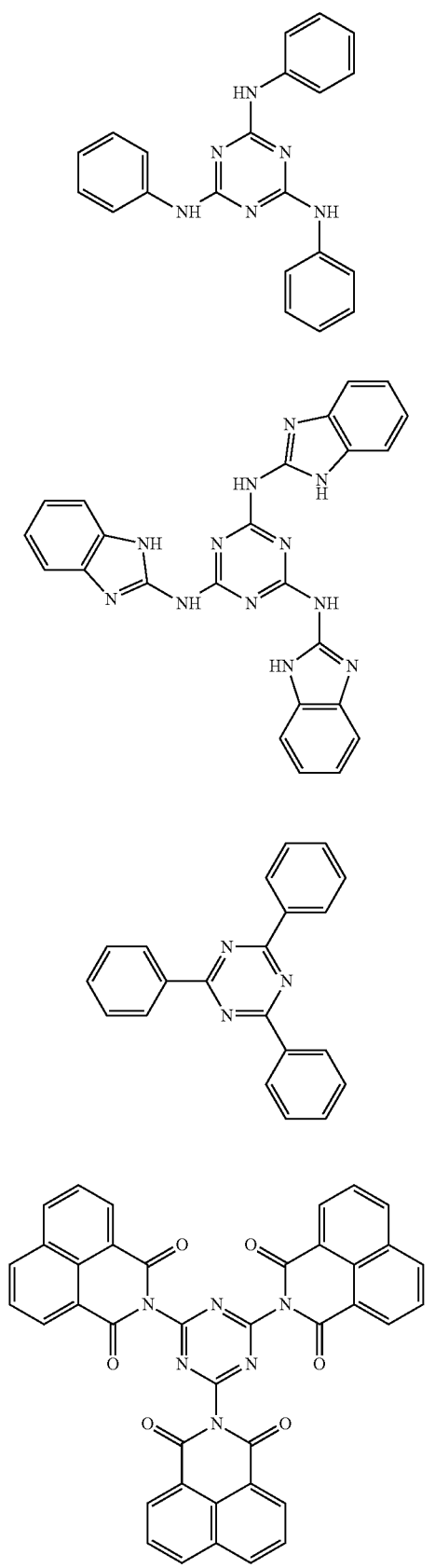
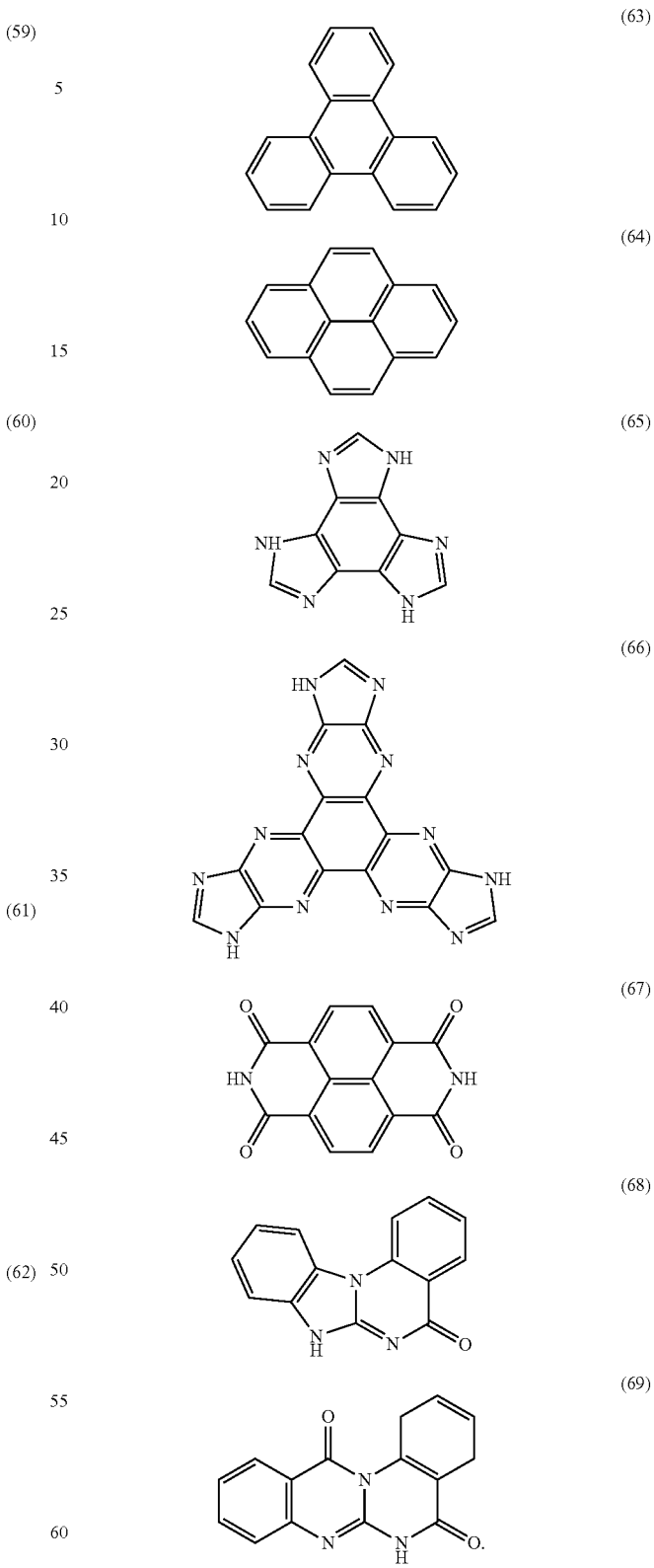
18. A solution according to claim 1, wherein the partially conjugated substantially planar polycyclic organic molecules of the second type have a general structural formula V

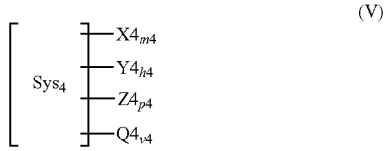
(V)

where Sys4 is an at least partially conjugated substantially planar polycyclic molecular system having absorption in near-infrared wavelength range and having approximately a disk form, X4, Y4, Z4, and Q4 are substituents; substituent X4 is a carboxylic group —COOH, m4 is 0, 1, 2, 3 or 4; substituent Y4 is a sulfonic group —SO$_3$H, h4 is 0, 1, 2, 3 or 4; substituent Z4 is a carboxamide —CONH$_2$, p4 is 0, 1, 2, 3 or 4; substituent Q4 is a sulfonamide —SO$_2$NH$_2$, v3 is 0, 1, 2, 3 or 4.

19. A solution according to claim 18, wherein the organic molecules having a general structural formula V is selected from the structures of general formulas 70 to 76:

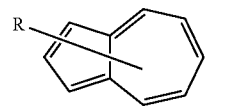
(70)

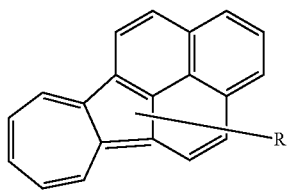
(71)

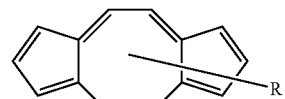
(72)

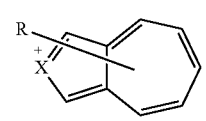
(73)

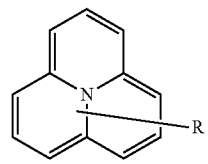
(74)

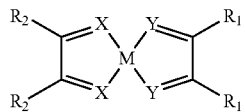
(75)

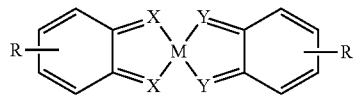
(76)

where M is Ni, Pd or Pt, X and Y are independently selected from O, S, and NR, and R, R$_1$ and R$_2$ are independently selected from -Alkyl-SO$_3$H, -Aryl-SO$_3$H, —NH—SO$_3$H, —(O-alkyl)$_n$—SO$_3$H, and —(OCH$_2$CH$_2$)$_n$OH and X$^+$ is balanced with any inorganic or organic anion.

20. A solution according to claim 1, wherein the water-based solvent is selected from the group consisting of alkalis and acids or any combination thereof.

21. A negative dispersion retardation plate comprising:
a substrate, and
at least one optically anisotropic retardation layer comprising a multi-component composition on the substrate, comprising
a rigid rod-like polymer macromolecule having absorption in ultraviolet and/or near infra-red wavelength range,
a supramolecule of a first type having absorption in ultraviolet wavelength range and formed via π-π-interaction by partially conjugated substantially planar polycyclic organic molecules of a first type having absorption in ultraviolet wavelength range,
a supramolecule of a second type having absorption in near-infrared wavelength range and formed via π-π-interaction by partially conjugated substantially planar polycyclic organic molecules of a second type having absorption in near-infrared wavelength range and
a supramolecule of a third type having absorption in ultraviolet and near-infrared wavelength ranges and formed via π-π-interaction by mix of partially conjugated substantially planar polycyclic organic molecules of the first and second types,
wherein the negative dispersion retardation plate is substantially transparent for electromagnetic radiation in the visible spectral range and provides an essentially fixed optical phase delay in the range from 0 to 2π over the whole visible spectral range.

22. A negative dispersion retardation plate according to claim 21, wherein the fixed optical phase delay is equal to π/2.

23. A negative dispersion retardation plate according to claim 21, wherein the fixed optical phasedelay is equal to 3π/2.

24. A negative dispersion retardation plate according to claim 21, wherein the rigid rod-like polymer macromolecule comprises at least two building blocks connected to each other according to formula:

$$-\!\!\left[\text{Block1}\right]_n\!\!-\!\!\left[\text{Block2}\right]_m\!\!-,$$
$$\quad\quad\quad\; |\quad\quad\quad\quad\; |$$
$$\quad\quad\quad R_1\quad\quad\quad\; R_2$$

where Block1 and Block2 are selected independently from the group consisting of:

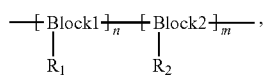

—C≡C—, -Aryl-, -Cyclohexyl-,

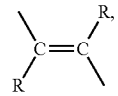

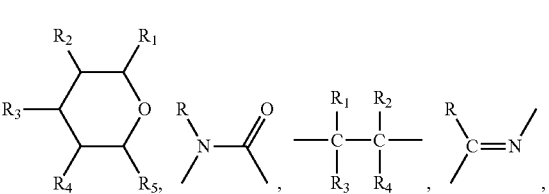

—CH2—O—, —N=N—;
n and m are integers from the range of 5 to 10000;
side-groups R, R$_1$, R$_2$, R$_3$, R$_4$, R$_5$ are selected independently from the group consisting of H, linear or branched —($C_1$-$C_{20}$)-alkyl, —$SO_3M$, —$(CH_2)_m SO_3M$, —$PO_3M_2$, —$(CH_2)_m Si(O\text{-Alkyl})_3$, —$CH_2$-Phenyl, —$(CH_2)_m OH$, —$NH_2$, —COOM, —OH and M is a counterion selected from the group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$ and $NH_{4-k}Q_k^+$, where Q is selected from the group consisting of linear and branched ($C_1$-$C_{20}$) alkyl, ($C_2$-$C_{20}$) alkenyl, (C2-C20) alkynyl, and ($C_6$-$C_{20}$) arylalkyl, and k is 0, 1, 2, 3 or 4.

25. A negative dispersion retardation plate according to claim 21, wherein the rigid rod-like polymer macromolecule has the general structural formula I or its salt

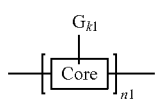

(I)

where Core is a conjugated organic unit having absorption in ultraviolet and/or near infra-red wavelength range and comprising a set of ionogenic side-groups $G_{k1}$, wherein n1 is number of the conjugated organic units in the rigid rod-like polymer macromolecule which is equal to integers in the range from 10 to 10000, and k1 is equal to 0, 1, 2, 3, 4, 5, 6, 7, or 8.

26. A negative dispersion retardation plate according to claim 21, wherein the rigid rod-like polymer macromolecule is selected from structures 1 to 29:

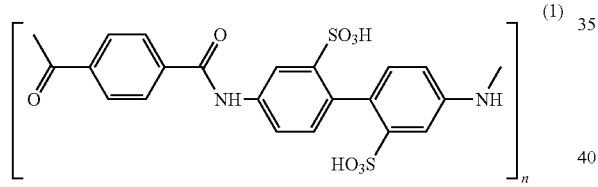

(1)

poly(2,2'-disulfo-4,4'-benzidine terephthalamide)

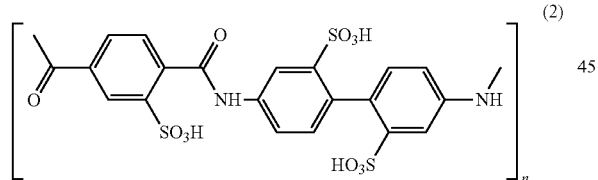

(2)

poly(2,2'-disulfo-4,4'-benzidine sulfoterephthalamide)

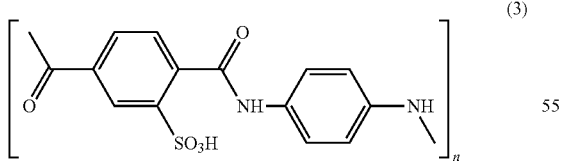

(3)

poly(para-phenylene sulfoterephthalamide)

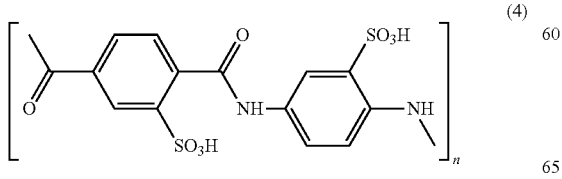

(4)

poly(2-sulfo-1,4-phenylene sulfoterephthalamide)

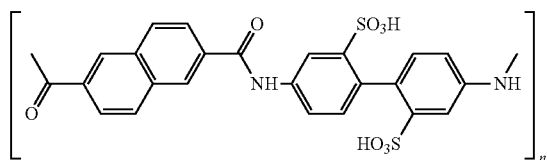

(5)

poly(2,2'-disulfo-4,4'-benzidine naphthalene-2,6-dicarboxamide)

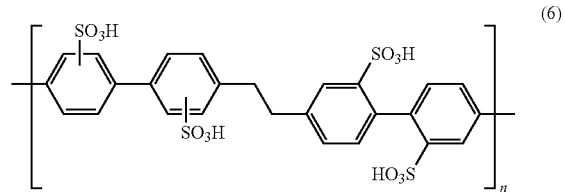

(6)

Poly(disulfobiphenylene-1,2-ethylene-2,2'-disulfobiphenylene)

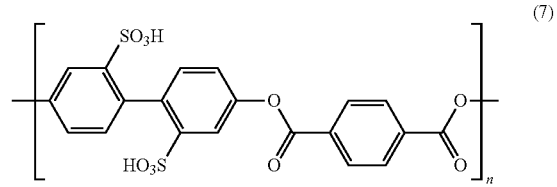

(7)

Poly(2,2'-disulfobiphenyl-dioxyterephthaloyl)

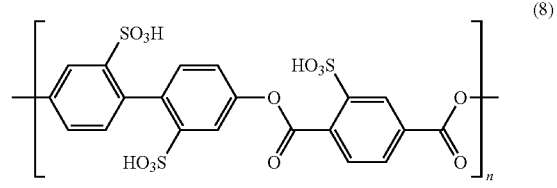

(8)

Poly(2,2'-disulfobiphenyl-2-sulfodioxyterephthaloyl)

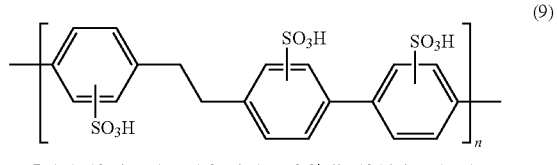

(9)

Poly(sulfophenylene-1,2-ethylene-2,2'-disulfobiphenylene)

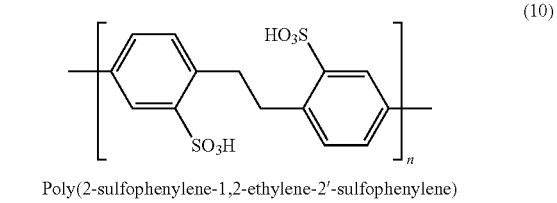

(10)

Poly(2-sulfophenylene-1,2-ethylene-2'-sulfophenylene)

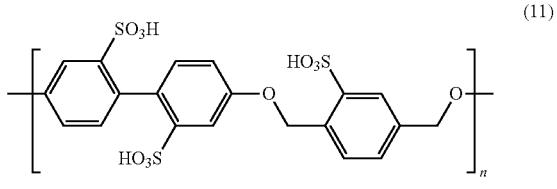

(11)

Poly(2,2'-disulfobiphenyl-2-sulfo-1,4-dioxymethylphenlene)

(12)

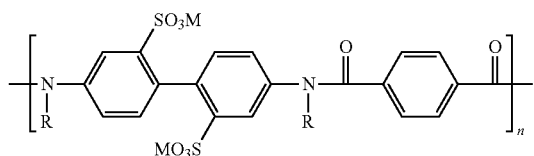

where R is a side-group selected from the group consisting of linear or branched —($C_1$-$C_{20}$)-alkyl, —$(CH_2)_m SO_3 M$, —$(CH_2)_m Si(O$-alkyl$)_3$, —$CH_2$-phenyl, —$(CH_2)_m OH$ and M is a counterion selected from group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$, and $NH_{4-k}Q_k^+$, where Q is selected from the group consisting of linear and branched ($C_1$-$C_{20}$) alkyl, ($C_2$-$C_{20}$) alkenyl, ($C_2$-$C_{20}$) alkynyl, and ($C_6$-$C_{20}$) arylalkyl, and $k$ is 0, 1, 2, 3 or 4;

(13)

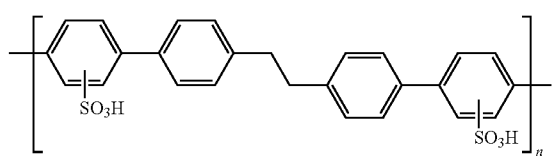

Poly(disulfo-quaterphenylethylene)

(14)

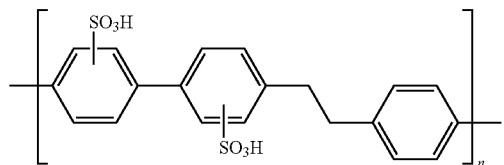

Poly(disulfo-terphenylethylene)

(15)

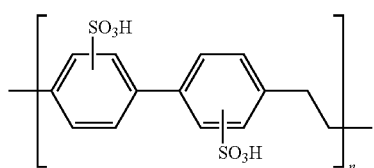

Poly(disulfo-biphenylethylene)

(16)

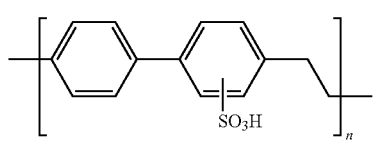

Poly(sulfo-biphenylethylene)

(17)

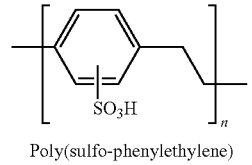

Poly(sulfo-phenylethylene)

(18)

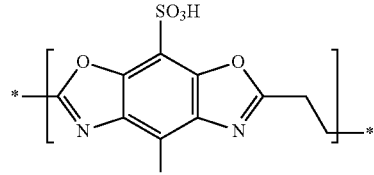

Poly(4,9-disulfobenzo[1,2-d;5,4-d′]bisoxazole-1,7-ethylene)

(19)

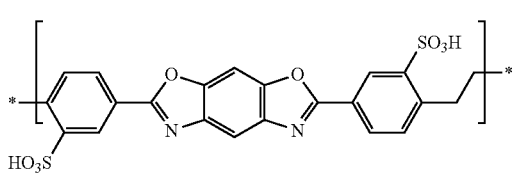

Poly(benzo[1,2-d;5,4-d′]bisoxazole-1,7-[1,1′-ethane-1,2-diyl-2-2′-disulfodibenzene])

(20)

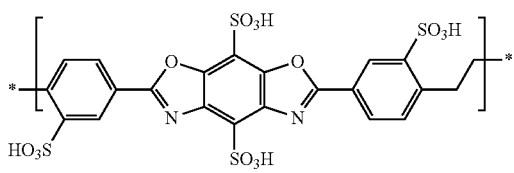

Poly(4,9-disulfobenzo[1,2-d;5,4-d′]bisoxazole-1,7-[1,1′-ethane-1,2-diyl-2,2′-disulfodibenzene])

(21)

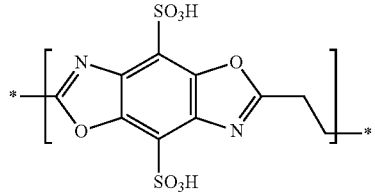

Poly(4,9-disulfobenzo[1,2-d;4,5-d′]bisoxazole-1,7-ethylene)

(22)

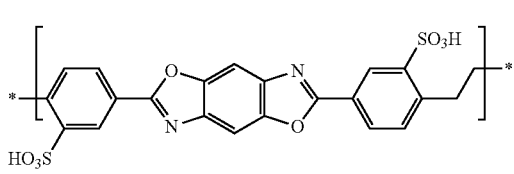

Poly(benzo[1,2-d;4,5-d′]bisoxazole-1,7-[1,1′-ethane-1,2-diyl-2,2′-disulfodibenzene])

(23)

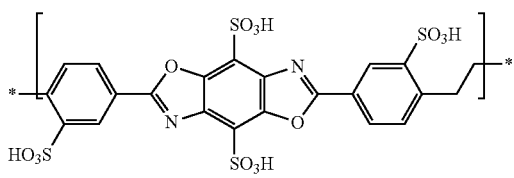

Poly(4,9-disulfobenzo[1,2-d;4,5-d′]bisoxazole-1,7-[1,1′-ethane-1,2-diyl-2,2′-disulfodibenzene])

(24)

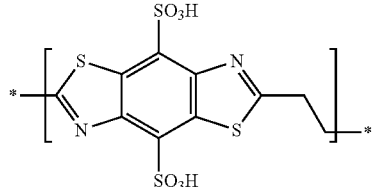

Poly(4,9-disulfobenzo[1,2-d;4,5-d′]bisthiazole-1,7-ethylene)

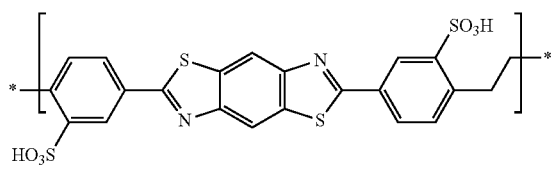

Poly(benzo[1,2-d;4,5-d']bisthiazole-1,7-[1,1'-ethane-1,2-diyl-2,2'-disulfodibenzene])

(26)

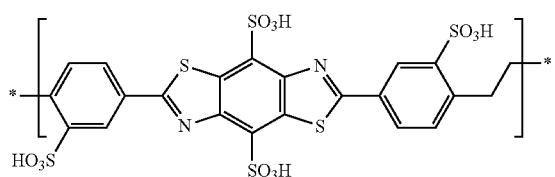

Poly(4,9-disulfobenzo[1,2-d;4,5-d;]bisthiazole-1,7-[1,1'-ethane-1,2-diyl-2,2'-disulfodibenzene])

(27)

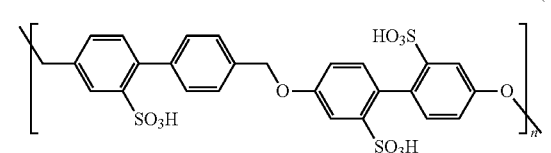

Poly((4,4'-dimethylen-1-sulfobiphenyl)-(4,4'-dioxi-1,1'-disulfobiphenyl) ether)

(28)

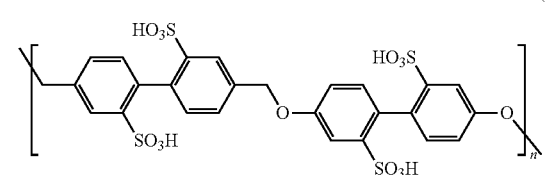

Poly((4,4'-dimethylen-1,1'-disulfobiphenyl)-(4,4'-dixoxi-1,1'-disulfobiphenyl) ether)

(29)

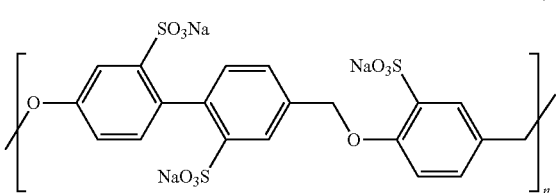

Poly((1,4-dimethylen-2-sulfophenyl)-(4,4'-dioxi-1,1'-disulfobiphenyl) ether)

where n=5-10000.

27. A negative dispersion retardation plate according to claim 25, wherein the rigid rod-like polymer macromolecule of the general structural formula I further comprises additional side-groups connected with the Core organic unit of structural formula I independently selected from the group consisting of linear and branched ($C_1$-$C_{20}$) alkyl, ($C_2$-$C_{20}$) alkenyl, and ($C_2$-$C_{20}$) alkynyl.

28. A negative dispersion retardation plate according to claim 27, wherein at least one of the additional side-groups is connected with the Core organic unit of structural formula I via a bridging group A selected from the group consisting of —C(O)—, —C(O)O—, —C(O)—NH—, —(SO$_2$)NH—, —O—, —CH$_2$O—, —NH—, >N—, and any combination thereof.

29. A negative dispersion retardation plate according to claim 25, wherein the salt of the rigid rod-like polymer macromolecule of the general structural formula I is selected from the group consisting of ammonium and alkali-metal salts.

30. A negative dispersion retardation plate according to claim 25, wherein the rigid rod-like macromolecule has a polymeric main rigid-chain, and wherein the conjugated organic units are the same.

31. A negative dispersion retardation plate according to claim 25, wherein the rigid rod-like macromolecule has a copolymeric main rigid-chain, and wherein at least one conjugated organic unit is different from the others.

32. A negative dispersion retardation plate according to claim 21, wherein the partially conjugated substantially planar polycyclic organic molecules of the first type have a general structural formula II $$\left[ Sys_1 \begin{array}{l} -X1_{m1} \\ -Y1_{h1} \\ -Z1_{p1} \\ -Q1_{v1} \end{array} \right] \quad (II)$$

where $Sys_1$ is an at least partially conjugated substantially planar polycyclic molecular system having elongated form and having absorption in ultraviolet wavelength range, X1, Y1, Z1, and Q1 are substituents; substituent X1 is a carboxylic group —COOH, m1 is 0, 1, 2, 3 or 4; substituent Y1 is a sulfonic group —SO$_3$H, h1 is 0, 1, 2, 3 or 4; substituent Z1 is a carboxamide —CONH$_2$, p1 is 0, 1, 2, 3 or 4; substituent Q1 is a sulfonamide —SO$_2$NH$_2$, v1 is 0, 1, 2, 3 or 4.

33. A negative dispersion retardation plate according to claim 32, wherein the at least partially conjugated substantially planar polycyclic molecular system $Sys_1$ is selected from the structures of general formulas 30 to 44:

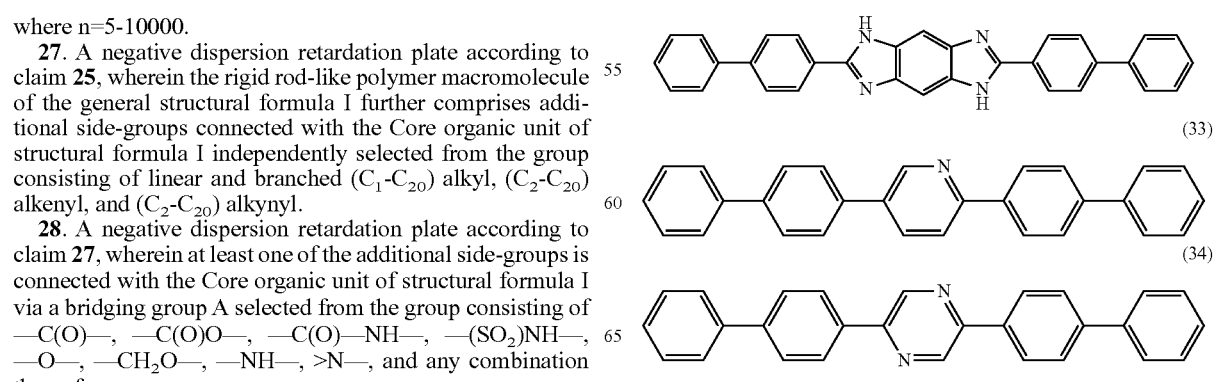

-continued

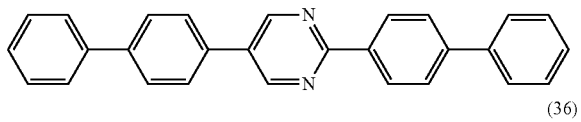
(35)

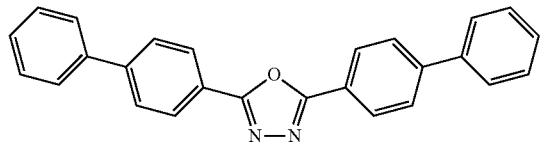
(36)

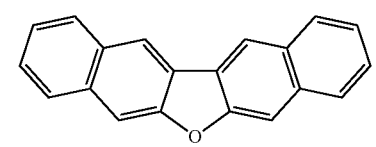
(37)

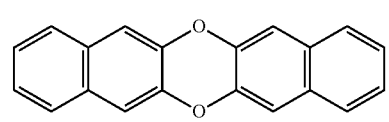
(38)

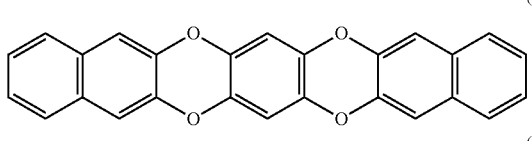
(39)

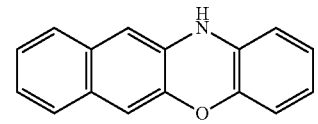
(40)

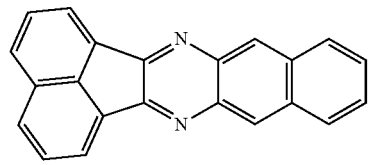
(41)

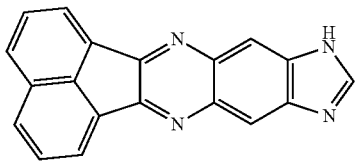
(42)

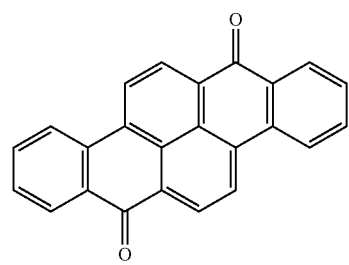
(43)

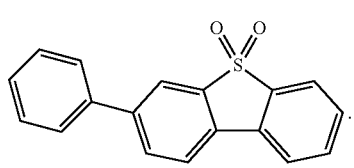
(44)

34. A negative dispersion retardation plate according to claim 33, wherein the organic molecules having a general structural formula II is selected from structures 45 to 53:

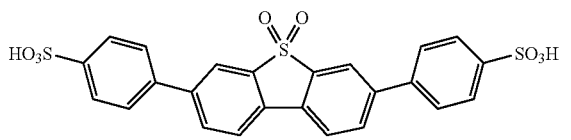
(45)

4,4′-(5,5-dioxidodibenzo[b,d]thiene-3,7-diyl)dibenzenesulfonic acid

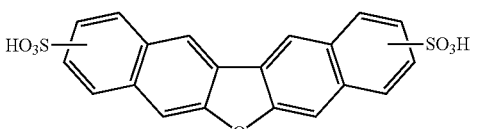
(46)

dinaphto[2,3-b:2′,3′-d]furan disulfonic acid

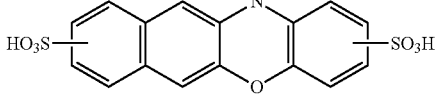
(47)

12H-benzo[b]phenoxazine disulfonic acid

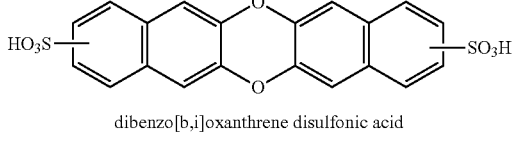
(48)

dibenzo[b,i]oxanthrene disulfonic acid

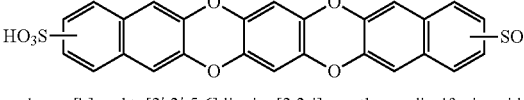
(49)

benzo[b]naphto[2′,3′:5,6]dioxino[2,3-i]oxanthrene disulfonic acid

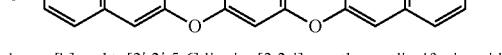
(50)

acenaphtho[1,2-b]benzo[g]quinoxaline disulfonic acid

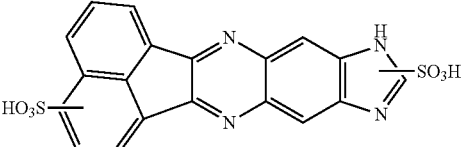
(51)

9H-acenaphtho[1,2-b]imidazo[4,5-g]quinoxaline disulfonic acid

-continued

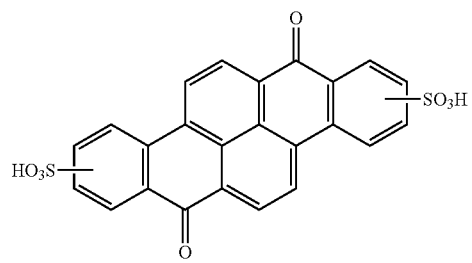

dibenzo[b,def]chrysene-7,14-dion disulfonic acid

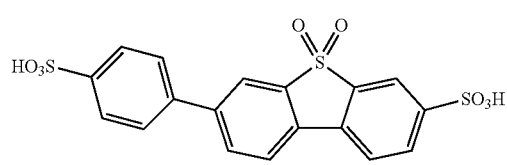

7-(4-sulfophenyl)dibenzo[b,d]thiophene-3-sulfonic acid 5,5-dioxide.

35. A negative dispersion retardation plate according to claim 32, wherein the organic molecules having a general structural formula II further comprises at least one substituent selected from the group consisting of —$CH_3$, —$C_2H_5$, —Cl, —Br, —$NO_2$, —F, —$CF_3$, —CN, —OH, —$OCH_3$, —$OC_2H_5$, —$OCOCH_3$, —OCN, —SCN, and —$NHCOCH_3$.

36. A negative dispersion retardation plate according to claim 21, wherein the partially conjugated substantially planar polycyclic organic molecules of the second type have a general structural formula III $$\left[ Sys_2 \begin{array}{l} -X2_{m2} \\ -Y2_{h2} \\ -Z2_{p2} \\ -Q2_{v2} \end{array} \right] \quad \text{(III)}$$

where $Sys_2$ is an at least partially conjugated substantially planar polycyclic molecular system having elongated form and having absorption in near-infrared wavelength range, X2, Y2, Z2, and Q2 are substituents; substituent X2 is a carboxylic group —COOH, m2 is 0, 1, 2, 3 or 4; substituent Y2 is a sulfonic group —$SO_3H$, h2 is 0, 1, 2, 3 or 4; substituent Z2 is a carboxamide —$CONH_2$, p2 is 0, 1, 2, 3 or 4; substituent Q2 is a sulfonamide —$SO_2NH_2$, v2 is 0, 1, 2, 3 or 4.

37. A negative dispersion retardation plate according to claim 36, wherein the organic molecule having a general structural formula III is selected from the structures of general formulas 54 to 55:

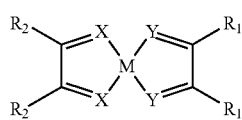

(54)

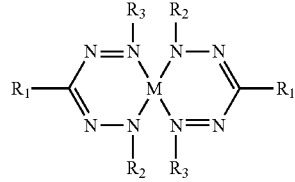

(55)

where M is Ni, Pd or Pt, X and Y are independently selected from O, S, and NR, and R, $R_1$ and $R_2$ are independently selected from -Alkyl-$SO_3H$, -Aryl-$SO_3H$, —NH—$SO_3H$, —(O-alkyl)$_n$-$SO_3H$, and —(OCH$_2$CH$_2$)$_n$—OH.

38. A negative dispersion retardation plate according to claim 21, wherein the partially conjugated substantially planar polycyclic organic molecules of the first type have a general structural formula IV $$\left[ Sys_3 \begin{array}{l} -X3_{m3} \\ -Y3_{h3} \\ -Z3_{p3} \\ -Q3_{v3} \end{array} \right] \quad \text{(IV)}$$

where $Sys_3$ is an at least partially conjugated substantially planar polycyclic molecular system having approximately a disk form and having absorption in ultraviolet wavelength range, X3, Y3, Z3, and Q3 are substituents; substituent X3 is a carboxylic group —COOH, m3 is 0, 1, 2, 3 or 4; substituent Y3 is a sulfonic group —$SO_3H$, h3 is 0, 1, 2, 3 or 4; substituent Z3 is a carboxamide —$CONH_2$, p3 is 0, 1, 2, 3 or 4; substituent Q3 is a sulfonamide —$SO_2NH_2$, v3 is 0, 1, 2, 3 or 4.

39. A negative dispersion retardation plate according to claim 38, wherein the organic molecules having a general structural formula IV has at least partially conjugated substantially planar polycyclic molecular system $Sys_3$ selected from the structures of general formulas 56 to 69:

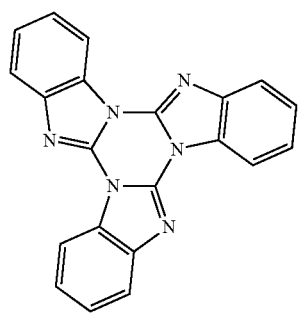

(56)

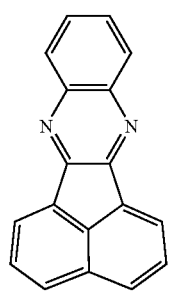

(57)

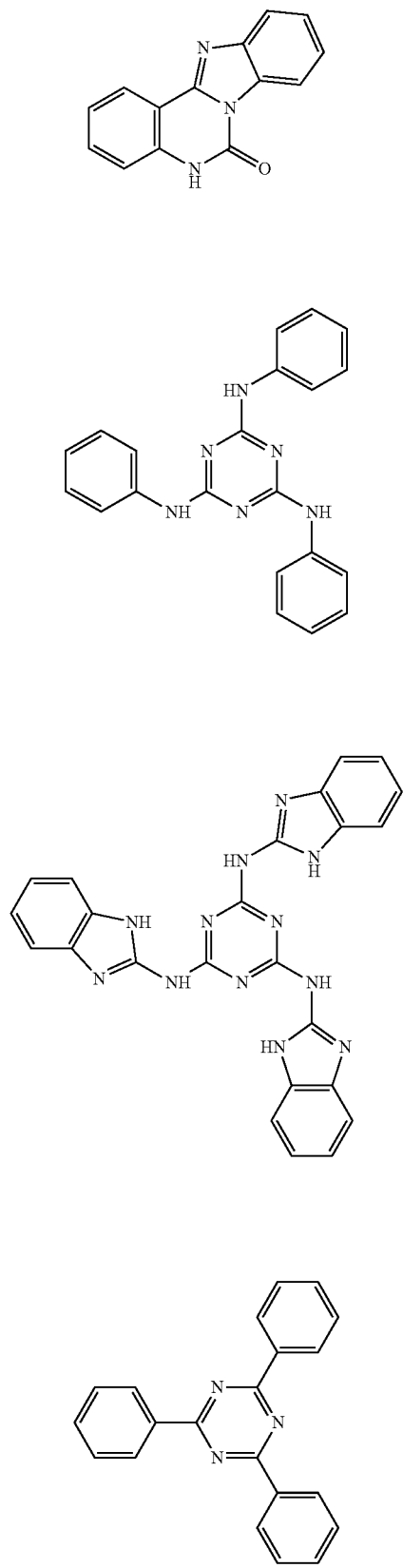
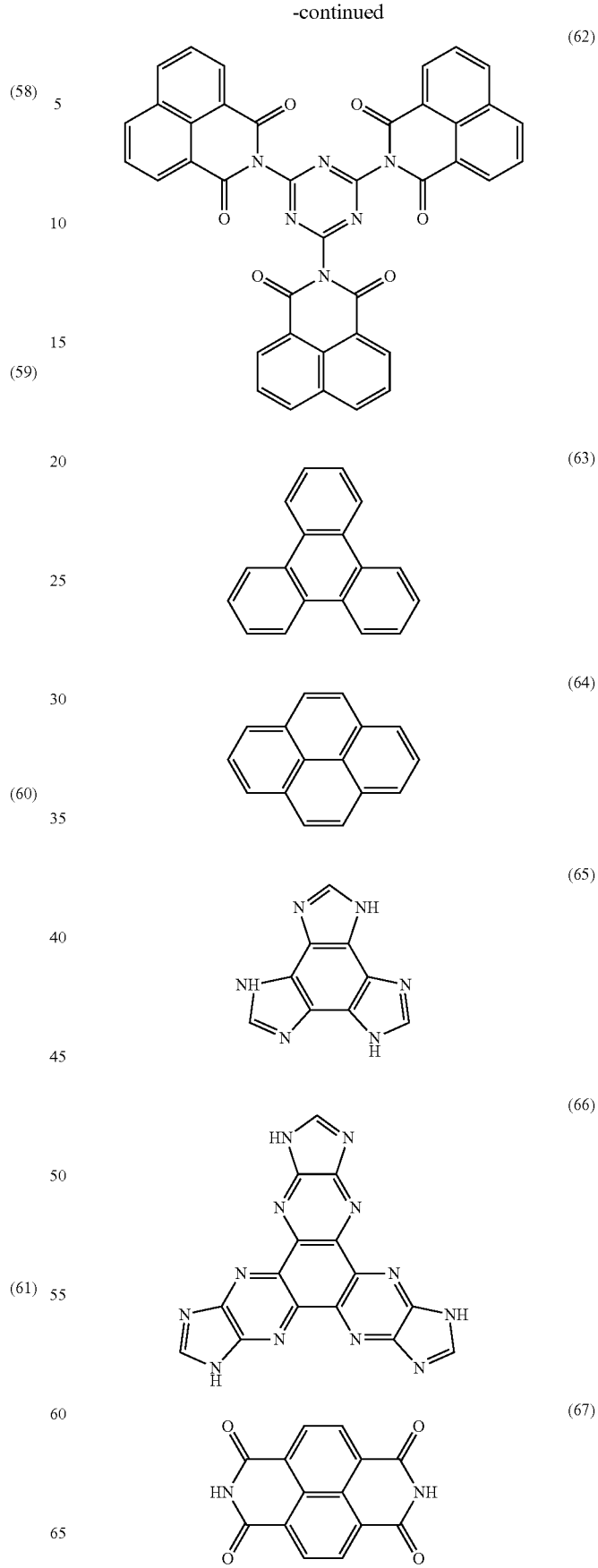

(68)

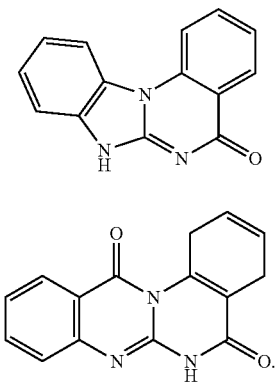

(69)

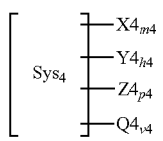

40. A negative dispersion retardation plate according to claim 21, wherein the partially conjugated substantially planar polycyclic organic molecules of the second type have a general structural formula V $$\left[ Sys_4 \begin{array}{l} -X4_{m4} \\ -Y4_{h4} \\ -Z4_{p4} \\ -Q4_{v4} \end{array} \right] \quad (V)$$

where $Sys_4$ is an at least partially conjugated substantially planar polycyclic molecular system having absorption in near-infrared wavelength range and having approximately a disk form, X4, Y4, Z4, and Q4 are substituents; substituent X4 is a carboxylic group —COOH, m4 is 0, 1, 2, 3 or 4; substituent Y4 is a sulfonic group —SO$_3$H, h4 is 0, 1, 2, 3 or 4; substituent Z4 is a carboxamide —CONH$_2$, p4 is 0, 1, 2, 3 or 4; substituent Q4 is a sulfonamide —SO$_2$NH$_2$, v3 is 0, 1, 2, 3 or 4.

41. A negative dispersion retardation plate according to claim 40, wherein the organic molecule having a general structural formula V is selected from the structures of general formulas 70 to 76:

(70)

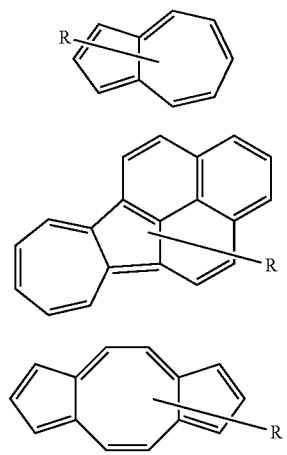

(71)

(72)

(73)

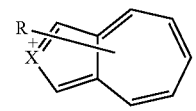

(74)

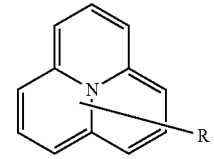

(75)

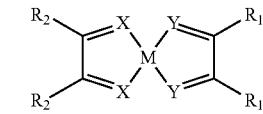

(76)

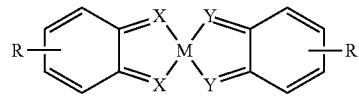

where M is Ni, Pd or Pt, X and Y are independently selected from O, S, and NR, and R, $R_1$ and $R_2$ are independently selected from -Alkyl-SO$_3$H, -Aryl-SO$_3$H, —NH—SO$_3$H, —(O-alkyl)$_n$-SO$_3$H, and —(OCH$_2$CH$_2$)$_n$OH, and X$^+$ is balanced with any inorganic or organic anion.

42. A negative dispersion retardation plate according to claim 21, wherein longitudinal axes of the rigid rod-like polymer macromolecules coincide with longitudinal axes of said supramolecules, and at least part of the supramolecules possess anisotropic polarizability in a plane which is perpendicular to their longitudinal axis and wherein the rigid rod-like polymer macromolecules and said supramolecules form a retardation layer of $B_A$-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer, which satisfy the following conditions: $n_x<n_z<n_y$ and $\partial\Delta n(\lambda)/\partial\lambda>0$ over the whole visible spectral range, where $\Delta n=n_y-n_x$.

43. A negative dispersion retardation plate according to claim 21, wherein longitudinal axes of the rigid rod-like polymer macromolecules coincide with longitudinal axes of said supramolecules, and the supramolecules possess isotropic polarizability in a plane which is perpendicular to their longitudinal axis and wherein the rigid rod-like polymer macromolecules and said supramolecules form a retardation layer of negative A-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer, which satisfy the following conditions: $n_x<n_y=n_z$ and $\partial\Delta n(\lambda)/\partial\lambda>0$ over the whole visible spectral range, where $\Delta n=n_y-n_x$.

44. A negative dispersion retardation plate according to claim 21, further comprising additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer, wherein the optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer, and wherein the following conditions are satisfied: $|\partial\Delta n_{add}(\lambda)/\partial\lambda|<|\partial\Delta n(\lambda)/\partial\lambda|$, $\partial\Delta n(\lambda)/\partial\lambda<0$ and $\partial R(\lambda)/\partial\lambda>0$ over the whole visible spectral range, where $\Delta n_{add}=n_{x,add}-n_{y,add}$, $\Delta n=n_x-n_y$ and $R=(n_{x,add}-n_{y,add})\cdot d_{add}+(n_x-n_y)\cdot d$.

45. A negative dispersion retardation plate according to claim 21, further comprising additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer, wherein the optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer, and wherein the following conditions are satisfied: $|\partial\Delta n(\lambda)/\partial\lambda|<|\partial\Delta n_{add}(\lambda)/\partial\lambda|$, $\Delta n_{add}(\lambda)/\partial\lambda<0$, and $\partial R(\lambda)/\partial\lambda>0$ over the whole visible spectral range, where $\Delta n_{add}=n_{x,add}-n_{y,add}$, $\Delta n=n_x-n_y$ and $R=(n_{x,add}-n_{y,add})\cdot d_{add}+(n_x-n_y)\cdot d$.

46. A negative dispersion retardation plate according to claim 21, wherein the substrate is made of glass.

47. A negative dispersion retardation plate according to claim 21, wherein the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate and the supramolecules possess anisotropic polarizability in a plane which is perpendicular to their longitudinal axis and wherein said supramolecules form a retardation layer of biaxial $B_A$-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer and wherein the following conditions are satisfied: $n_{x,sub}>n_{y,sub}=n_{z,sub}$, $n_x<n_z<n_y$ and $\partial R(\lambda)/\partial\lambda>0$ over the whole visible spectral range, where $R=(n_{x,sub}-n_{y,sub})\cdot d_{sub}+(n_x-n_y)\cdot d$.

48. A negative dispersion retardation plate according to claim 21, wherein the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate and the supramolecules possess isotropic polarizability in a plane which is perpendicular to their longitudinal axis and wherein said supramolecules form a retardation layer of negative A-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer and wherein the following conditions are satisfied: $n_{x,sub}>n_{y,sub}=n_{z,sub}$, $n_x<n_y=n_z$ and $\partial R(\lambda)/\partial\lambda>0$ over the whole visible spectral range, where $R=(n_{x,sub}-n_{y,sub})\cdot d_{sub}+(n_x-n_y)\cdot d$.

49. A negative dispersion retardation plate according to any of claims 47 or 48, wherein the substrate material is selected from the group consisting of poly ethylene terephtalate (PET), poly ethylene naphtalate (PEN), polyvinyl chloride (PVC), polycarbonate (PC), oriented poly propylene (OPP), poly ethylene (PE), polyimide (PI), and poly ester.

50. An achromatic circular polarizer comprising
a linear polarizer and
a negative dispersion retardation plate comprising:
a substrate, and
at least one optically anisotropic retardation layer comprising a multi-component composition on the substrate, comprising
a rigid rod-like polymer macromolecule having absorption in ultraviolet and/or near infra-red wavelength range,
a supramolecule of a first type having absorption in ultraviolet wavelength range and formed via π-π-interaction by partially conjugated substantially planar polycyclic organic molecules of a first type having absorption in ultraviolet wavelength range,
a supramolecule of a second type having absorption in near-infrared wavelength range and formed via π-π-interaction by partially conjugated substantially planar polycyclic organic molecules of a second type having absorption in near-infrared wavelength range and
supramolecule of a third type having absorption in ultraviolet and near-infrared wavelength ranges and formed via π-π-interaction by mix of partially conjugated substantially planar polycyclic organic molecules of the first and second types, and
wherein the negative dispersion retardation plate is substantially transparent for electromagnetic radiation in the visible spectral range and provides an essentially fixed optical phase delay in the range from 0 to $2\pi$ over the whole visible spectral range.

51. An achromatic circular polarizer according to claim 50, wherein the fixed optical phase delay is equal to $\pi/2$.

52. An achromatic circular polarizer according to claim 50, wherein the fixed optical phase delay is equal to $3\pi/2$.

53. An achromatic circular polarizer according to claim 50, wherein the rigid rod-like polymer macromolecule comprises at least two building blocks connected to each other according to formula:

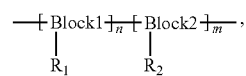

where Block1 and Block2 are selected independently from the group consisting of:

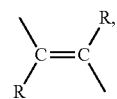

—C≡C—, -Aryl-, -Cyclohexyl-,

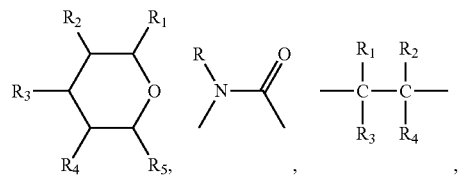

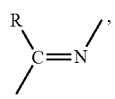

—CH2-O—, —N=N—;

n and m are integers from the range of 5 to 10000;

side-groups R, $R_1$, $R_2$, $R_3$, $R_4$, $R_5$ are selected independently from the group consisting of H, linear or branched —($C_1$-$C_{20}$)-alkyl, —$SO_3M$, —$(CH_2)_m SO_3M$, —$PO_3M_2$, —$(CH_2)_m Si(O\ Alkyl)_3$, —$CH_2Phenyl$, —$(CH_2)_m OH$, —$NH_2$, —COOM, —OH and M is counterion selected from the group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$ and $NH_{4-k}Q_k^+$, where Q is selected from the group consisting of linear and branched ($C_1$-$C_{20}$) alkyl, ($C_2$-$C_{20}$) alkenyl, ($C_2$-$C_{20}$) alkynyl, and ($C_6$-$C_{20}$) arylalkyl, and k is 0, 1, 2, 3 or 4.

54. An achromatic circular polarizer according to claim 50, wherein the rigid rod-like polymer macromolecule has the general structural formula I or its salt

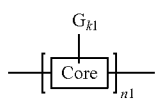

where Core is a conjugated organic unit having absorption in ultraviolet and/or near infra-red wavelength range and comprising a set of ionogenic side-groups $G_{k1}$, wherein n1 is number of the conjugated organic units in the rigid rod-like polymer macromolecule which is equal to integers in the range from 10 to 10000, and k1 is equal to 0, 1, 2, 3, 4, 5, 6, 7, or 8.

55. An achromatic circular polarizer according to claim 50, wherein the rigid rod-like polymer macromolecule is selected from structures 1 to 29:

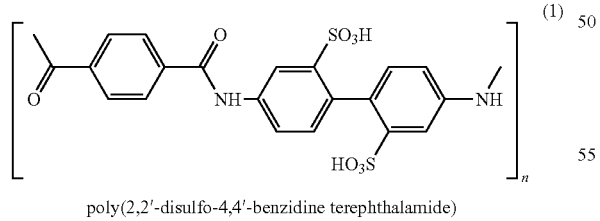

poly(2,2'-disulfo-4,4'-benzidine terephthalamide)

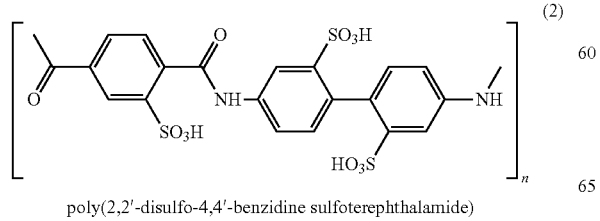

poly(2,2'-disulfo-4,4'-benzidine sulfoterephthalamide)

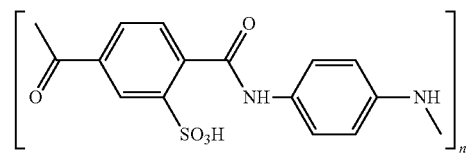

poly(para-phenylene sulfoterephthalamide)

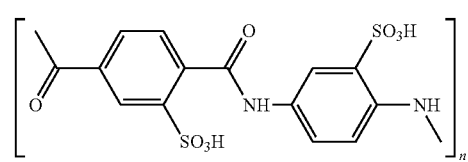

poly(2-sulfo-1,4-phenylene sulfoterephthalamide)

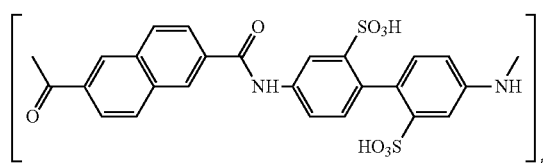

poly(2,2'-disulfo-4,4'-benzidine naphthalene-2,6-dicarboxamide)

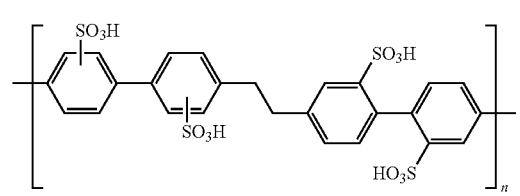

Poly(disulfobiphenylene-1,2-ethylene-2,2'-disulfobiphenylene)

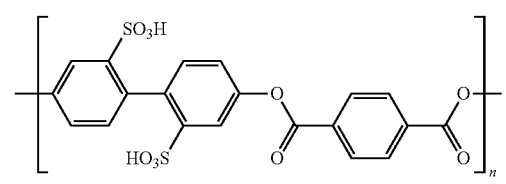

Poly(2,2'-disulfobiphenyl-dioxyterephthaloyl)

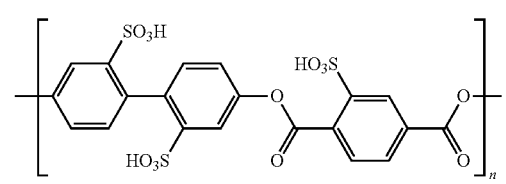

Poly(2,2'-disulfobiphenyl-2-sulfodioxyterephthaloyl)

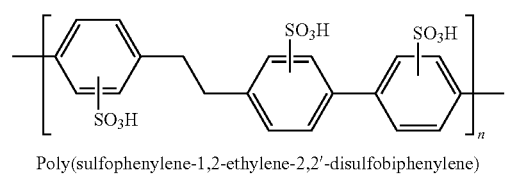

Poly(sulfophenylene-1,2-ethylene-2,2'-disulfobiphenylene)

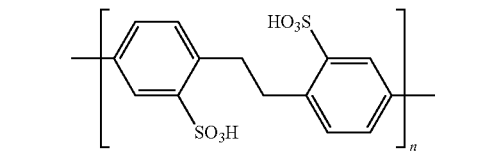

Poly(2-sulfophenylene-1,2-ethylene-2'-sulfophenylene)

(11)

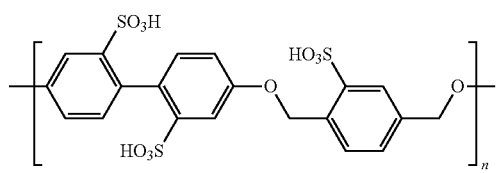

Poly(2,2'-disulfobiphenyl-2-sulfo-1,4-dioxymethylphenlene)

(12)

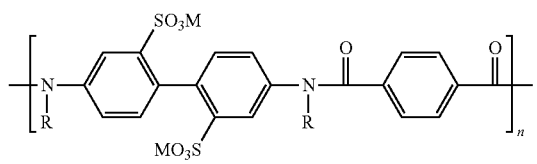

where R is a side-group selected from the group consisting of linear or branched —($C_1$-$C_{20}$)-alkyl, —$(CH_2)_m SO_3M$, —$(CH_2)_m Si(O-alkyl)_3$, —$CH_2$-phenyl, —$(CH_2)_m OH$ and M is a counterion selected from group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$, and $NH_{4-k}Q_k^+$, where Q is selected from the group consisting of linear and branched ($C_1$-$C_{20}$) alkyl, ($C_2$-$C_{20}$) alkenyl, ($C_2$-$C_{20}$) alkynyl, and ($C_6$-$C_{20}$) arylalkyl, and $k$ is 0, 1, 2, 3 or 4;

(13)

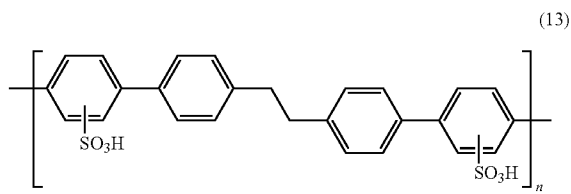

Poly(disulfo-quaterphenylethylene)

(14)

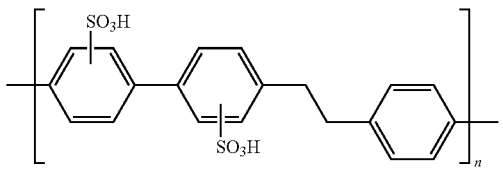

Poly(disulfo-terphenylethylene)

(15)

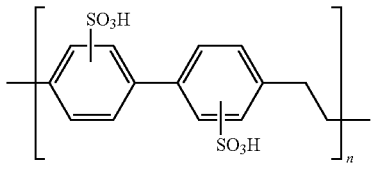

Poly(disulfo-biphenylethylene)

(16)

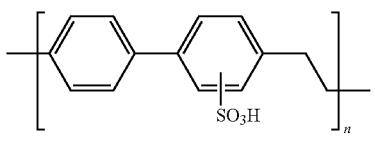

Poly(sulfo-biphenylethylene)

(17)

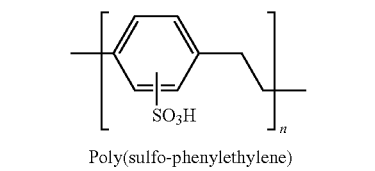

Poly(sulfo-phenylethylene)

(18)

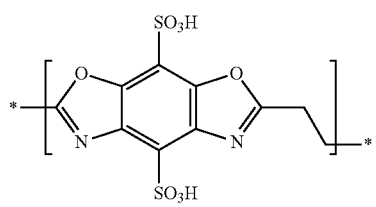

Poly(4,9-disulfobenzo[1,2-d;5,4-d']bisoxazole-1,7-ethylene)

(19)

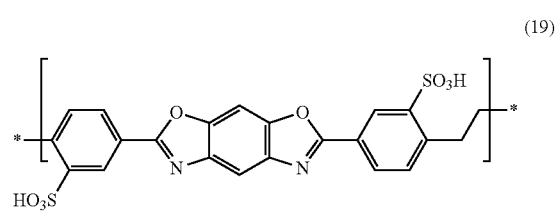

Poly(benzo[1,2-d;5,4-d']bisoxazole-1,7-[1,1'-ethane-1,2-diyl-2-2'-disulfodibenzene])

(20)

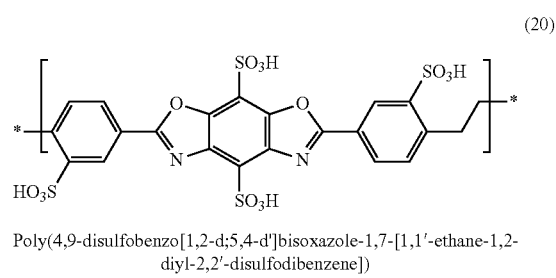

Poly(4,9-disulfobenzo[1,2-d;5,4-d']bisoxazole-1,7-[1,1'-ethane-1,2-diyl-2,2'-disulfodibenzene])

(21)

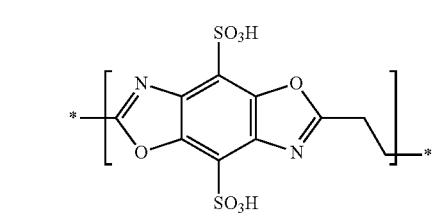

Poly(4,9-disulfobenzo[1,2-d;4,5-d']bisoxazole-1,7-ethylene)

(22)

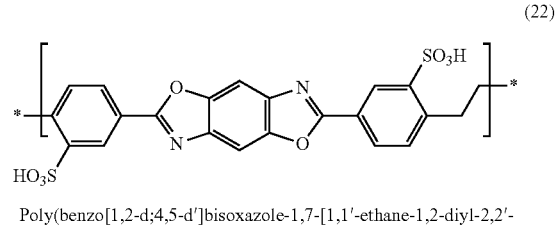

Poly(benzo[1,2-d;4,5-d']bisoxazole-1,7-[1,1'-ethane-1,2-diyl-2,2'-disulfodibenzene])

(23)

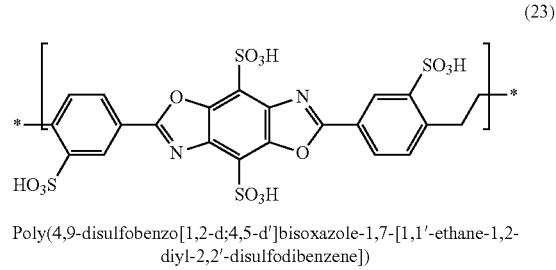

Poly(4,9-disulfobenzo[1,2-d;4,5-d']bisoxazole-1,7-[1,1'-ethane-1,2-diyl-2,2'-disulfodibenzene])

(24)

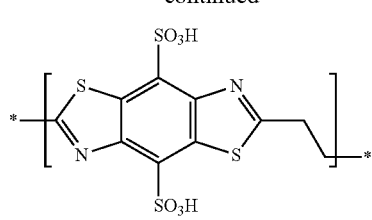

Poly(4,9-disulfobenzo[1,2-d;4,5-d']bisthiazole-1,7-ethylene)

(25)

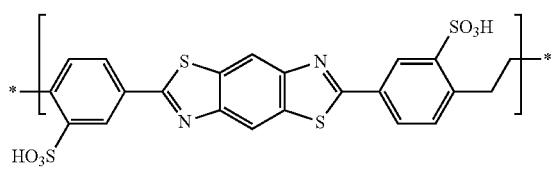

Poly(benzo[1,2-d;4,5-d']bisthiazole-1,7-[1,1'-ethane-1,2-diyl-2,2'-disulfodibenzene])

(26)

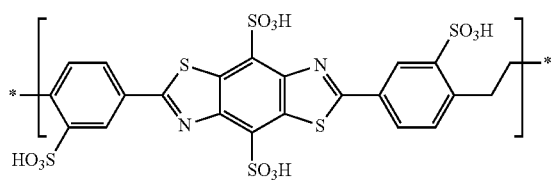

Poly(4,9-disulfobenzo[1,2-d;4,5-d;]bisthiazole-1,7-[1,1'-ethane-1,2-diyl-2,2'-disulfodibenzene])

(27)

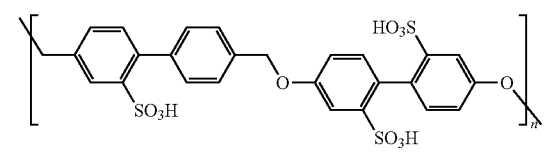

Poly((4,4'-dimethylen-1-sulfobiphenyl)-(4,4'-dioxi-1,1'-disulfobiphenyl) ether)

(28)

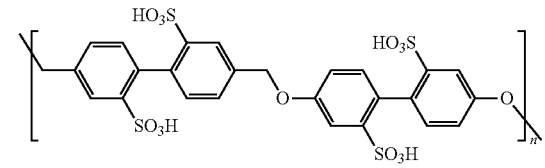

Poly((4,4'-dimethylen-1,1'-disulfobiphenyl)-(4,4'-dixoxi-1,1'-disulfobiphenyl) ether)

(29)

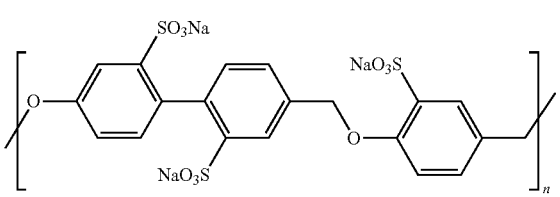

Poly((1,4-dimethylen-2-sulfophenyl)-(4,4'-dioxi-1,1'-disulfobiphenyl) ether)

where n=5-10000.

56. An achromatic circular polarizer according to claim 54, wherein the rigid rod-like polymer macromolecule of the general structural formula I further comprises additional side-groups connected with the Core organic unit structural formula I independently selected from the group consisting of linear and branched ($C_1$-$C_{20}$) alkyl, ($C_2$-$C_{20}$) alkenyl, and ($C_2$-$C_{20}$) alkynyl.

57. An achromatic circular polarizer according to claim 56, wherein at least one of the additionial side groups is connected with the Core organic unit of structural formula I via a bridging group A selected from the group consisting of —C(O)—, —C(O)O—, —C(O)—NH—, —(SO$_2$)NH—, —O—, —CH$_2$O—, —NH—, >N—, and any combination thereof.

58. An achromatic circular polarizer according to claim 54, wherein the salt of the rigid rod-like polymer macromolecule of the general structural formula I is selected from the group consisting of ammonium and alkali-metal salts.

59. An achromatic circular polarizer according to claim 54, wherein the rod-like macromolecule has a polymeric main rigid-chain, and wherein the conjugated organic units are the same.

60. An achromatic circular polarizer according to claim 54, wherein the rigid rod-like macromolecule has a copolymeric main rigid-chain, and wherein at least one conjugated organic unit is different from the others.

61. An achromatic circular polarizer according to claim 50, wherein the partially conjugated substantially planar polycyclic organic molecules of the first type have a general structural formula II $$\left[ \mathrm{Sys}_1 \begin{array}{l} -\mathrm{X1}_{m1} \\ -\mathrm{Y1}_{h1} \\ -\mathrm{Z1}_{p1} \\ -\mathrm{Q1}_{v1} \end{array} \right] \quad (\mathrm{II})$$

where $Sys_1$ is an at least partially conjugated substantially planar polycyclic molecular system having elongated form and having absorption in ultraviolet wavelength range, X1, Y1, Z1, and Q1 are substituents; substituent X1 is a carboxylic group —COOH, m1 is 0, 1, 2, 3 or 4; substituent Y1 is a sulfonic group —SO$_3$H, h1 is 0, 1, 2, 3 or 4;substituent Z1 is a carboxamide —CONH$_2$, p1 is 0, 1, 2, 3 or 4; substituent Q1 is a sulfonamide —SO$_2$NH$_2$, v1 is 0, 1, 2, 3 or 4.

62. An achromatic circular polarizer according to claim 61, wherein the at least partially conjugated substantially planar polycyclic molecular system $Sys_1$ is selected from the structures of general formulas 30 to 44:

(30)

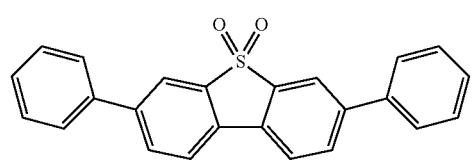

(31)

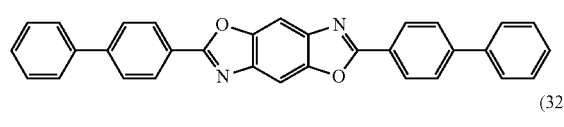

(32)

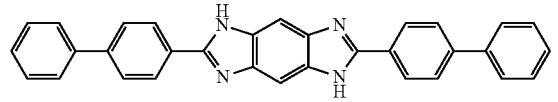

-continued

(33)
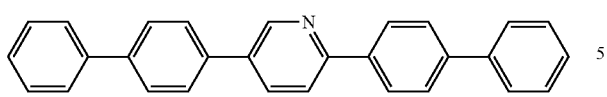

(34)
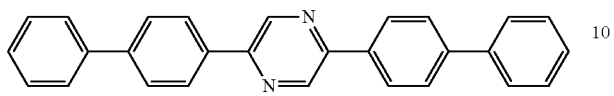

(35)
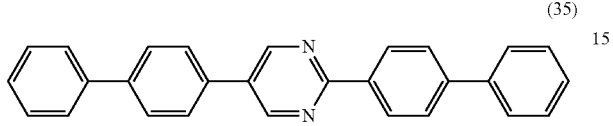

(36)
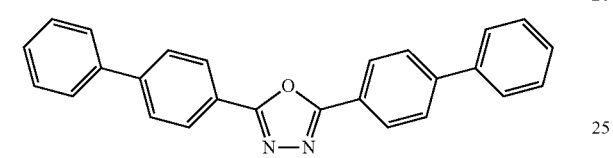

(37)
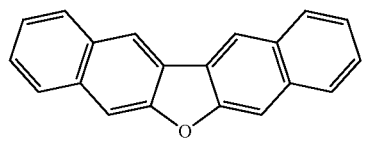

(38)
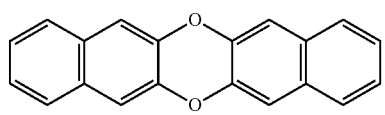

(39)
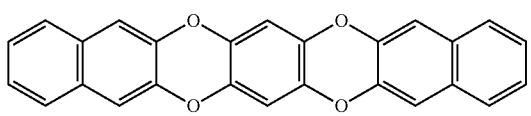

(40)
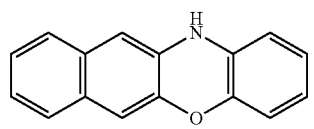

(41)
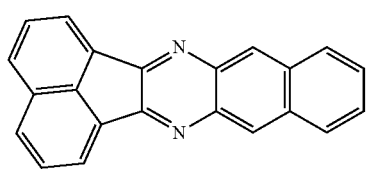

(42)
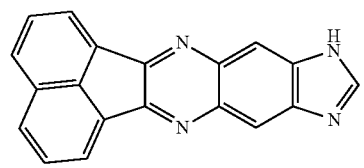

-continued

(43)
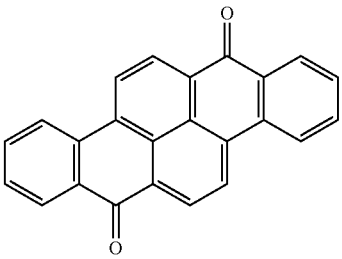

(44)
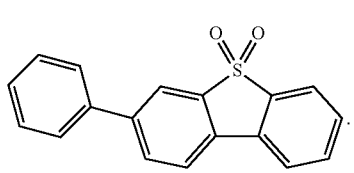

63. An achromatic circular polarizer according to claim 62, wherein the organic molecule having a general structural formula II is selected from structures 45 to 53:

(45)
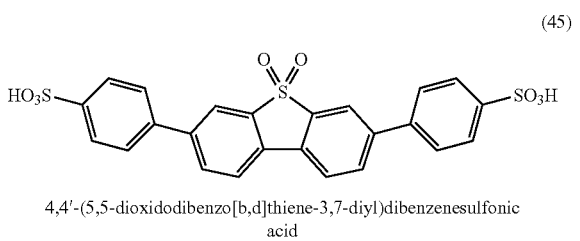
4,4′-(5,5-dioxidodibenzo[b,d]thiene-3,7-diyl)dibenzenesulfonic acid

(46)
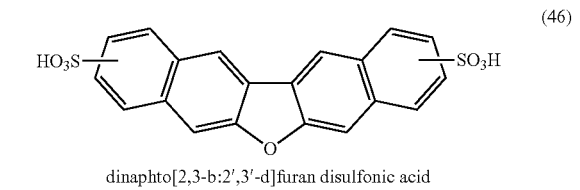
dinaphto[2,3-b:2′,3′-d]furan disulfonic acid

(47)
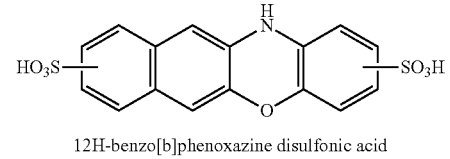
12H-benzo[b]phenoxazine disulfonic acid

(48)
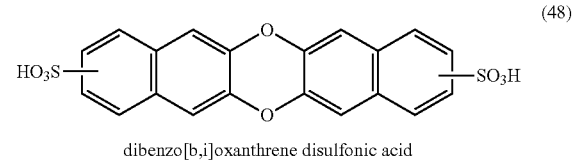
dibenzo[b,i]oxanthrene disulfonic acid

(49)
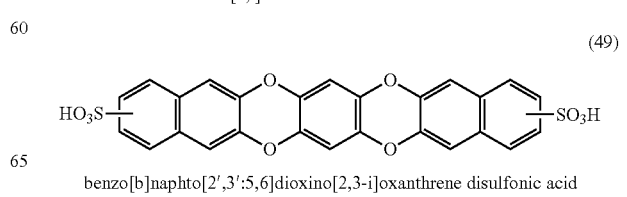
benzo[b]naphto[2′,3′:5,6]dioxino[2,3-i]oxanthrene disulfonic acid -continued

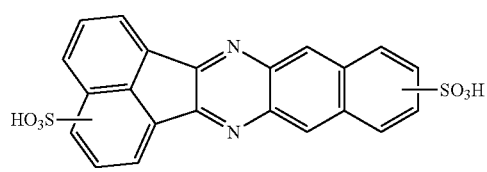

acenaphtho[1,2-b]benzo[g]quinoxaline disulfonic acid (50)

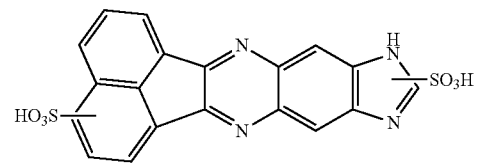

9H-acenaphtho[1,2-b]imidazo[4,5-g]quinoxaline disulfonic acid (51)

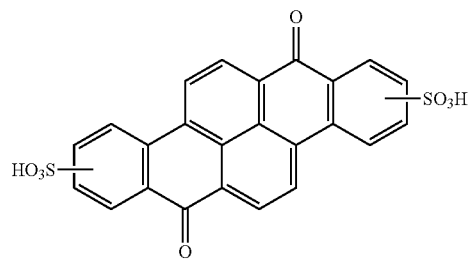

dibenzo[b,def]chrysene-7,14-dion disulfonic acid (52)

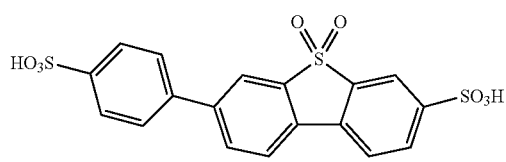

7-(4-sulfophenyl)dibenzo[b,d]thiophene-3-sulfonic acid 5,5-dioxide. (53)

64. An achromatic circular polarizer according to claim 61, wherein the organic molecules having a general structural formula II further comprises at least one substituent selected from the group consisting of —$CH_3$, —$C_2H_5$, —Cl, —Br, —$NO_2$, —F, —$CF_3$, —CN, —OH, —$OCH_3$, —$OC_2H_5$, —$OCOCH_3$, —OCN, —SCN, and —$NHCOCH_3$.

65. An achromatic circular polarizer according to claim 50, wherein the partially conjugated substantially planar polycyclic organic molecules of the second type have a general structural formula III $$\left[ Sys_2 \begin{array}{l} -X2_{m2} \\ -Y2_{h2} \\ -Z2_{p2} \\ -Q2_{v2} \end{array} \right]$$ (III)

where $Sys_2$ is an at least partially conjugated substantially planar polycyclic molecular system having elongated form and having absorption in near-infrared wavelength range, X2, Y2, Z2, and Q2 are substituents; substituent X2 is a carboxylic group —COOH, m2 is 0, 1, 2, 3 or 4; substituent Y2 is a sulfonic group —$SO_3H$, h2 is 0, 1, 2, 3 or 4; substituent Z2 is a carboxamide —$CONH_2$, p2 is 0, 1, 2, 3 or 4; substituent Q2 is a sulfonamide —$SO_2NH_2$, v2 is 0, 1, 2, 3 or 4.

66. An achromatic circular polarizer according to claim 65, wherein the organic molecules having a general structural formula III is selected from the structures of general formulas 54 to 55:

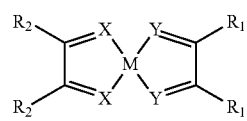 (54)

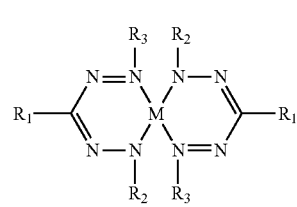 (55)

where M is Ni, Pd or Pt, X and Y are independently selected from O, S, and NR, and R, $R_1$ and $R_2$ are independently selected from -Alkyl-$SO_3H$, -Aryl-$SO_3H$, —NH—$SO_3H$, —(O-alkyl)$_n$-$SO_3H$, and —$(OCH_2CH_2)_n$—OH.

67. An achromatic circular polarizer according to claim 50, wherein the partially conjugated substantially planar polycyclic organic molecules of the first type have a general structural formula IV $$\left[ Sys_3 \begin{array}{l} -X3_{m3} \\ -Y3_{h3} \\ -Z3_{p3} \\ -Q3_{v3} \end{array} \right]$$ (IV)

where $Sys_3$ is an at least partially conjugated substantially planar polycyclic molecular system having approximately a disk form and having absorption in ultraviolet wavelength range, X3, Y3, Z3, and Q3 are substituents; substituent X3 is a carboxylic group —COOH, m3 is 0, 1, 2, 3 or 4; substituent Y3 is a sulfonic group —$SO_3H$, h3 is 0, 1, 2, 3 or 4; substituent Z3 is a carboxamide —$CONH_2$, p3 is 0, 1, 2, 3 or 4; substituent Q3 is a sulfonamide —$SO_2NH_2$, v3 is 0, 1, 2, 3 or 4.

68. An achromatic circular polarizer according to claim 67, wherein the organic molecules having a general structural formula IV has at least partially conjugated substantially planar polycyclic molecular system $Sys_3$ selected from the structures of general formulas 56 to 69:

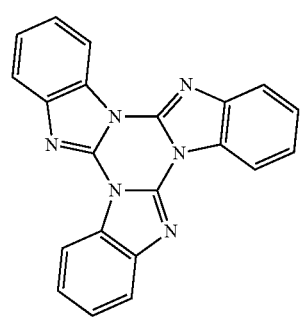 (56)

103
-continued
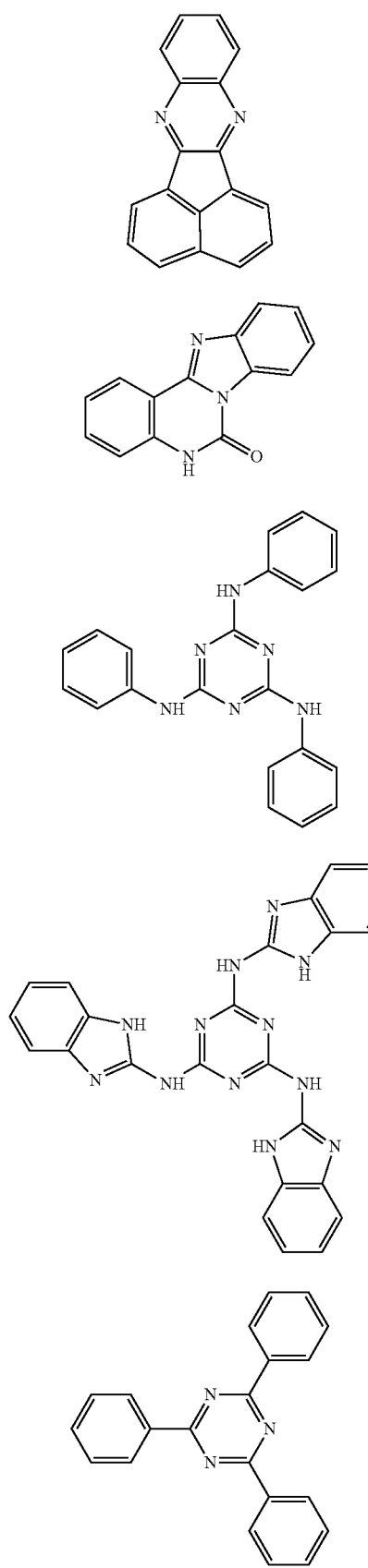
104
-continued
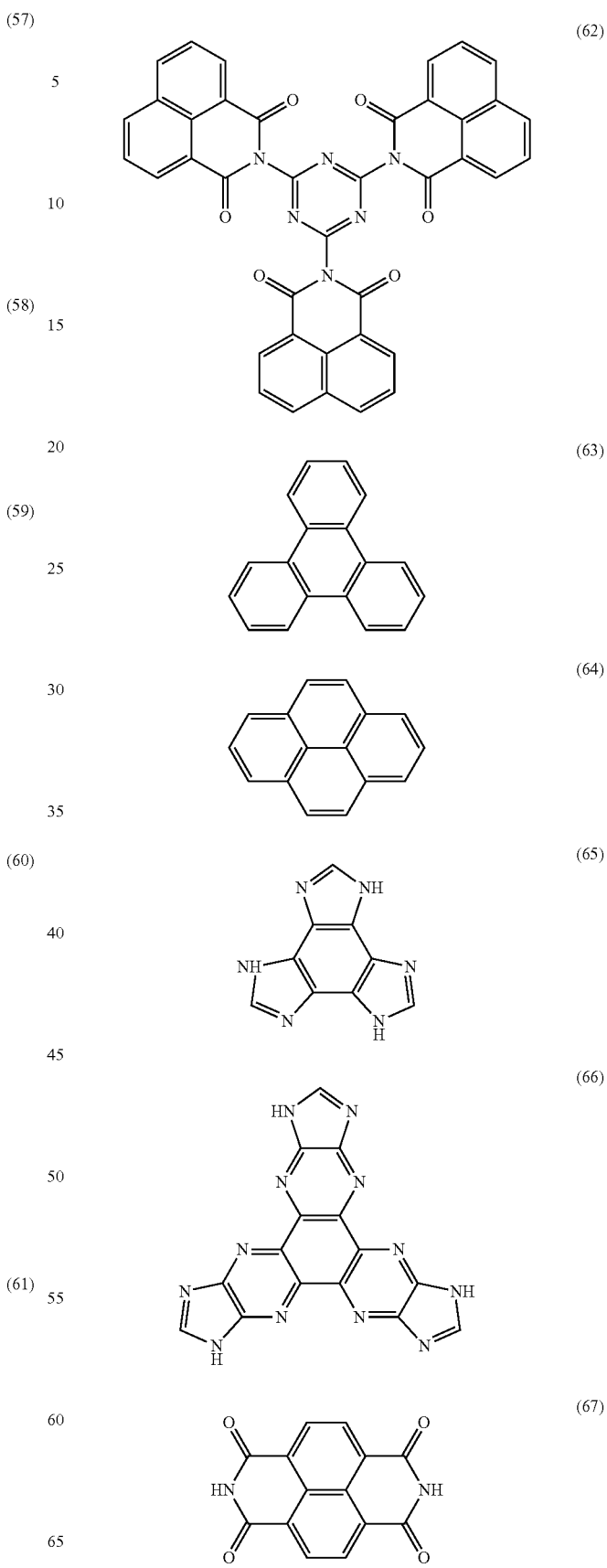

(68)

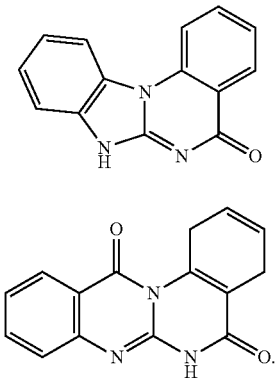

(69)

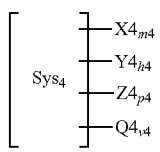

69. An achromatic circular polarizer according to claim 50, wherein the partially conjugated substantially planar polycyclic organic molecules of the second type have a general structural formula V $$Sys_4 \begin{cases} -X4_{m4} \\ -Y4_{h4} \\ -Z4_{p4} \\ -Q4_{v4} \end{cases} \quad (V)$$

where $Sys_4$ is an at least partially conjugated substantially planar polycyclic molecular system having absorption in near-infrared wavelength range and having approximately a disk form, X4, Y4, Z4, and Q4 are substituents; substituent X4 is a carboxylic group —COOH, m4 is 0, 1, 2, 3 or 4; substituent Y4 is a sulfonic group —SO$_3$H, h4 is 0, 1, 2, 3 or 4; substituent Z4 is a carboxamide —CONH$_2$, p4 is 0, 1, 2, 3 or 4; substituent Q4 is a sulfonamide —SO$_2$NH$_2$, v3 is 0, 1, 2, 3 or 4.

70. An achromatic circular polarizer according to claim 69, wherein the organic molecules having a general structural formula V is selected from the structures of general formulas 70 to 76:

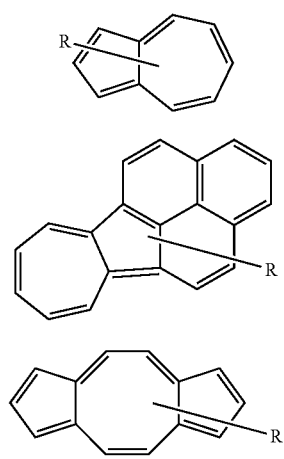

(70)

(71)

(72)

(73)

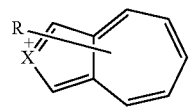

(74)

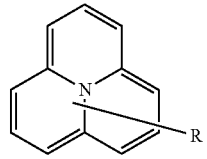

(75)

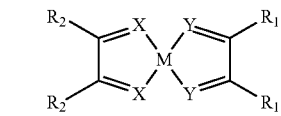

(76)

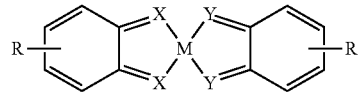

where M is Ni, Pd or Pt, X and Y are independently selected from O, S, and NR, and R, $R_1$ and $R_2$ are independently selected from -Alkyl-SO$_3$H, -Aryl-SO$_3$H, —NH—SO$_3$H, —(O-alkyl)$_n$-SO$_3$H, and —(OCH$_2$CH$_2$)$_n$OH and $X^+$ is balanced with any inorganic ororganic anion.

71. An achromatic circular polarizer according to claim 50, wherein longitudinal axes of the rigid rod-like polymer macromolecules coincide with longitudinal axes of said supramolecules, and at least part of the supramolecules possess anisotropic polarizability in a plane which is perpendicular to their longitudinal axis and wherein the rigid rod-like polymer macromolecules and said supramolecules form a retardation layer of $B_A$-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer, which satisfy the following conditions: $n_x < n_z < n_y$ and $\partial \Delta n(\lambda)/\partial \lambda > 0$ over the whole visible spectral range, where $\Delta n = n_y - n_x$.

72. An achromatic circular polarizer according to claim 50, wherein longitudinal axes of the rigid rod-like polymer macromolecules coincide with longitudinal axes of said supramolecules, and the supramolecules possess isotropic polarizability in a plane which is perpendicular to their longitudinal axis and wherein the rigid rod-like polymer macromolecules and said supramolecules form a retardation layer of negative A-type coated onto the substrate and characterized by two principal refractive indices ($n_x$ and $n_y$) corresponding to two mutually perpendicular directions in the plane of the retardation layer and one principal refractive index ($n_z$) in the normal direction to the retardation layer, which satisfy the following conditions: $n_x < n_y = n_z$ and $\partial \Delta n(\lambda)/\partial \lambda > 0$ over the whole visible spectral range, where $\Delta n = n_y - n_x$.

73. An achromatic circular polarizer according to claim 50, further comprising additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer, wherein the optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer, and wherein the following conditions are satisfied: $|\partial \Delta n_{add}(\lambda)/\partial \lambda| < |\partial \Delta n(\lambda)/\partial \lambda|$, $\partial \Delta n(\lambda)/\partial \lambda < 0$ and $\partial R(\lambda)/\partial \lambda > 0$ over the whole visible spectral range, where $\Delta n_{add} = n_{x,\,add} - n_{y,\,add}$, $\Delta n = n_x - n_y$ and $R = (n_{x,\,add} - n_{y,\,add}) \cdot d_{add} + (n_x - n_y) \cdot d$.

74. An achromatic circular polarizer according to claim 50, further comprising additional layer based on lyotropic liquid crystal and characterized by thickness $d_{add}$ and two principal refractive indices ($n_{x,addb}$ and $n_{y,add}$) corresponding to two mutually perpendicular directions in the plane of said layer and one principal refractive index ($n_{z,add}$) in the normal direction to said layer, wherein the optically anisotropic retardation layer comprising a multi-component guest-host composition is characterized by thickness d, two principal refractive indices ($n_x$ and $n_y$) corresponding to two mutually perpendicular directions in the plane of the retardation layer and one principal refractive index ($n_z$) in the normal direction to the retardation layer, and wherein the following conditions are satisfied: $|\partial \Delta n(\lambda)/\partial \lambda| < |\partial \Delta n_{add}(\lambda)/\partial \lambda|$, $\partial \Delta n_{add}(\lambda)/\partial \lambda < 0$ and $\partial R(\lambda)/\partial \lambda > 0$ over the whole visible spectral range, where $\Delta n_{add} = n_{x,\,add} - n_{y,\,add}$, $\Delta n = n_x - n_y$ and $R = (n_{x,\,add} - n_{y,\,add}) \cdot d_{add} + (n_x - n_y) \cdot d$.

75. An achromatic circular polarizer according to claim 50, wherein the substrate is made of glass.

76. An achromatic circular polarizer according to claim 50, wherein the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate and the supramolecules possess anisotropic polarizability in a plane which is perpendicular to their longitudinal axis and wherein said supramolecules form a retardation layer of biaxial $B_A$-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer and wherein the following conditions are satisfied: $n_{x,sub} > n_{y,sub} = n_{z,sub}$, $n_x < n_z < n_y$ and $\partial R(\lambda)/\partial \lambda > 0$ over the whole visible spectral range, where $R = (n_{x,sub} - n_{y,sub}) \cdot d_{sub} + (n_x - n_y) \cdot d$.

77. An achromatic circular polarizer according to claim 50, wherein the substrate is a plate of positive A-type characterized by thickness $d_{sub}$ and two principal refractive indices ($n_{x,sub}$ and $n_{y,sub}$) corresponding to two mutually perpendicular directions in the plane of the substrate and one principal refractive index ($n_{z,sub}$) in the normal direction to the substrate and the supramolecules possess isotropic polarizability in a plane which is perpendicular to their longitudinal axis and wherein said supramolecules form a retardation layer of negative A-type coated onto the substrate and characterized by thickness d and two principal refractive indices ($n_x$ and $n_y$) corresponding to two mutually perpendicular directions in the plane of the retardation layer and one principal refractive index ($n_z$) in the normal direction to the retardation layer and wherein the following conditions are satisfied: $n_{x,sub} > n_{y,sub} = n_{z,sub}$, $n_x < n_y = n_z$ and $\partial R(\lambda)/\partial \lambda > 0$ over the whole visible spectral range, where $R = (n_{x,sub} - n_{y,sub}) \cdot d_{sub} + (n_x - n_y) \cdot d$.

78. An achromatic circular polarizer according to any of claims 76 or 77, wherein the substrate material is selected from the group consisting of poly ethylene terephtalate (PET), poly ethylene naphtalate (PEN), polyvinyl chloride (PVC), polycarbonate (PC), oriented poly propylene (OPP), poly ethylene (PE), polyimide (PI), and poly ester.

* * * * *